United States Patent
Wu et al.

(10) Patent No.: US 11,221,877 B2
(45) Date of Patent: Jan. 11, 2022

(54) TASK PARALLEL PROCESSING METHOD, APPARATUS AND SYSTEM, STORAGE MEDIUM AND COMPUTER DEVICE

(71) Applicant: Shanghai Cambricon Information Technology Co., Ltd, Shanghai (CN)

(72) Inventors: Linyang Wu, Shanghai (CN); Xiaofu Meng, Shanghai (CN)

(73) Assignee: Shanghai Cambricon Information Technology Co., Ltd, Shanghai (CN)

( * ) Notice: Subject to any disclaimer, the term of this patent is extended or adjusted under 35 U.S.C. 154(b) by 141 days.

(21) Appl. No.: 16/575,344

(22) Filed: Sep. 18, 2019

(65) Prior Publication Data
US 2020/0012521 A1    Jan. 9, 2020

Related U.S. Application Data

(63) Continuation of application No. PCT/CN2018/108298, filed on Sep. 28, 2018.

(30) Foreign Application Priority Data

Nov. 20, 2017   (CN) .......................... 201711157341.X
Dec. 29, 2017   (CN) .......................... 201711484410.8
(Continued)

(51) Int. Cl.
   *G06F 9/46*        (2006.01)
   *G06F 9/48*        (2006.01)
(Continued)

(52) U.S. Cl.
   CPC .............. *G06F 9/4881* (2013.01); *G06F 9/38* (2013.01); *G06F 9/4856* (2013.01); *G06F 9/54* (2013.01);
(Continued)

(58) Field of Classification Search
   CPC ................................................... G06F 9/45558
(Continued)

(56) References Cited

U.S. PATENT DOCUMENTS 9,135,065 B1 *   9/2015   Stefansson .......... G06F 15/8023
9,760,348 B2 *   9/2017   Varadarajan ............ G06F 8/437
(Continued)

FOREIGN PATENT DOCUMENTS

CN         102012844 A       4/2011
CN         104239137 A       12/2014
(Continued)

OTHER PUBLICATIONS

Extended European search report in related European Application No. 19210491.7, dated Apr. 9, 2020, 10 pages.
(Continued)

*Primary Examiner* — Mehran Kamran
(74) *Attorney, Agent, or Firm* — Bayes PLLC

(57) ABSTRACT

The present disclosure provides a task parallel processing method, a device, a system, a storage medium and computer equipment, which are capable of distributing and regulating tasks to be executed according to a task directed acyclic graph, and may thereby realize task parallelism of a multi-core processor and improve the efficiency of data processing.

18 Claims, 19 Drawing Sheets

(30) Foreign Application Priority Data

Jan. 29, 2018 (CN) .......................... 201810083577.1
Jan. 29, 2018 (CN) .......................... 201810084077.X

(51) Int. Cl.

| G06F 9/38 | (2018.01) |
|---|---|
| G06N 3/04 | (2006.01) |
| G06N 3/10 | (2006.01) |
| G06F 9/54 | (2006.01) |

(52) U.S. Cl.
CPC .............. *G06F 9/547* (2013.01); *G06N 3/04* (2013.01); *G06N 3/10* (2013.01)

(58) Field of Classification Search
USPC ........................................................ 718/106
See application file for complete search history.

(56) References Cited

U.S. PATENT DOCUMENTS

| 10,152,349 | B1* | 12/2018 | Anand | G06N 5/003 |
|---|---|---|---|---|
| 10,311,393 | B2* | 6/2019 | Birkler | G06Q 10/067 |
| 10,503,775 | B1* | 12/2019 | Ranzinger | G06K 9/6202 |
| 2006/0288346 | A1* | 12/2006 | Santos | G06F 9/5038 718/102 |
| 2008/0201721 | A1* | 8/2008 | Little | G06F 9/5027 718/106 |
| 2009/0044196 | A1* | 2/2009 | Stefansson | G06F 9/5027 718/106 |
| 2009/0044197 | A1* | 2/2009 | Stefansson | G06F 8/314 718/106 |
| 2011/0078691 | A1* | 3/2011 | Yildiz | G06F 9/4812 718/103 |
| 2011/0310977 | A1* | 12/2011 | Nishihara | G06F 9/4881 375/240.24 |
| 2012/0079490 | A1* | 3/2012 | Bond | G06F 9/5038 718/103 |
| 2013/0298130 | A1* | 11/2013 | Pienaar | G06F 9/4887 718/102 |
| 2014/0282572 | A1* | 9/2014 | Kang | G06F 9/4881 718/103 |
| 2015/0058858 | A1* | 2/2015 | Plattner | G06F 9/5038 718/103 |
| 2015/0067088 | A1* | 3/2015 | Guerin | G06F 16/9014 709/213 |
| 2015/0074675 | A1* | 3/2015 | Qi | G06F 8/4441 718/103 |
| 2015/0234935 | A1* | 8/2015 | Gu | G06F 16/212 707/756 |
| 2015/0268992 | A1* | 9/2015 | Fan | G06F 9/4881 718/106 |
| 2016/0062776 | A1* | 3/2016 | Stanfill | G06F 8/43 719/331 |
| 2016/0098292 | A1* | 4/2016 | Boutin | G06F 9/505 718/104 |
| 2016/0103677 | A1 | 4/2016 | Melski | |
| 2016/0105308 | A1* | 4/2016 | Dutt | H04L 41/083 709/221 |
| 2016/0178801 | A1* | 6/2016 | Bobrek | G01V 99/005 703/2 |
| 2016/0335119 | A1* | 11/2016 | Merrill | G06N 3/063 |
| 2016/0378550 | A1* | 12/2016 | Bertran Monfort | G06F 8/443 718/102 |
| 2018/0018610 | A1* | 1/2018 | Del Balso | G06Q 10/06316 |
| 2018/0137406 | A1* | 5/2018 | Howard | G06N 3/082 |
| 2018/0181446 | A1* | 6/2018 | Bequet | G06F 16/9024 |
| 2018/0189652 | A1* | 7/2018 | Korthikanti | G06N 3/084 |
| 2018/0293490 | A1* | 10/2018 | Ma | G06N 3/0445 |
| 2018/0300616 | A1* | 10/2018 | Ambardekar | G06F 12/0207 |
| 2018/0322607 | A1* | 11/2018 | Mellempudi | G06F 5/01 |
| 2019/0073228 | A1* | 3/2019 | Stanfill | G06F 8/41 |
| 2019/0147332 | A1* | 5/2019 | Lagudu | G06F 1/3296 706/25 |

FOREIGN PATENT DOCUMENTS

| CN | 106156810 A | 11/2016 |
|---|---|---|
| CN | 107103113 A | 8/2017 |
| CN | 107341127 A | 11/2017 |
| JP | H09171503 A | 6/1997 |
| JP | 2016536692 A | 11/2016 |
| WO | 2016057887 A1 | 4/2016 |
| WO | 2017163442 A1 | 9/2017 |

OTHER PUBLICATIONS

First Office action issued in related Chinese Application No. 201711484410.8, dated Oct. 28, 2019, 6 pages.
International Search Report and Written Opinion in corresponding International Application No. PCT/CN2018/108298, dated Dec. 29, 2018, 6 pages.
First Office action issued in related Chinese Application No. 201810084077.X, dated Oct. 21, 2019, 7 pages.
First Office action issued in related Chinese Application No. 201810083577.1, dated Oct. 22, 2019, 10 pages.
Extended European search report issued in related European Application No. 18878728.7, dated Sep. 23, 2020, 11 pages.
Matt Welsh et al: "SEDA: An Architecture for Well-Conditioned, Scalable Internet Services", Operating Systems Review, ACM, New York, NY, US, vol. 35, No. 5, Oct. 21, 2001, pp. 230-243, XP058184710, 14 pages.
First Office Action issued in related Chinese Application No. 20171157341 .X, dated Jun. 29, 2020, 9 pages.
Office Action issued in related Japanese Application No. 2019-568198, dated Mar. 2, 2021, 2 pages.
Office Action issued in related Japanese Application No. 2019-568198 dated Sep. 21, 2021, 2 pages.
Midonnet, Serge et al., A processor workload distribution algorithm for massively parallel applications, Proceedings of 2016 International Symposium on Computer Architecture and High Performance Computing Worksho ps, US, IEEE, Oct. 26, pp. 25-30, https://ieeexplore.ieee.org/document/7803671.

\* cited by examiner

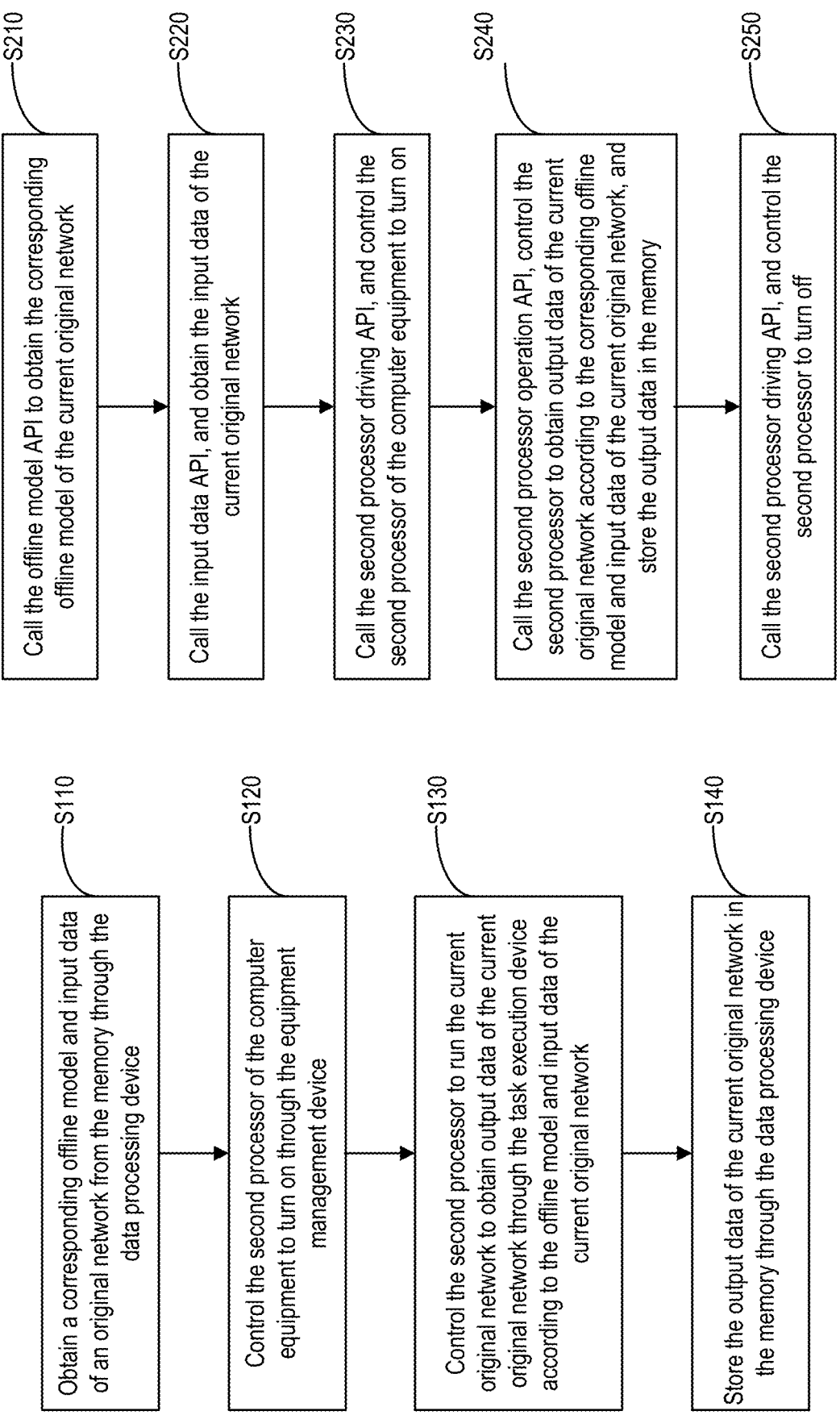

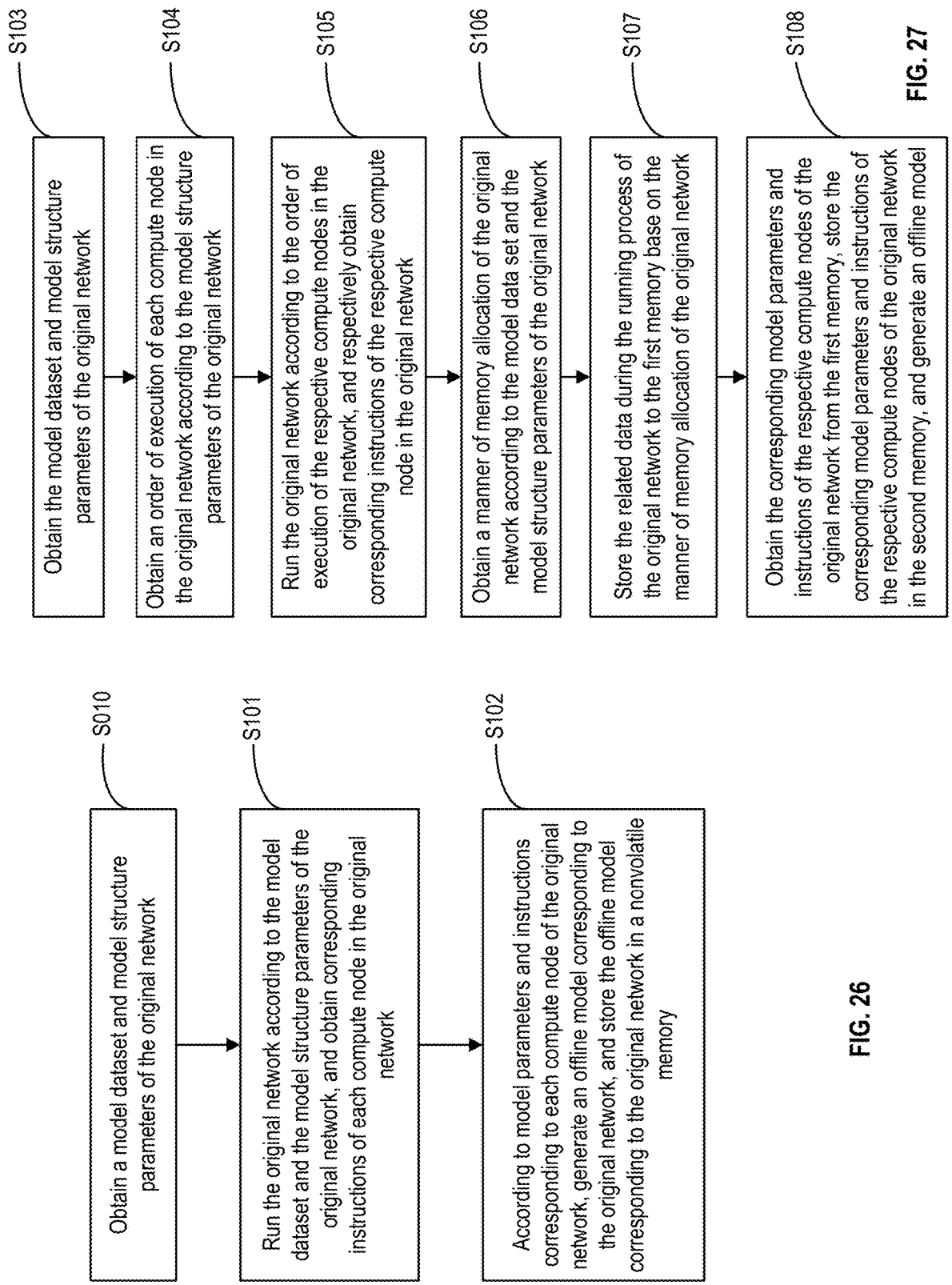

TASK PARALLEL PROCESSING METHOD, APPARATUS AND SYSTEM, STORAGE MEDIUM AND COMPUTER DEVICE

RELATED APPLICATIONS

The present application is a continuation of International Application No. PCT/CN2018/108298, filed Sep. 28, 2018, which claims the benefits of priority to: Chinese Patent Application No. 201711157341.X with the title of "Task Parallel Processing Method, Storage Medium, Computer Equipment, Device, and System" filled on Nov. 20, 2017; Chinese Patent Application No. 201711484410.8 with the title of "Instruction List Scheduling Method, Device, Computer Equipment, and Storage Medium" filled on Dec. 29, 2017; Chinese Patent Application No. 201810084077.X with the title of "Computer Equipment, Data Processing Method, and Storage Medium" filled on Jan. 29, 2018; and Chinese Patent Application No. 201810083577.1 with the title of "Computer Equipment, Data Processing Method, and Storage Medium" filled on Jan. 29, 2018. The entire contents of each of the above-identified applications are expressly incorporated herein by reference.

TECHNICAL FIELD

The present disclosure relates to the field of computer technology, and in particular relates to a task parallel processing method, device, system, storage medium, and computer equipment.

BACKGROUND

In the traditional technology, programming can be performed through an accelerator API interface such as CUDA (Compute Unified Device Architecture, a computing platform launched by graphics card manufacturer NVIDIA), Cudnn (CUDA Deep Neural Network library, an accelerated library for deep neural networks launched by NVIDIA), Cublas (CUDA Basic Linear Algebra Subprograms, an accelerated library for matrices computations launched by NVIDIA), thereby realizing program instructions of convolutional neural networks. However, the instructions of convolutional neural networks realized by programming through an accelerator API such as CUDA, Cudnn, and Cublas are not interdependent, and the programming instructions can only be executed sequentially.

A neural network is actually a string of queue functions and a type of graph structure. When program instructions of a convolutional neural network are being executed, task branches may exist. Currently, architecture applications such as Tensorflow (a second generation of artificial intelligence learning system created by Google based on Dist-Belief) or Caffe (Convolutional Architecture for Fast Feature Embedding) are used for realizing task parallelism in a program of a convolutional neural network. However, when using the architecture applications to realize task parallelism of a convolutional neural network, users may need to install extra software and may encounter the problem that the program interface is incompatible, which causes inconvenience.

SUMMARY

Based on the situation above, it is necessary to provide a task parallel processing method, storage medium, computer equipment, device, and system to overcome the problem of inconvenience caused by the need of using architecture applications such as Tensorflow or Caffe to realize task parallelism.

The present disclosure provides a method for processing a plurality of tasks in parallel. The method may include generating a directed acyclic graph based on dependencies among the plurality of tasks that are to be executed by the at least one processor, distributing the plurality of tasks to a plurality of work queues of the at least one processor based on the directed acyclic graph, and regulating, in respective work queues, one or more distributed tasks to be executed in parallel based on the dependencies among the one or more distributed tasks indicated by the directed acyclic graph.

In some embodiments, prior to generating the directed acyclic graph, the method may include partitioning a program based on at least one of operation nodes or data nodes of the program. The method may also include obtaining the plurality of tasks based on the partition.

In some embodiments, partitioning the program may include partitioning the program based on the operation nodes. The program may include an operation request, and the operation request may include a model. Partitioning the program based on the operation nodes may include partitioning at least one of the model or input data of the model.

In some embodiments, partitioning the program may include partitioning the model. Partitioning the model may include setting weights corresponding to the obtained plurality of tasks, respectively and setting correspondences between input data and output data of the obtained plurality of tasks based on the weights.

In some embodiments, partitioning the program may include partitioning the model. Partitioning the model may include partitioning, based on a preset rule, the model in at least one of a height-width direction or a channel direction of the model.

In some embodiments, partitioning the program may include partitioning the input data of the model. Partitioning the input data of the model may include partitioning, based on a preset rule, the input data of the model in a height-width direction of the input data.

In some embodiments, partitioning the program may include partitioning the program based on the operation nodes. The program may include an operation request. The operation request does not comprise a model. Partitioning the program based on the operation nodes may include partitioning at least one of input data or output data of the operation request.

In some embodiments, partitioning at least one of the input data or output data of the operation request may include partitioning, based on a preset rule, at least one of the input data or output data in a height-width direction of the corresponding input data or output data.

In some embodiments, generating the directed acyclic graph may include determining parallel nodes and sequential nodes of the directed acyclic graph based on the dependencies among the plurality of tasks and generating the directed acyclic graph based on the parallel nodes and the sequential nodes.

In some embodiments, distributing the plurality of tasks to the plurality of work queues of the at least one processor may include topologically sorting the directed acyclic graph to obtain topologically sorted sequences of the plurality of tasks, sorting the topologically sorted sequences based on preset amounts of execution time of the respective tasks, obtaining a longest sequence from the topologically sorted sequences, and distributing the plurality of tasks to the respective work queues based on the longest sequence and the dependencies among the plurality of tasks.

In some embodiments, regulating, in the respective work queues, the one or more distributed tasks to be executed in parallel may include setting reference counts for the one or more distributed tasks to be executed in parallel based on the directed acyclic graph. When a depended task to be executed is already executed, regulating the one or more distributed tasks may include modifying the reference count of a depending task to be executed. When the reference count of a task to be executed reaches a preset value, regulating the one or more distributed tasks may include controlling, in the respective work queues, tasks to be executed whose reference counts reach the preset value to start operating.

The present disclosure also provides a computer readable storage medium storing instructions that, when executed by at least one processor, cause the at least one processor to perform operations for processing a plurality of tasks in parallel. The operations may include generating a directed acyclic graph based on dependencies among the plurality of tasks that are to be executed by the at least one processor, distributing the plurality of tasks to a plurality of work queues of the at least one processor based on the directed acyclic graph, and regulating, in respective work queues, one or more distributed tasks to be executed in parallel based on the dependencies among the one or more distributed tasks indicated by the directed acyclic graph.

The present disclosure also provides a system for processing a plurality of tasks in parallel. The system may include a memory storing computer-readable instructions and at least one processor coupled to the memory. The computer-readable instructions, when executed by the at least one processor, cause the at least one processor to perform operations. The operations may include generating a directed acyclic graph based on dependencies among the plurality of tasks that are to be executed by the at least one processor, distributing the plurality of tasks to a plurality of work queues of the at least one processor based on the directed acyclic graph, and regulating, in respective work queues, one or more distributed tasks to be executed in parallel based on the dependencies among the one or more distributed tasks indicated by the directed acyclic graph.

In some embodiments, prior to generating the directed acyclic graph, the operations may include partitioning a program based on at least one of operation nodes or data nodes of the program and obtaining the plurality of tasks based on the partition.

In some embodiments, the at least one processor may include a multiple-core processor configured to execute the operations for partitioning the program.

In some embodiments, the at least one processor may include first and second processors. The first processor may be configured to execute the operations for partitioning the program and the second processor may be a multi-core processor.

In some embodiments, partitioning the program may include partitioning the program based on the operation nodes. Partitioning the program based on the operation nodes may include: when the program comprises an operation request and the operation request comprises a model, partitioning at least one of the model or input data of the model; and when the program comprises an operation request and the operation request does not comprise a model, partitioning at least one of input data or output data of the operation request.

In some embodiments, generating the directed acyclic graph may include determining parallel nodes and sequential nodes of the directed acyclic graph based on the dependencies among the plurality of tasks and generating the directed acyclic graph based on the parallel nodes and the sequential nodes.

In some embodiments, distributing the plurality of tasks to the plurality of work queues of the at least one processor may include topologically sorting the directed acyclic graph to obtain topologically sorted sequences of the plurality of tasks, sorting the topologically sorted sequences based on preset amounts of execution time of the respective tasks, obtaining a longest sequence from the topologically sorted sequences, and distributing the plurality of tasks to the respective work queues based on the longest sequence and the dependencies among the plurality of tasks.

In some embodiments, regulating, in the respective work queues, the one or more distributed tasks to be executed in parallel may include: setting reference counts for the one or more distributed tasks to be executed in parallel based on the directed acyclic graph; when a depended task to be executed is already executed, modifying the reference count of a depending task to be executed; and when the reference count of a task to be executed reaches a preset value, controlling, in the respective work queues, tasks to be executed whose reference counts reach the preset value to start operating.

Compared with the prior art, the task parallel processing method, storage medium, computer equipment, device, and system of the present disclosure may have the following technical effects: the task parallel processing method, storage medium, computer equipment, device, and system provided in the present disclosure may build a task DAG according to dependencies among tasks to be executed, then distribute and control the tasks to be executed according to the task DAG. Thereby, task parallelism of a multi-core processor may be realized by rescheduling work queues, and the efficiency of data processing may be improved. The task parallel processing method provided in the present example does not rely on architecture programs such as Tensorflow or Caffe, thus may not have problems such as interface compatibility during the designing of a program.

The present disclosure further provides an instruction list scheduling method including: obtaining an instruction set to be scheduled in an instruction list to be scheduled, and performing a data dependency analysis on the instruction set to be scheduled to obtain data dependencies among instructions in the instruction set to be scheduled; obtaining all selection nodes of each instruction selection performed during an instruction scheduling process according to the data dependencies among the instructions; and following a preset rule to determine instructions of respective orders in the scheduled instruction list according to the selection nodes of corresponding orders.

In an example of the present disclosure, the following the preset rule to determine instructions of respective order in the scheduled instruction list according to the selection nodes of corresponding orders may include: accessing the selection nodes and obtaining longest execution time corresponding to a currently accessed selection node; if the longest execution time corresponding to the currently accessed selection node is shorter than initial execution time, determining sorted instructions of the currently accessed selection node as instructions of a corresponding order in the scheduled instruction list; and the initial execution time may be execution time of an instruction sequence of the instruction list to be scheduled.

In an example of the present disclosure, the method may include: if longest execution time corresponding to a currently accessed selection node is shorter than initial execution time, the initial execution time may be updated as the longest execution time of the currently accessed selection node.

In an example of the present disclosure, the accessing the selection nodes and obtaining the longest execution time corresponding to the currently accessed selection node may include: accessing the selection nodes in a preset time period and obtaining the longest execution time corresponding to the currently accessed selection node; if the longest execution time corresponding to the currently accessed selection node is shorter than initial execution time, determining corresponding sorted instructions of the currently accessed selection node as instructions of a corresponding order in the scheduled instruction list; and the initial execution time may be execution time for an instruction sequence of the instruction list to be scheduled.

In an example of the present disclosure, if longest execution time corresponding to a currently accessed selection node is not shorter than initial execution time, determining an instruction sequence of an instruction list to be scheduled as an instruction sequence of the scheduled instruction list.

In an example of the present disclosure, the accessing the selection nodes and obtaining the longest execution time corresponding to the currently accessed selection node may include: following a random first rule to select the selection nodes for accessing, and obtaining the longest execution time corresponding to the currently accessed selection node.

In an example of the present disclosure, the accessing the selection nodes and obtaining the longest execution time corresponding to the currently accessed selection node may include: following a breadth first rule to select the selection nodes for accessing, and obtaining the longest execution time corresponding to the currently accessed selection node.

In an example of the present disclosure, the accessing the selection nodes and obtaining the longest execution time corresponding to the currently accessed selection node may include: following a depth first rule to select the selection nodes for accessing, and obtaining the longest execution time corresponding to the currently accessed selection node.

In an example of the present disclosure, the accessing the selection nodes and obtaining the longest execution time corresponding to the currently accessed selection node may include: following a breadth first rule or a random first rule to select the selection nodes that are shorter than a preset order for accessing, and obtaining the longest execution time corresponding to the currently accessed selection node; and following a depth first rule to select the selection nodes that are not shorter than the preset order for accessing, and obtaining the longest execution time corresponding to the currently accessed selection node.

In an example of the present disclosure, the accessing the selection nodes and obtaining the longest execution time corresponding to the currently accessed selection node may include: obtaining shortest execution time corresponding to the currently accessed selection node; if the corresponding shortest execution time of the currently accessed selection node is longer than initial execution time, terminating the accessing to selection nodes that are correlated with the currently accessed selection node; and the initial execution time may be execution time for an instruction sequence of the instruction list to be scheduled.

In an example of the present disclosure, the following the preset rule to determine instructions of the respective order in the scheduled instruction list according to the selection nodes of the corresponding orders may include: evaluating all corresponding selection nodes of a current order according to preset priority of instructions, obtaining an evaluation result of the selection nodes of the current order, and determining corresponding instructions of the current order according to the evaluation result.

In an example of the present disclosure, the method may include: setting priority of instructions according to specific content and/or type of a current selection node.

In an example of the present disclosure, the following the preset rule to determine instructions of the respective orders in the scheduled instruction list according to the selection nodes of the corresponding orders may include: determining corresponding instructions of a current order according to corresponding shortest execution time of all selection nodes of the current order.

The present disclosure provides an instruction scheduling device including: an obtaining unit, a data dependency analysis unit, and an evaluation unit.

The obtaining unit may be configured to obtain an instruction set to be scheduled in an instruction list to be scheduled, and obtain all selection nodes corresponding to each instruction selection performed during an instruction scheduling process according to data dependencies among instructions; the data dependency analysis unit may be configured to perform a data dependency analysis on the instruction set to be scheduled to obtain the data dependencies among the instructions; and the evaluation unit may be configured to follow a preset rule to determine instructions of respective order in the scheduled instruction list according to the selection nodes of the corresponding orders.

The present disclosure provides a computer equipment including a memory, a processor, and a computer program that is stored in the memory and can run on the processor. The processor may execute the steps mentioned in the method above.

The present disclosure provides a computer readable storage medium. A computer program may be stored in the computer readable storage medium. When a processor executes the computer program, the steps mentioned in the method above may be realized.

Compared with the traditional technology, the instruction list scheduling method, device, computer equipment, and storage medium of the present disclosure may have the following technical effects: by analyzing data dependencies among instructions to be scheduled, all selection nodes corresponding to each instruction selection performed during an instruction scheduling process may be obtained, and then instructions of respective orders in an scheduled instruction list may be determined according to an evaluation result of the corresponding selection nodes of the respective order. The method may ensure that for each instruction selection, instructions that are selected is an optimal result for a current state. With a scheduled instruction list obtained by using the optimal results, instructions may be sorted in a more compact manner, which may thereby shorten execution time for an instruction sequence of an initial instruction list.

The present disclosure further provides a computer equipment including a first processor, a second processor, and a memory, where corresponding offline models and input data of a plurality of original networks and a runtime system that can run on the first processor may be stored in the memory; and the runtime system may include: a data processing device that may be configured to obtain a corresponding offline model and input data of a current original network from the memory, where the corresponding offline model of the current original network may include corresponding model parameters and instructions of respective compute nodes of the original network, as well as interface data of the respective compute nodes of the original network; an equipment management device that may be configured to control on/off of the second processor; and a task execution device that may be configured to control the second processor to run the offline model and input data of the current original network.

In an example of the present disclosure, the data processing device may include an offline model loading unit and an input data loading unit; the offline model loading unit may be configured to obtain corresponding offline models of the respective current original networks from the memory, and analyze the offline models of the current original networks; and the input data loading unit may be configured to obtain corresponding input data of the respective current original networks from the memory.

In an example of the present disclosure, the data processing device may further include an input data preprocessing unit, where the input data preprocessing unit may be configured to preprocess corresponding input data of a current original network obtained by the input data loading unit, cause the second processor to be capable of running the corresponding input data of the current original network, and store output data obtained by the second processor in the memory.

In an example of the present disclosure, the computer equipment may include an application that is capable of running on the runtime system; the data processing device may be capable of providing an offline model API and an input data API; the equipment management device may be capable of providing a second processor driving API; the task execution device may be capable of providing a second processor operation API; and the application may be capable of calling the offline model API, the input data API, the second processor driving API, and the second processor operation API.

In an example of the present disclosure, a count of the second processor may be plural, or the second processor may include a plurality of processing units; and the task execution device may further be capable of providing a task distribution API, and the application may further be capable of calling the task distribution API so as to control a plurality of the second processors or control the plurality of processing units of the second processor.

The present disclosure further provides a data processing method to be used in the computer equipment. The method may include the following steps: controlling the data processing device to obtain a corresponding offline model and input data of a current original network from the memory, where the corresponding offline model of the current original network may include corresponding model parameters and instructions of respective compute nodes of the original network as well as interface data of the respective compute nodes of the original network; controlling the second processor of the computer equipment to turn on through the equipment management device; controlling the second processor of the computer equipment to run the current original network through the task execution device according to the corresponding offline model and input data of the current original network, and obtaining output data of the current original network; and controlling the data processing device to store the output data of the current original network in the memory.

In an example of the present disclosure, the method may further include the following steps: obtaining loading progress of the corresponding offline model of the current original network in real time; and if the loading progress of the offline model of the current original network is greater than or equal to a first preset percentage, executing the step of controlling the second processor of the computer equipment to turn on.

In an example of the present disclosure, prior to the step of obtaining the corresponding offline model and input data of the current original network from the memory, the method may further include the following steps: analyzing and preprocessing the corresponding offline model of the current original network; and preprocessing the corresponding input data of the current original network.

Meanwhile, the present disclosure further provides a data processing method to be used in the computer equipment. The method may include the following steps: calling the offline model API, obtaining a corresponding offline model of a current original network, where the corresponding offline model of the current original network may include corresponding model parameters and instructions of respective compute nodes of the original network as well as interface data of the respective compute node of the original network; calling the input data API, and obtaining input data of the current original network; calling the second processor driving API, and controlling the second processor of the computer equipment to turn on; calling the second processor operation API, and controlling the second processor to obtain output data of the current original network according to the corresponding offline model and input data of the current original network; and calling the second processor driving API, and controlling the second processor to turn off.

Moreover, the present disclosure provides a computer readable storage medium with a computer program stored in. When the computer program is executed by one or more processors, the program may realize the steps mentioned in the method above.

The computer equipment, data processing method, and storage medium may be capable of directly obtaining corresponding offline model and input data of a current original network from the memory through the data processing device, so that the second processor of the computer equipment may be capable of running the current original network according to the obtained offline model and input data of the current original network, and obtaining output data of the current original network. Because the corresponding offline model of each original network may merely include corresponding model parameters and instructions of respective compute nodes of the original network as well as the interface data of the respective compute nodes, data of the offline model of the original network may be far lighter than data of the original network, so that by running the corresponding offline model (lightweight) of the current original network on the computer equipment, the processing of heavyweight neural network data by the computer equipment may be realized. Meanwhile, by directly running the corresponding offline model of the current original network on the computer equipment, there may be no need to perform processing operations such as compiling on the respective compute nodes of the current original network, so that the processing speed and efficiency of the computer equipment may be increased.

The present disclosure further provides a computer equipment including a first processor, a second processor, a first memory, and a second memory, where the first memory may store corresponding offline models and input data of a plurality of original networks and a runtime system that can run on the first processor; the second memory may store an operating system that can run on the first processor or the second processor; the runtime system may be a secure runtime system built based on a trusted operating environment, and the first memory may be a secure storage medium; when the runtime system is running on the first processor, the runtime system may be capable of obtaining a corresponding offline model and input data of a current original network from the first memory, and controlling the second processor to run the offline model of the current original network; where the corresponding offline model of the current original network may include corresponding model parameters and instructions of respective compute nodes of the original network as well as interface data of the respective compute nodes of the original network.

In an example of the present disclosure, the runtime system may include: a data processing device, which may be capable of providing an offline model API and an input data API, and may be configured to obtain a corresponding offline model and input data of a current original network from the first memory; an equipment management device, which may be capable of providing a second processor driving API, and may be configured to control the second processor to turn on or turn off; and a task execution device, which may be capable of providing a second processor operation API, and may be configured to control the second processor to run the offline model and input data of the current original network.

In an example of the present disclosure, the data processing device may include an offline model loading unit and an input data loading unit; the offline model loading unit may be capable of providing an offline API, and may be configured to obtain corresponding offline models of respective current original networks from the first memory, and analyze the offline models of the respective current original networks; and the input data loading unit may be capable of providing an input data API, and may be configured to obtain corresponding input data of the current original networks from the first memory.

In an example of the present disclosure, the data processing device may further include an input data preprocessing unit, in which the input data preprocessing unit may be capable of providing a data preprocessing API, and may be configured to preprocess the input data of the current original networks, cause the second processor to be capable of running the input data of the current original networks, and store output data obtained by the second processor in the first memory.

In an example of the present disclosure, a count of the second processor may be plural, or the second processor may include a plurality of processing units; and the task execution device may further be capable of providing a task distribution API, and may be configured to control a plurality of the second processors, or control the plurality of processing units of the second processor.

In an example of the present disclosure, the computer equipment may further include a secure application that can run on the runtime system, and the application may be capable of calling the offline model API, the input data API, the second processor driving API, and the second processor operation API.

In an example of the present disclosure, the first memory and the second memory may be physically independent of each other; or alternatively, the first memory and the second memory may be integrated as one, and the first memory and the second memory may be logically independent of each other.

The present disclosure further provides a data processing method to be used in the computer equipment. The method may include: obtaining a corresponding offline model and input data of a current original network from the first memory, where the corresponding offline model of the current original network may include corresponding model parameters and instructions of respective compute nodes of the original network as well as interface data of the respective compute nodes of the original network; controlling the second processor of the computer equipment to turn on; controlling the second processor of the computer equipment to run the current original network according to the corresponding offline model and input data of the current original network, and obtaining output data of the current original network; and storing the output data of the current original network in the first memory.

The present disclosure further provides a data processing method to be used in the computer equipment. The method may include: calling the offline model API, obtaining a corresponding offline model of a current original network from the first memory, where the corresponding offline model of the current original network may include corresponding model parameters and instructions of respective compute node of the original network as well as interface data of the respective compute nodes of the original network; calling the input data API, and obtaining input data of the current original network; calling the second processor driving API, and controlling the second processor of the computer equipment to turn on; calling the second processor operation API, and controlling the second processor to obtain output data of the current original network according to the corresponding offline model and input data of the current original network; and calling the second processor driving API, and controlling the second processor to turn off.

In an example of the present disclosure, the method may further include: calling the data preprocessing API, and storing the output data of the current original network in the first memory.

In an example of the present disclosure, after calling the input data API, and obtaining the input data of the current original network, the method may further include: calling the data preprocessing API, and preprocessing the obtained input data of the current original network so that the second processor can run the input data.

Moreover, the present disclosure provides a computer readable storage medium with a computer program stored in. When the program is executed by one or more processors, the program may realize the steps mentioned in the method above.

The computer equipment, data processing method, and storage medium are capable of directly obtaining a corresponding offline model and input data of a current original network from the first memory through the data processing device of the runtime system, so that the second processor of the computer equipment can run the current original network according to the obtained offline model and input data of the current original network. An offline model of a current original network may merely store necessary network structure information such as corresponding model parameters and instructions of respective compute nodes of the original network, as well as interface data of the respective compute nodes of the original network. Thus, data of the offline model of the original network may be far lighter than data of the current original network, so that by running the offline model of the current original network, the processing of heavyweight data such as a neural network based on a secure runtime system built in a trusted execution environment such as TEE may be realized, and the application scope of a neural network may be expanded. By directly running the corresponding offline model of the current original network on the computer equipment, there may be no need to perform processing operations such as compiling on each compute node of the current original network, so that the processing speed and efficiency of the computer equipment may be increased.

BRIEF DESCRIPTION OF THE DRAWINGS

FIG. 24 is a flowchart showing a data processing method of an example of the computer equipment in FIG. 20;

FIG. 25 is a flowchart showing a data processing method of another example of the computer equipment in FIG. 20;

FIG. 26 is a flowchart showing a method for generating an offline model in an example of the present disclosure;

FIG. 27 is a flowchart showing a method for generating an offline model in another example of the present disclosure;

DETAILED DESCRIPTION OF THE EXAMPLES

In order to make the purposes, technical schemes, and technical effects of the present disclosure clearer, examples of the present disclosure will be described hereinafter with reference to the accompanied drawings. It should be understood that the examples described herein are merely used for explaining the present disclosure, rather than limiting the present disclosure. It should be noted that, provided that there is no contradiction, the examples of the present disclosure and features of the examples can be combined with each other. It should be understood that the terms such as "first", "second" and the like used in the examples of the present disclosure are for distinguishing between different objects rather than describing any particular order or technical meaning.

Figure 1:
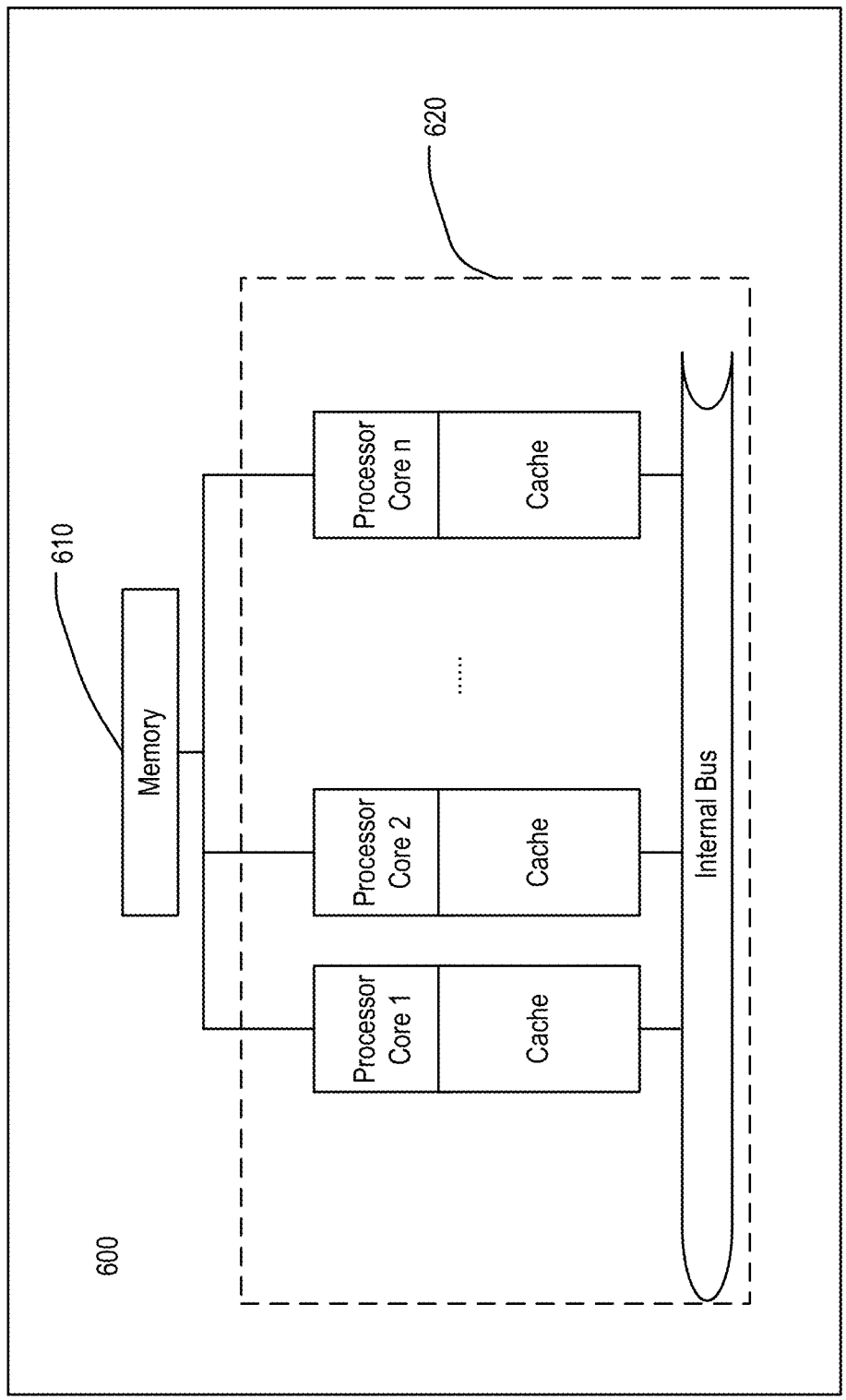
FIG. 1 is a structural diagram of a task parallel processing system according to an example of the present disclosure.

FIG. 1 is a structural diagram of a task parallel processing system 600 (referred to as a first task parallel processing system for the convenience of distinguishing) according to an example of the present disclosure. The processing system may include: a processor 620 and a memory 610, where instructions that can be executed by the processor 620 may be stored in the memory 610; and the processor 620 may include a plurality of processor cores, and the respective processor cores may be capable of communicating through an internal bus and performing different tasks. The processor cores of the processor 620 may be capable of performing a partition algorithm.

Figure 2:
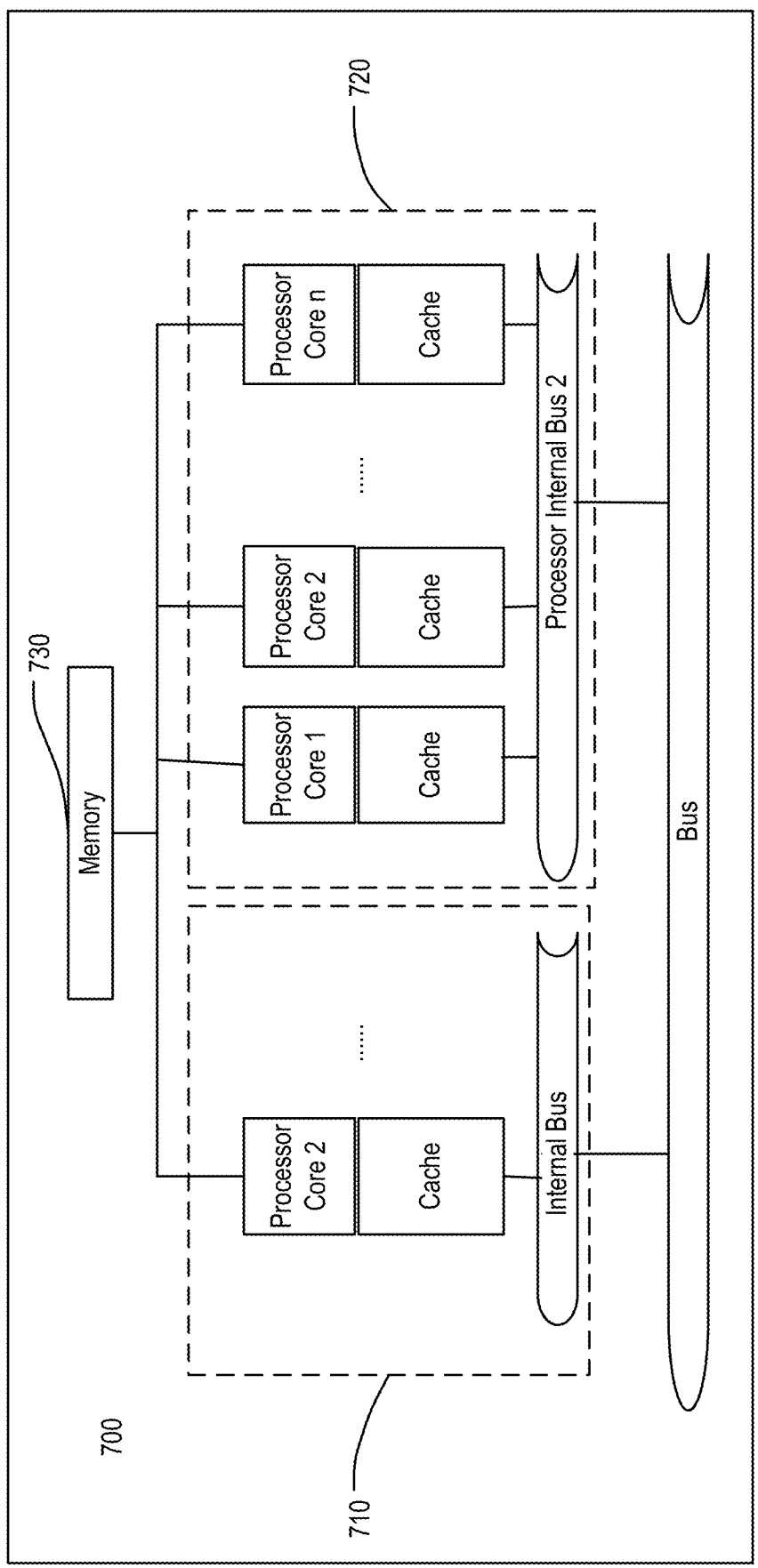
FIG. 2 is a structural diagram of a task parallel processing system according to an example of the present disclosure.

FIG. 2 is a structural diagram of another task parallel processing system 700 (referred to as a second task parallel processing system for the convenience of distinguishing) according to an example of the present disclosure. The task parallel processing system may include a first processor 710, a second processor 720, and a memory 730. Instructions that can be executed by the first processor 710 and/or the second processor 720 may be stored in the memory 730. A processor core of the first processor 710 may be capable of performing a partition algorithm; and the second processor 720 may not be capable of performing the partition algorithm. The respective processor cores of the first processor 710 and the second processor 720 may communicate with each other through an internal bus to perform different tasks. The first processor 710 and the second processor 720 may communicate with each other through a bus to work cooperatively. As an alternative example, the first processor 710 may be a multi-core processor or a single-core processor. The second processor 720 may be a multi-core processor.

Figure 3:
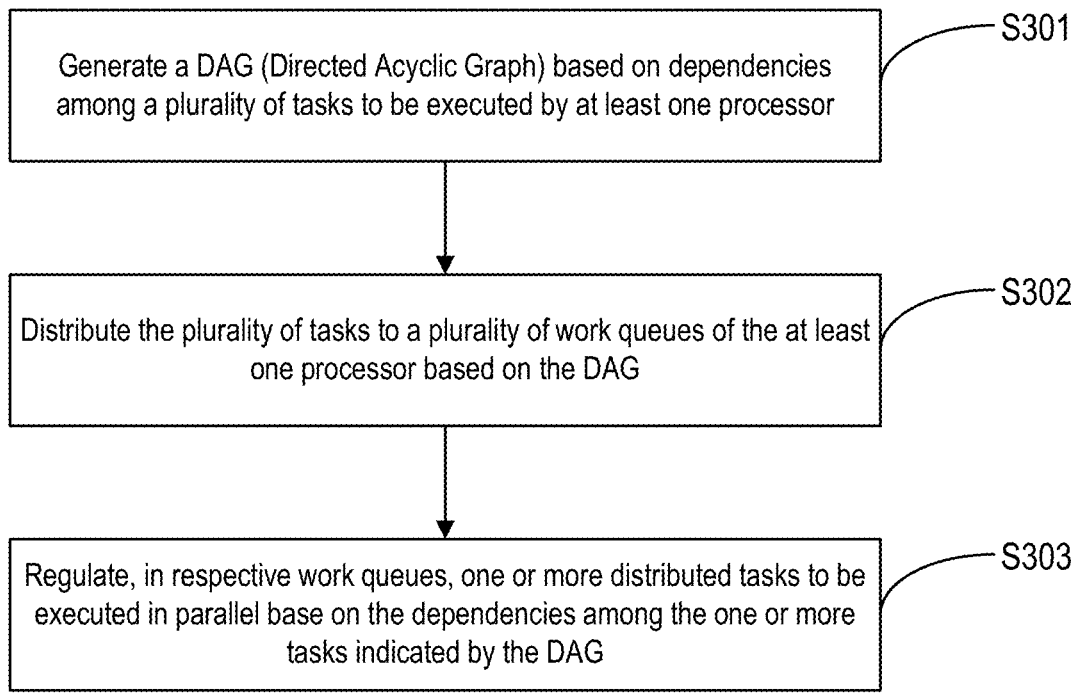
FIG. 3 a step flowchart of a task parallel processing method according to an example of the present disclosure.

FIG. 3 is a step flowchart of a task parallel processing method according to the present disclosure. The method can be applied to the task parallel processing system as shown in FIG. 1 or FIG. 2. The following steps may be stored in a form of an instruction in the memory of the above-mentioned task parallel processing system. The task parallel processing method may include:

Step S301: Generate a DAG (Directed Acyclic Graph) (also referred to as a task DAG) based on dependencies among a plurality of tasks to be executed by at least one processor.

The DAG in the present example is used for showing a driving dependencies among the tasks to be executed. DAG is a type of directed graph, and is often used for showing a driving dependencies between events and managing scheduling of tasks. Based on the features of DAG, DAG can be used for describing a logical relation between obtained tasks to be executed.

The dependencies among tasks to be executed refer to: execution of some tasks to be executed may depend on execution results of other tasks to be executed. For instance, "loading instruction A" may depend on an operation of "writing instruction A."

As an alternative example, tasks to be executed can be obtained in a way that a processor core of the processor 620 in the first task parallel processing system 600 runs a preset partition algorithm to partition a program to be executed.

As an alternative example, tasks to be executed can be obtained in a way that a processor core of the processor 710 in the second task parallel processing system 700 runs a preset partition algorithm to partition a program to be executed.

Step S301 may be performed by a processor core of the processor 620 in the first task parallel processing system 600, or by a processor core of the first processor 710 in the second task parallel processing system 700.

Step S302: Distribute the plurality of tasks to a plurality of work queues of the at least one processor based on the DAG.

The processor cores of the processor in the first task parallel processing system 600, or the processor cores of the processor in the second task parallel processing system 700 may include one or more work queues.

Work queue is a mechanism to defer execution of a task, and to sequentially run tasks to be executed that are placed in the work queue. The execution of the respective tasks to be executed in the work queue may be controlled by a kernel thread, thus, a control thread of the work queue can be adjusted through an interruption control mechanism of a processor system to reschedule the tasks and even cause the tasks to sleep.

When distributing tasks to be executed to work queues, tasks that are parallelizable should be distributed to different work queues as far as possible so that run duration of a program may be reduced. For parallel nodes of a task DAG, correlated tasks to be executed which are in downstream stages are often parallelizable, thus, the tasks to be executed may be distributed according to the task DAG.

It should be noted that, step S302 may be performed by any of the processor cores of the first task parallel processing system 600, or by any of the processor cores of the second task parallel processing system 700.

Step S303: Regulate, in respective work queues, one or more distributed tasks to be executed in parallel based on the dependencies among the one or more tasks indicated by the DAG.

Because the respective work queues run independently, if a work queue depends on an output result of a task to be executed of another work queue, an execution error may occur if the task to be executed is not scheduled. Therefore, to ensure that a program outputs a correct result, the tasks to be executed in the respective work queues may need to be regulated according to the dependencies among the tasks to be executed as shown in the task DAG so that running of the task to be executed may be controlled.

It should be noted that, the step may be performed by any of the processor cores of the first task parallel processing system 600, or by any of the processor cores of the second task parallel processing system 700. The task parallel processing method provided in the present example of the disclosure may build a task DAG according to dependencies among tasks to be executed, then distribute and control the tasks to be executed according to the task DAG. In this way, task parallelism of a multi-core processor may be realized by rescheduling work queues, which may thereby improve the efficiency of data processing. The task parallel processing method provided in the present example does not rely on architecture programs such as Tensorflow or Caffe, thus may not have problems such as interface compatibility during the designing of a program.

In an example of the present disclosure, prior to the building the task DAG according to the dependencies among the tasks to be executed, the method may include:

partitioning a program according to operation nodes and/or data nodes of the program to obtain tasks to be executed. The program to be executed may contain a plurality of operation requests (e.g., conv, pool, active, add, and the like), and the operation nodes exist between the operation requests. Thus, the tasks to be executed can be obtained by partitioning the program according to the operation nodes.

Some programs to be executed may include operation requests that need to be executed sequentially. In this case, the partitioning may be performed in a data level (code level), or be performed according to the data nodes of a program, to improve the possibility of task parallelism.

The step may need to be performed in a way that a processor core of the processor 620 in the first task parallel processing system 600, or a processor core of the first processor 710 in the second task parallel processing system 700 performs a preset partition algorithm to partition the program to be executed according to the operation nodes and/or data nodes of the program, so as to obtain tasks to be executed.

It should be explained that, when partitioning the program to be executed, the partitioning may be performed merely according to operation nodes of the program, or may be performed in a data level according to data nodes directly, or may further be performed by combining the above-mentioned two manners. Although if a program to be executed is partitioned more thoroughly, the possibility of task parallelism may become higher, yet it may be more difficult to regulate when tasks are being run in parallel. Thus, the method for partitioning a program to be executed may be decided according to actual needs, and is not restricted in the present disclosure.

In an example of the present disclosure, there are two situations when a processor core of the processor 620 in the first task parallel processing system 600, or a processor core of the first processor 710 in the second task parallel processing system 700 partitions a program to be executed according to operation nodes of the program: 1) the program may include an operation request with a model; 2) the program may include an operation request without a model.

Situation one: when the program includes an operation request without a model (e.g., pool, batchnorm, Lrn, active, add, and the like), partitioning the program according to the operation nodes of the program to obtain tasks to be executed may include:

partitioning input data and/or output data of the operation request without a model to obtain tasks to be executed.

When partitioning the input data and/or output data of the operation request without a model, the input data and/or output data may be partitioned in a height-width direction of the data (hw direction) according to a preset rule to obtain tasks to be executed.

Figure 4:
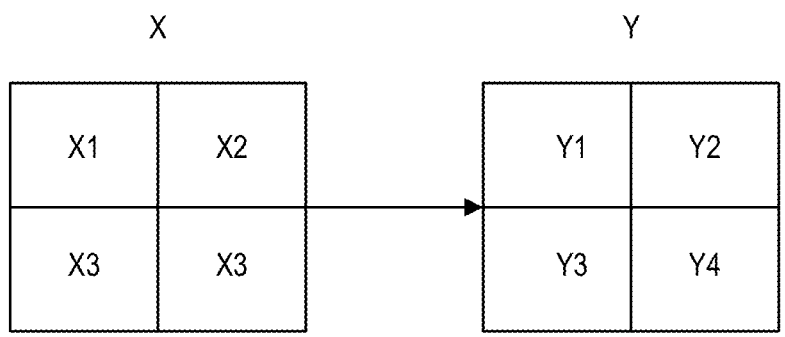
FIG. 4 is a diagram showing partitioning input data and output data of an operation request without a model according to an example of the present disclosure.

FIG. 4 is a diagram showing partitioning input data and output data of an operation request without a model in a height-width direction of the data. A preset rule for the partitioning is: equally partitioning the input data and the output data at a height-width plane.

Set output data $Y$=input data $X$, where $X=x1+x2+x3+x4$; $Y=y1+y2+y3+y4$.

It needs to be explained that, the equally partitioning the input data and the output data in the height-width direction of the data to obtain tasks to be executed is merely a specific form of partitioning input data and output data in the height-width direction of the data. In an real situation, data may also be partitioned unequally in a height-width direction of the data, or may be equally partitioned in a different manner in the height-width direction of the data. As long as input data and output data are partitioned by following a certain rule, the purpose of the present step can be realized. The present disclosure does not restrict the method of the partitioning.

It further needs to be explained that, the purpose of partitioning input data and output data in a height-width direction of data provided in the present disclosure is to obtain a plurality of tasks to be executed. As long as the input data and output data are partitioned, the purpose can be realized. Thus, when partitioning an operation request without a model to obtain tasks to be executed, the partitioning may be performed only on input data, or may be performed only on output data, or may further be performed on both input data and output data. All of the situations above can realize the purpose of the step, and the specific method for partitioning may be decided according to a specific operation and actual needs.

Situation two: when the program includes an operation request with a model (e.g., conv, mlp, and the like), the step of partitioning the program according to the operation nodes of the program to obtain tasks to be executed may include:

partitioning the model of the operation request with the model and/or partitioning input data of the model to obtain tasks to be executed.

When partitioning the model of the operation request with the model, there may be a need to preset weights corresponding to the respective tasks to be executed obtained from partitioning the model, and then to use the weights to set correspondences of input data and output data of the tasks to be executed.

When partitioning the model of the operation request with the model, the model may be partitioned in a height-width direction (height width direction, hw direction) of the model by following a preset rule to obtain tasks to be executed; the model may also be partitioned in a channel direction (C direction) of the model to obtain tasks to be executed; and the model may further be partitioned in a way by combining the two above-mentioned manners.

Additionally, it is also possible to partition input data of an operation request with a model at a hw plane to obtain tasks to be executed.

Figure 5:
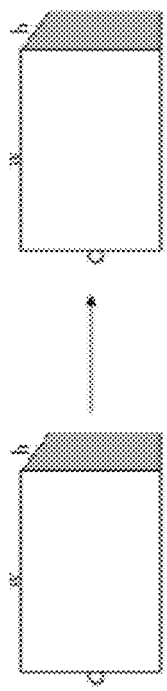
FIG. 5 is input and output diagram of a convolution operation (conv) of a neural network model according to an example of the present disclosure.
Figure 6:
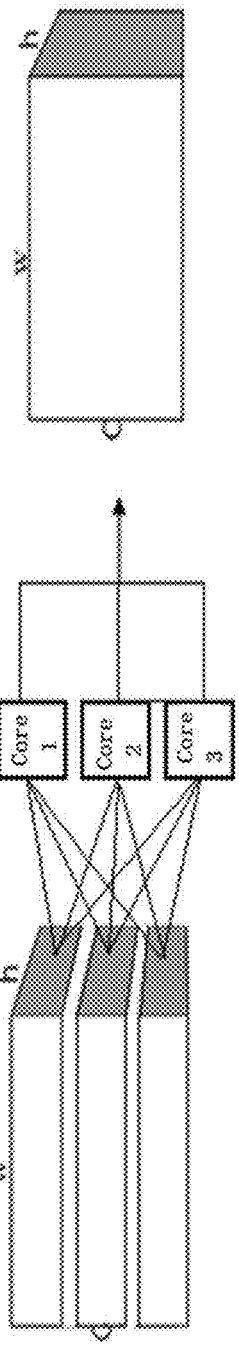
FIG. 6 is a diagram showing partitioning a conv model according to an example of the present disclosure.

FIG. 5 is input and output diagram of a convolution operation (conv) of a neural network model. FIG. 6 is a diagram showing partitioning a conv model in a channel direction.

A conv model is set by following: output data $Y$=input data $X$ to input and output. Then an mlp (multi-layer perceptron) task is partitioned into three sub-tasks in a C direction of the model. Input data X is partitioned into x1, x2, x3, and corresponding output data are y1, y2, y3.

Since the neural network has a special structure, for the partitioned input data, in addition to being processed, they may further be multiplied by a corresponding weight Si to obtain corresponding output data y1, y2, y3, where i is a partition number of X. In other word, $y1=x1*S1+x2*S2+x3*S3$; $y2=x1*S4+x2*S5+x3*S6$; $y3=x1*S7+x2*S8+x3*S9$. Finally, y1, y2, y3 may be processed by computing to obtain output data Y.

The method for partitioning input data of an operation request with a model at a hw plane is similar to the method for partitioning input data of an operation request without a model at a hw plane, which will not be described here.

It needs to be explained that, when partitioning an operation request with a model, the partitioning may be performed in a C direction of the model, or may also be performed at a hw plane of the model, or may further be performed in both the C direction of the model and at the hw plane of the model. Although a plurality of partitioning methods may contribute to a higher possibility of task parallelism and theoretically reduce run duration of the program, the difficulty of partitioning may increase as a consequence. Besides, in the practical application, actual time for running partitioned tasks to be executed may also be longer than theoretical time, thus, the method for partitioning an operation request with a model may be decided according to actual needs, and is not restricted in the present disclosure.

Using the methods for obtaining tasks to be executed provided in the two situations above may help to obtain tasks to be executed with a higher possibility of parallelism and more parallel nodes in a task DAG, which may thereby improve the operation efficiency of a program to be executed.

In an example of the present disclosure, the processor cores of the first task parallel processing system 600 or the second task parallel processing system 700 building the task DAG according to the dependencies among task to be executed may include:

determining parallel nodes and sequential nodes in the task DAG according to the dependencies among the obtained tasks to be executed; and building the task DAG according to the parallel nodes and the sequential nodes.

There may or may not be dependencies among the obtained the tasks to be executed. When two tasks to be executed have no dependency, normally the two tasks to be executed are parallel tasks; when two tasks to be executed have a dependency, normally the two tasks to be executed are serial tasks. Thus, the parallel nodes and sequential nodes of the task DAG can be determined according to the dependencies among the tasks to be executed, and the tasks can be populated at corresponding positions in the task DAG according to different types of nodes to complete the building of the task DAG.

It should be explained that, when there is a need to obtain tasks to be executed by partitioning a program to be executed, a task parallel processing system should include at least one processor that can perform a partition algorithm for partitioning the program to obtain tasks to be executed.

In an example of the present disclosure, the processor cores of the first task parallel processing system 600 or the second task parallel processing system 700 distributing the tasks to be executed to the plurality of work queues of the processor according to the task DAG may include:

Step S2021: topologically sorting the task DAG to obtain a topologically sorted sequence of the tasks.

Step S2022: sorting the obtained topologically sorted sequence according to preset execution time for the respective tasks to be executed to obtain a longest topologically sorted sequence.

Step S2023: distributing the respective tasks to be executed to the work queues according to the longest topologically sorted sequence and the dependencies among the tasks to be executed.

In the present example, when the processor cores distribute tasks, the processor cores may distribute the tasks to work queues of processor cores with a capability of performing the partition algorithm, e.g., the work queues of the processor cores of the processor 620 in the first task parallel processing system 600; and may also distribute the tasks to work queues of processor cores without a capability of performing the partition algorithm, e.g., the work queues of the processor cores of the processor 720 in the second task parallel processing system 700. As long as a processor core is capable of executing a distributed task, it may be guaranteed that a program to be executed can run in a parallel manner, at this point, whether a processor core that executes the task to be executed has the capability of performing the partition algorithm may not affect execution of the program, thus, it is not limited in the present disclosure.

The present example distributes tasks to be executed according to a longest path of the topologically sorted sequence, which may optimize execution time of a program, in other word, theoretically, execution time of tasks in the longest topologically sorted sequence is execution time of the program, which may thereby guarantee the program to be executed is executed in the shortest time.

In an example of the present disclosure, the processor cores of the first task parallel processing system 600 or the second task parallel processing system 700 regulating parallel tasks to be executed in the work queues according to the dependencies among the tasks to be executed in the task DAG may include:

Step S3031: setting reference counts for the respective tasks to be executed according to the task DAG;

Step S3032: if a depended task to be executed is already executed, modifying the reference count of a depending task to be executed;

Step S3033: if the reference count of a task to be executed reaches a preset value, controlling, in the respective work queues, tasks to be executed whose reference counts reach the preset value to start to operate.

Figure 7:
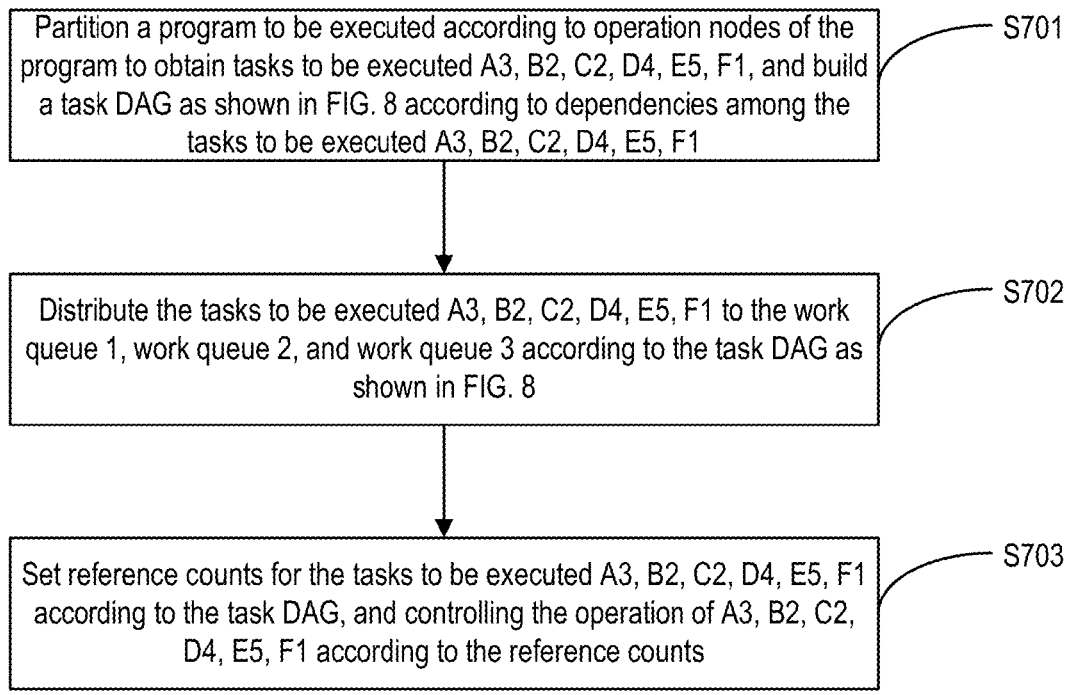
FIG. 7 is a step flowchart of a task parallel processing method according to an example of the present disclosure.
Figure 8:
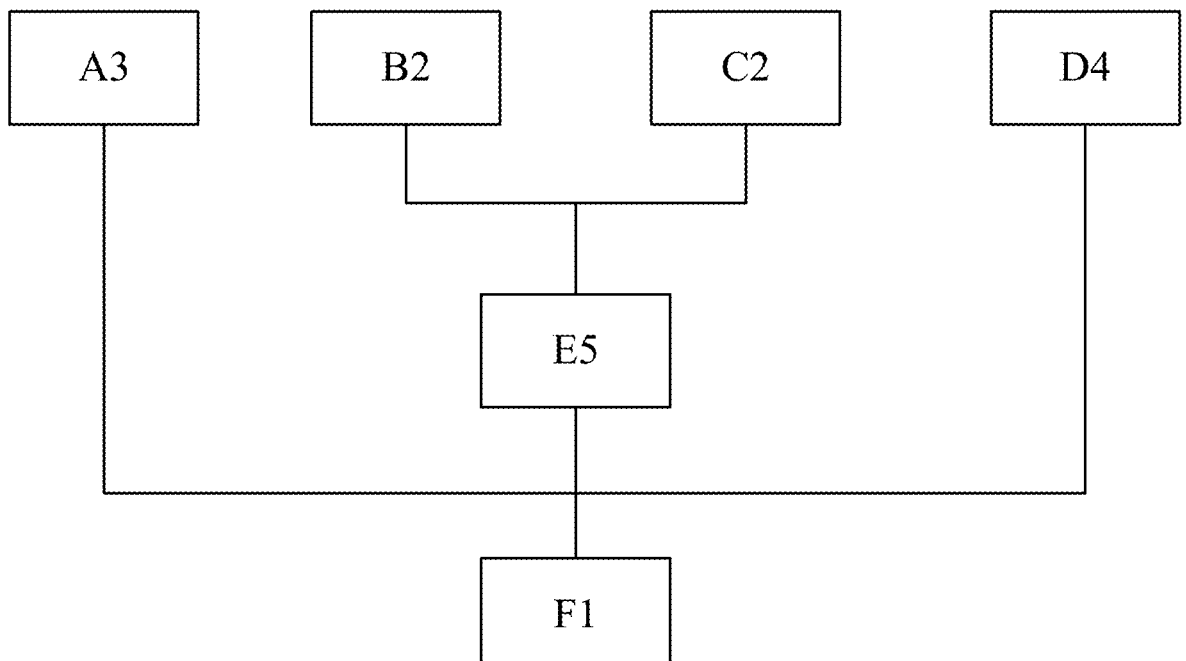
FIG. 8 shows building a task DAG (Directed Acyclic Graph) in an example of the present disclosure.

FIG. 7 is a step flowchart of a task parallel processing method. The method may include:

Step S701: partitioning a program to be executed according to operation nodes of the program to obtain tasks to be executed A3, B2, C2, D4, E5, F1, and building a task DAG as shown in FIG. 8 according to dependencies among the tasks to be executed A3, B2, C2, D4, E5, F1.

Figure 9:
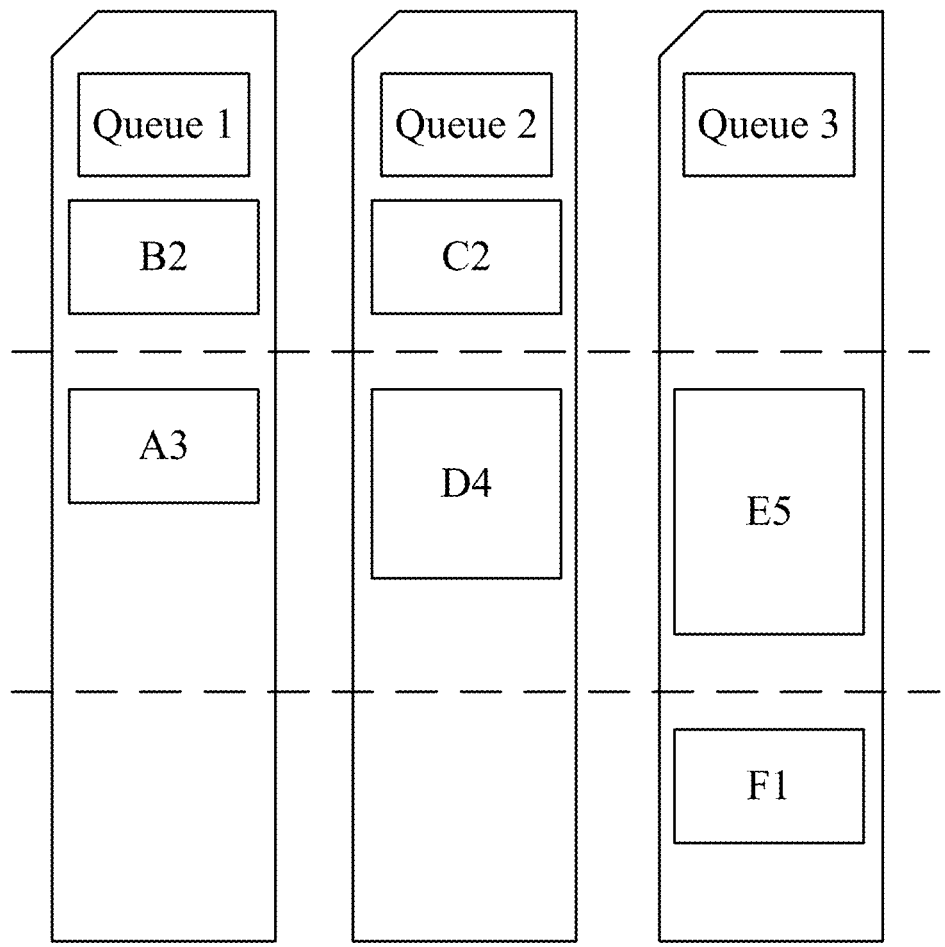
FIG. 9 is a diagram showing a result of distributing tasks to be executed in an example of the present disclosure.

Step S702: distributing the tasks to be executed A3, B2, C2, D4, E5, F1 to the work queue 1, work queue 2, and work queue 3 according to the task DAG as shown in FIG. 8. The distribution result is shown in FIG. 9.

Step S703: setting reference counts for the tasks to be executed A3, B2, C2, D4, E5, F1 according to the task DAG, and controlling the operation of A3, B2, C2, D4, E5, F1 according to the reference counts.

In the present example, it is configured that when the reference count is 0, tasks to be executed in a work queue start to operate. If the reference count of the task to be executed A3 is 0, A3 may be placed in a work queue and be executed directly; the task to be executed E5 depends on execution results of the task to be executed B2 and the task to be executed C2, therefore the reference count of E5 is set as 2. When the execution of B2 is completed, the reference count of E5 is modified into 1, and then when the execution of C2 is completed, the reference count of E5 is modified again into 0; when the reference count is 0, E5 can start to operate; the execution of the task to be executed F1 can be controlled in the similar way, and the execution of the program is finally completed.

Figure 10:
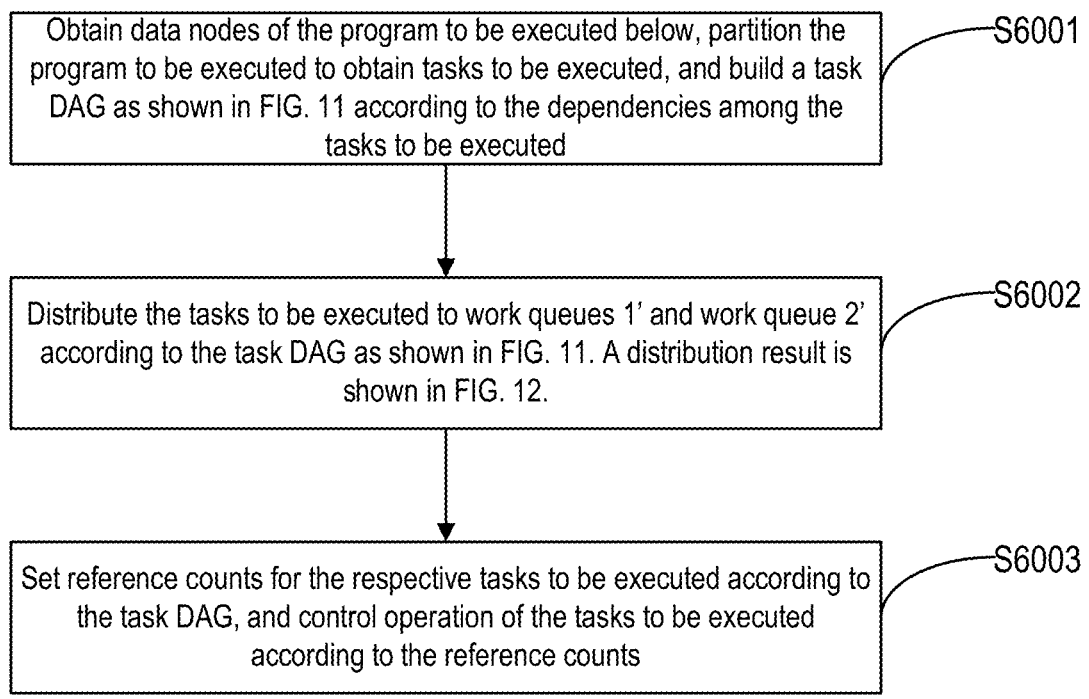
FIG. 10 is a step flowchart of a task parallel processing method according to an example of the present disclosure.
Figure 11:
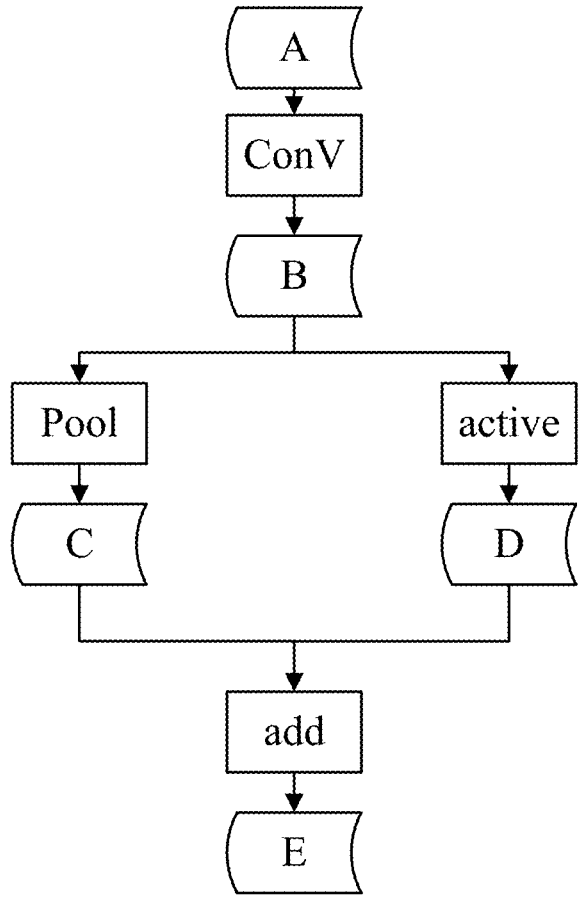
FIG. 11 shows building a task DAG (Directed Acyclic Graph) in an example of the present disclosure.

FIG. 10 is a step flowchart of a task parallel processing method. The method may include:

Step S6001: obtaining data nodes of the program to be executed below, partitioning the program to be executed to obtain tasks to be executed, and building a task DAG as shown in FIG. 11 according to the dependencies among the tasks to be executed.

B=conv (A);
C=pool (B);
D=active (B);
E=add (C, D).

A, B, C, D, E are data nodes; conv, pool, active, add are operation nodes.

In the task DAG of the present example, obtaining data E depends on processing results of data C and data D, obtaining data C and data D depends on processing result of data B, and obtaining of data B depends on processing result of data A.

Figure 12:
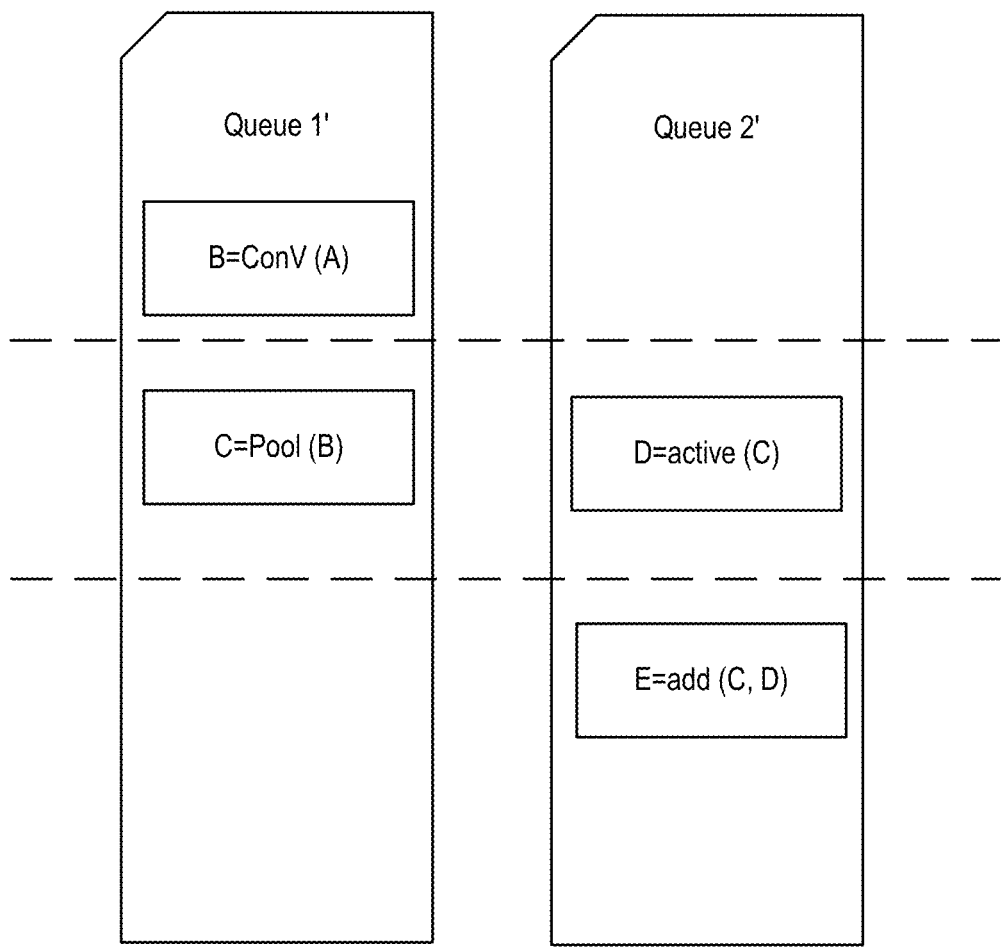
FIG. 12 is a diagram showing a result of distributing tasks to be executed in an example of the present disclosure.

Step S6002: distributing the tasks to be executed to work queue 1' and work queue 2' according to the task DAG as shown in FIG. 11. A distribution result is shown in FIG. 12.

Step S6003: setting reference counts for the respective tasks to be executed according to the task DAG, and controlling operation of the tasks to be executed according to the reference counts.

In the present example, it is configured that when the reference count is 0, tasks to be executed in a work queue start to operate; when the reference count is not 0, the tasks to be executed in the work queue are not executed. After a referred task is executed, the reference count of the task reduces by 1, and the task is not executed until the reference count reduces to 0. Initial setting: the task to be executed B=conv (A) has a reference count 0; the task to be executed C=pool (B) has a reference count 1; the task to be executed D=active (B) has a reference count 1; the task to be executed E=add (C, D) has a reference count 2. When the execution of B=conv (A) is completed, the reference counts of C=pool (B) and D=active (B) reduce by 1 to become 0, at this point, C=pool (B) and D=active (B) start to operate. Similarly, when the execution of C=pool (B) and D=active (B) is completed, the reference count of E=add (C, D) becomes 0, at this point, the task to be executed E starts to operate, and when the execution of E is completed, the execution of the program is completed.

Based on the similar concept, the present disclosure provides a computer readable storage medium with a computer program stored in. When the program is executed by a processor, the program may realize the steps mentioned in the method above.

Figure 13:
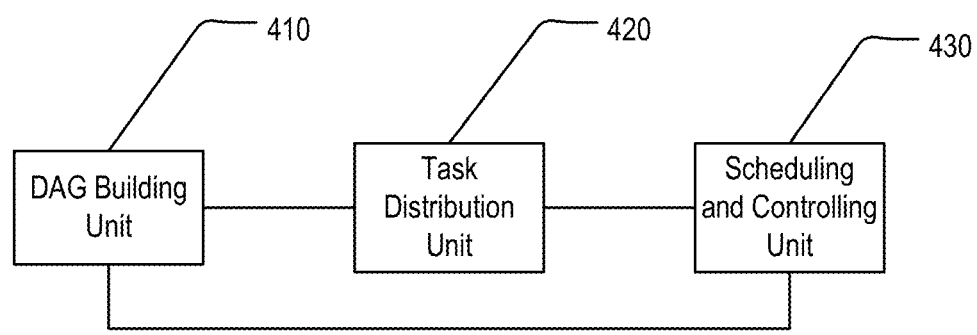
FIG. 13 is a structural diagram of a task parallel processing device according to an example of the present disclosure.

Based on the similar concept, the present disclosure further provides a task parallel processing device whose structure is as shown in FIG. 13. The device may include: a DAG building unit 410, a task distribution unit 420, and a scheduling and controlling unit 430. The DAG building unit 410 may be configured to build a task DAG according to dependencies among tasks to be executed; the task distribution unit 420 may be configured to distribute the tasks to be executed to a plurality of work queues of a processor according to the task DAG; and the scheduling and controlling unit 430 may be configured to regulate, in the respective work queues, parallel tasks to be executed to start to operate according to the dependencies among the tasks to be executed as shown in the task DAG.

In an example of the present disclosure, the DAG building unit 410 may be configured to partition a program according to operation nodes and/or data nodes of the program to obtain tasks to be executed.

In an example of the present disclosure, the DAG building unit 410 may be configured to, if the program includes an operation request with a model, partition the model of the operation request and/or partition input data of the model, to obtain tasks to be executed.

In an example of the present disclosure, the DAG building unit 410 may be configured to, if the program includes an operation request without a model, partition input data and/or output data of the operation request to obtain tasks to be executed.

In an example of the present disclosure, the DAG building unit 410 may be configured to determine parallel nodes and sequential nodes for the task DAG according to the dependencies among the obtained tasks to be executed; and build a task DAG according to the parallel nodes and sequential nodes.

In an example of the present disclosure, the task distribution unit 420 may be configured to topologically sort the task DAG to obtain a topologically sorted sequence of the tasks, sort the obtained topologically sorted sequence according to preset execution time for the respective tasks to be executed to obtain a longest topologically sorted sequence, and distribute each of the tasks to be executed to the work queues according to the longest topologically sorted sequence and the dependencies among the tasks to be executed.

In an example of the present disclosure, the scheduling and controlling unit 430 may be configured to set a reference count for each of the tasks to be executed according to the task DAG; if a depended task to be executed is already executed, the reference count of a depending task to be executed may be modified; and if the reference count of tasks to be executed reaches a preset value, tasks to be executed whose reference count reaches the preset value in each of the work queues may be controlled to start to operate.

With the description of the examples above, those skilled in the art can clearly understand that the present disclosure may be realized in hardware, and may also be realized with the support of software plus necessary universal hardware platform. Based on such understanding, the technical schemes of the present disclosure may be embodied in the form of a software product which may be stored in a nonvolatile storage medium (e.g., CD-ROM, USB flash disk, removable hard disk, and the like). The software product may include instructions that cause a computer device (which may be a personal computer, a server, or a network device, and the like) to perform methods described in the various examples of the present disclosure.

In the processing system, the processor cores of the first task parallel processing system, or the processor core of the first processor of the second task parallel processing system, can perform parallel processing on different instructions according to a corresponding instruction list to improve the processing efficiency of the computer system. However, an instruction order of a corresponding instruction list of the respective processor cores in the processing system of the computer system may be unreasonable. For instance, instructions in the instruction list are not parallelized as far as possible, which may lead to a situation that the processing efficiency of the processing system cannot be improved, or the improvement of efficiency cannot meet expectations. Thus, it has become an important issue to provide an instruction list scheduling method, device, computer equipment, and storage medium for reordering instructions of an instruction list in a more compact manner, and thereby shortening execution time of the instruction list.

Figure 14:
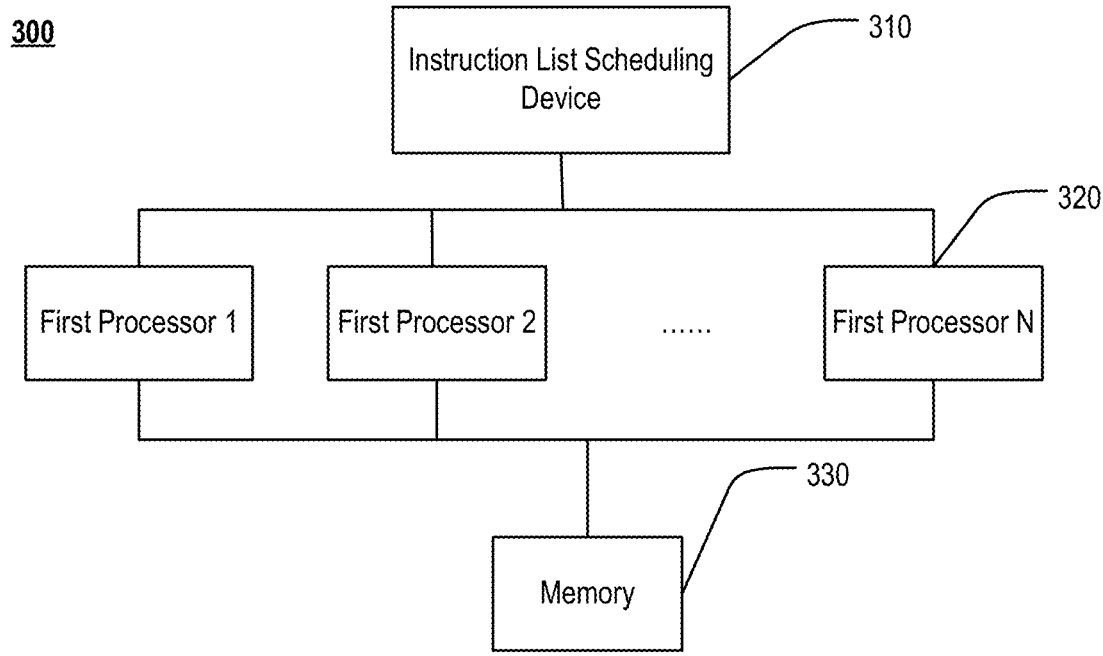
FIG. 14 is a structural diagram of a computer system according to an example of the present disclosure.

As shown in FIG. 14, a computer system 300 of an example of the present disclosure may be a multi-processor computing system that has a plurality of processors, such as multi-core processor computing system, heterogeneous computing system, and the like. Alternatively, the computer system may specifically include an instruction list scheduling device 310, a plurality of first processors 320, and a memory 330. The plurality of first processors 320 can be connected to the instruction list scheduling device 310 simultaneously, and the instruction list scheduling device 310 can be used for the instruction list rescheduling of the plurality of first processors 320. Alternatively, the instruction list scheduling device 310 may include a second processor. Alternatively, the second processor may include an obtaining unit, a data dependency analysis unit, an evaluation unit, a computation unit, a controlling unit, etc. The obtaining unit may be a hardware unit such as an IO (input/output) interface. The computation unit and the controlling unit may both be hardware units.

The plurality of first processors 320 can perform parallel processing on different instructions according to an instruction list to improve the processing efficiency of the computer system. Alternatively, an instruction list may include one or a plurality of instructions. Each instruction may include a group of reference operations for resources. By reading or executing an instruction, the resources that are referred to by the instruction may be known. In other words, when a first processor and the like execute the instruction, the processor can call the resources referred to by the instruction to realize specific operation. For instance, the instruction may be a loading instruction, a computing instruction, a storing instruction, etc., and may also be N layers of computations of a neural network, where N>0, N can be an integer or a non-integer.

Further, instructions in the instruction list may be sorted by order of execution, resources referred to by the instructions may be virtual memory objects or physical memory objects. The virtual memory objects may be memory blocks, registers, or virtual storage space of other storage devices in software logic, where the storage devices are capable of storing data. Instruction scheduling process of the present example refers to the process of reordering instructions in an instruction list with a precondition that the semantics of an initial instruction list remain the same. By doing so, instructions of the instruction list may be arranged in a more compact manner, which may shorten the execution time of the instruction list and improve the processing efficiency of the system.

For instance, an instruction list may include N instructions, where N>1, N is an integer, and the N instructions are marked as a first instruction, a second instruction, through an N instruction according to an execution order. A process of scheduling the instruction list is a process of reordering the N instructions.

Specifically, when scheduling an instruction list, the instruction list scheduling device 310 may first obtain data dependencies among instructions in the instruction list to be scheduled. Alternatively, forms of the data dependencies may include RAW (Read After Write), WAR (Write After Read), and WAW (Write After Write). Alternatively, the data dependencies may be described by using DDG (data dependency Graph). Further, the second processor of the instruction list scheduling device 310 may obtain an instruction list to be scheduled through the obtaining unit, perform data dependency analysis on the instructions in the instruction list to be scheduled through the data dependency analysis unit to obtain data dependencies among the instructions. Specifically, the data dependency analysis unit may perform resource scanning tracing on each instruction in the instruction list to be scheduled, so as to analyze the data dependencies among the instructions. In the present example, the data dependencies among the instructions refer to whether execution of a current instruction depends on an execution result of another instruction, which can be explained with a simple example: if instruction A needs to read and write data written by instruction B, the instruction A may depend on an execution result of the instruction B. Then, the obtaining unit can obtain all selection nodes of each instruction selection performed during an instruction scheduling process according to the data dependencies among the obtained instructions.

Then, through the evaluation unit, the instruction list scheduling device can determine instructions of each order in the scheduled instruction list according to all the selection nodes of corresponding orders by following a preset rule. Alternatively, through the evaluation unit, the second processor can evaluate corresponding selection nodes of a current order to obtain an evaluation result of the selection nodes of the current order, and determine the corresponding instructions of the current order according to the evaluation result. Each selection node may record corresponding sorted instructions and instruction set to be scheduled of the selection node. Alternatively, the evaluation unit may evaluate a corresponding selection node of a current order according to the priority of instructions. Alternatively, the second processor may further set the priority of instructions according to specific content and/or type of the current selection node.

Alternatively, when performing instruction scheduling, the instruction list scheduling device 310 can adjust a corresponding first processor of instructions in an instruction list to be scheduled. For instance, the first processor corresponding to the instructions to be scheduled may be determined according to the type of the instructions, or specific content of the instructions.

Figure 15:
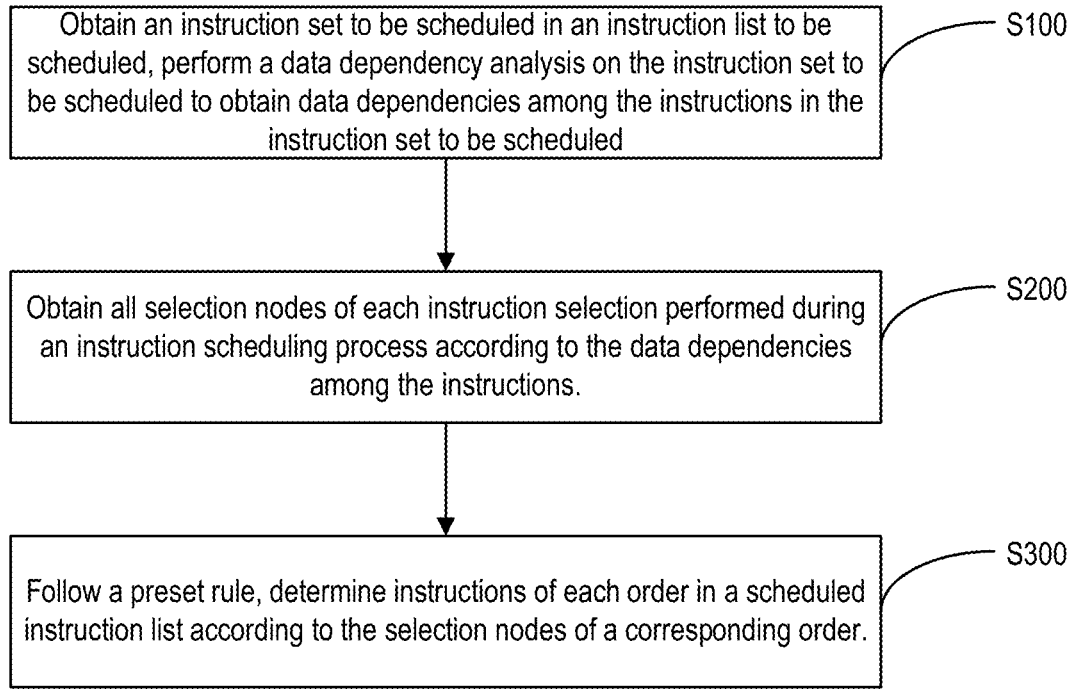
FIG. 15 is a step flowchart of an instruction list scheduling method in an example of the present disclosure.

FIG. 15 is a step flowchart of an instruction list scheduling method in an example of the present disclosure. The instruction list scheduling method may be applied to the computer system shown in FIG. 14. The computer system mentioned above may include a memory 330 and a plurality of first processors 320. The instruction list scheduling method may be used for rescheduling instructions in an instruction list corresponding to the plurality of first processors in the above-mentioned computer system, which may improve the processing efficiency of the computer. Specifically, the method above may include:

Step S100: obtaining an instruction set to be scheduled in an instruction list to be scheduled, performing a data dependency analysis on the instruction set to be scheduled to obtain data dependencies among the instructions in the instruction set to be scheduled.

Specifically, the second processor may obtain the instruction set to be scheduled in the instruction list to be scheduled through the obtaining unit of the second processor, and obtain the data dependencies among the instructions through the data dependency analysis unit. The instruction set to be scheduled in the present example may include a plurality of instructions to be scheduled in the instruction list to be scheduled. Alternatively, the instruction set to be scheduled may not include instructions without semantics in the instruction list to be scheduled (e.g., a synchronizing instruction). Further, the obtaining unit obtaining the instruction set to be scheduled in the instruction list to be scheduled may include: obtaining the instruction list to be scheduled, and deleting instructions without semantics in the instruction list to be scheduled to obtain the instruction set to be scheduled.

Figure 16:
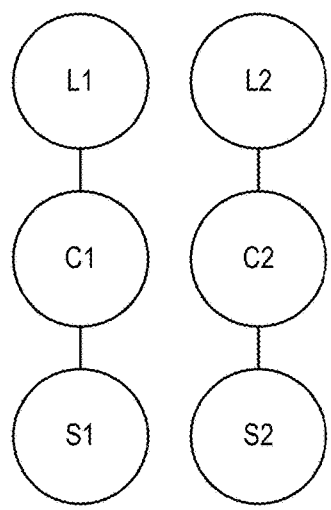
FIG. 16 shows data dependencies among instructions to be scheduled obtained in an example of the present disclosure.

For instance, an instruction set to be scheduled obtained by the obtaining unit includes six instructions {L1, L2, C1, C2, S1, S2}. L1, C1, and S1 need to be executed sequentially, L2, C2, and S2 need to be executed sequentially, and there is no data dependency among other instructions. L1, L2, S1, and S2 are I/O instructions, C1 and C2 are computing instructions. The data dependency analysis unit may perform data dependency analysis on the instructions to be scheduled to obtain data dependencies among the respective instructions in the instruction set to be scheduled, and may use the DDG (Data Dependence Graph) as shown in FIG. 16 to describe the data dependencies.

Resources referred to by the respective instructions to be scheduled in the instruction set to be scheduled may be virtual memory objects or physical memory objects. The virtual memory objects may be memory blocks, registers, or virtual storage space of other storage devices in software logic, where the storage devices may be capable of storing data.

S200: obtaining all selection nodes of each instruction selection performed during an instruction scheduling process according to the data dependencies among the instructions.

Each selection node may record sorted instructions and instruction set to be scheduled corresponding to the selection node. Alternatively, a process of obtaining all selection nodes may be: first, the second processor may obtain all first selection nodes of a first instruction selection through the obtaining unit of the second processor, which in specific, the second processor may obtain sorted instructions and instruction set to be scheduled corresponding to the respective first selection node. It should be understood that the instruction in the instruction sets to be scheduled have data dependencies. Then, the second processor may obtain all second selection nodes correlated with the first selection node through the obtaining unit according to the data dependencies among the first selection node, and the second selection nodes correspond to a second instruction selection. Third selection nodes may be obtained by repeating the step above, and similarly, N selection nodes may be obtained by repeating the step above, where N≥3, N represents a positive integer. First selection nodes obtained from the step above, second selection nodes obtained from the step above, through N selection nodes obtained from the step above, may constitute all selection nodes of each instruction selection performed.

For instance, an instruction set to be scheduled in an obtained instruction list to be scheduled includes six instructions: {L1, L2, C1, C2, S1, S2}. Data dependencies among the six instructions are shown in FIG. 16. It can be learned from FIG. 16 that L1 and L2 in the instruction set to be scheduled may be executed without depending on other instructions. Thus, a first instruction selection may be made from L1 and L2. In other words, an obtained first selection node corresponds to two situation: L1 is selected, or L2 is selected. When L1 is selected in the first instruction selection, L1 is a sorted instruction, at this point, the first selection node records the sorted instruction L1, and an instruction set to be scheduled of L1, which is {L2, C1, C2, S1, S2}, is deleted. Similarly, when L2 is selected in the first instruction selection, another first selection node is obtained, the first selection node records the sorted instruction L2, and an instruction set to be scheduled of L2, which is {L1, C1, C2, S1, S2}, is deleted. A second selection node of a second instruction selection may be obtained by repeating the process above, through a sixth selection node of a sixth instruction selection may be obtained.

Figure 17:
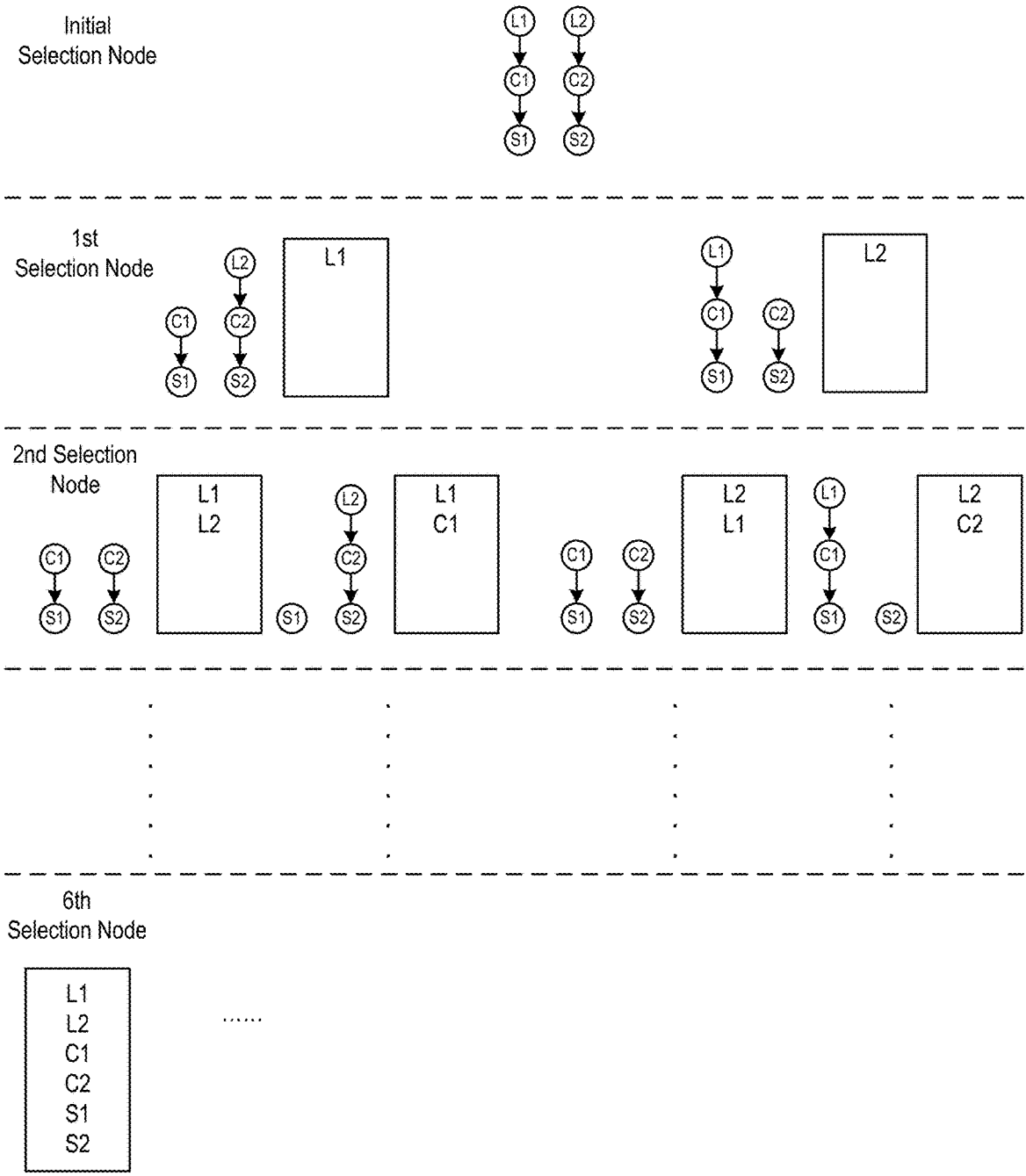
FIG. 17 is an association graph of selection nodes obtained in an example of the present disclosure.

When each instruction selection performed during the present step, it needs to be performed according to an instruction set to be scheduled obtained from a previous instruction selection. Taking an instruction set to be scheduled corresponding to FIG. 16 as an instance, when L1 is an instruction selected in a first instruction selection (corresponding to a first selection node of the first instruction selection), an instruction set to be scheduled which is {L2, C1, C2, S1, S2} is obtained, the instructions L2 and C1 in the instruction set to be scheduled can be performed without depending on other instructions, at this point, a second instruction selection needs to be performed by selecting from L2 and C1 (two second selection nodes exist correspondingly); when L2 is an instruction selected in the first instruction selection (corresponding to another first selection node of the first instruction selection), an instruction set to be scheduled which is {L1, C1, C2, S1, S2} is obtained, the instructions L1 and C2 in the instruction set to be scheduled can be performed without depending on other instructions, at this point, the second instruction selection needs to be performed by selecting from L1 and C2 (two second selection nodes exist correspondingly). It can be learned that correlations may exist among all selection nodes, the correlations of the respective selection nodes is shown in FIG. 17.

S300: following a preset rule, determining instructions of each order in a scheduled instruction list according to the selection nodes of a corresponding order. Alternatively, through the evaluation unit, the second processor can evaluate corresponding selection nodes of a current order to obtain an evaluation result of the respective selection nodes of the current order, and determine corresponding instructions of the current order according to the evaluation result. For instance, when the current order is a second instruction, which corresponds to a second selection node in FIG. 17, four second selection nodes in FIG. 17 may be evaluated according to the preset rule, and a second instruction in the scheduled instruction list may be obtained according to the evaluation result. Alternatively, the evaluation unit may evaluate a selection node corresponding to the current order according to preset priority of each instruction (for instance, L2 has highest priority, C1 has second highest priority . . . ), then obtain an evaluation result. Alternatively, the second processor may set priority of each instruction according to specific content and/or type of the instruction of the current selection node.

Alternatively, the evaluation unit can determine instructions of a corresponding current order according to corresponding shortest execution time of all selection nodes of the current order. For instance, in FIG. 17, for a first selection node corresponding to the instruction L1, corresponding shortest execution time of the first selection node is $t_1$, for a first selection node corresponding to the instruction L2, corresponding shortest execution time of the first selection node is $t_2$, $t_1 > t_2$, then L2 is determined as a first instruction of a scheduled instruction list. Similarly, a second instruction, a third instruction, through a sixth instruction of the scheduled instruction list may be obtained.

The instruction list scheduling method provided in the example may obtain all selection nodes of each instruction selection performed during an instruction scheduling process according to data dependencies among instructions to be scheduled, and then to determine instructions of each order in a scheduled instruction list according to an evaluation result of the selection nodes of each order. The method may guarantee that for each instruction selection, an instruction selected is an optimal result for a current state. With a scheduled instruction list obtained by using the optimal results, instructions may be sorted in a more compact manner, which may thereby shorten execution time of an instruction sequence of an initial instruction list.

As an alternative example, the following the preset rule, by the evaluation unit, determining instructions of each order in a scheduled instruction list according to selection nodes of corresponding orders may include:

step a: accessing the selection nodes, by the evaluation unit, and obtaining corresponding longest execution time of a currently accessed selection node. The selection nodes accessed by the evaluation unit may be a first selection node, a second selection node, through an $N^{th}$ selection node.

step b: if the longest execution time corresponding to the currently accessed selection node is shorter than initial execution time $T_0$, determining a sorted instructions of the currently accessed selection node as corresponding instructions in the scheduled instruction list; the initial execution time is execution time of the instruction sequence of the instruction list to be scheduled.

In the present step, the longest execution time corresponding to the currently accessed selection node refers to execution time of the instruction sequence corresponding to the currently accessed node when the instruction sequence is sorted in a most unreasonable manner. For instance, in FIG. 17, longest execution time of a first second selection node on the left side is $T_1 = t_1 + t_2 + t_3 + t_4 + t_5$, in which $t_1$ is the execution time of sorted instructions L1-L2, $t_2$ is the execution time of instruction C1, $t_3$ is the execution time of instruction S1, $t_4$ is the execution time of instruction C2, and is $t_5$ the execution time of instruction S2. The above is a case when unsorted instructions corresponding to the selection node C1, C2, S1, S2 are not parallel at all, and the order of the instructions is the most unreasonable. If $T_1 < T_0$, L1 and L2 are respectively used as a first instruction and a second instruction of the scheduled instruction list.

Since the longest execution time corresponding to the currently accessed selection node is shorter than the initial execution time, execution time of an instruction sequence obtained by using the instruction list scheduling method provided in the example may not be longer than the execution time of an instruction sequence in the instruction list to be scheduled.

An evaluation unit of the example may follow a preset rule to access a selection node, and may not schedule instructions in the instruction list only according to a selection node of a current order. Thus, a certain instruction of a current order may not influence a selection of following instructions. The method may be particularly suitable for scheduling an instruction list that has instructions requiring a large amount of computation, alternatively, for an instruction list that includes neural network operation instructions. For instance, an instruction list includes N instructions. The N instructions include a weight loading instruction A and a neural network convolutional layer operating instruction B. A traditional method may fail to make the instruction A and the instruction B parallel, and may fail to make a system realize a highest processing efficiency. The instruction list scheduling method of the example may make the instruction A and the instruction B parallel in the scheduled instruction list.

In an example of the present disclosure, the method above may further include: when the corresponding longest execution time of the currently accessed selection node is shorter than the initial execution time, the initial execution time may be updated as the longest execution time of the currently accessed selection node. For instance, in the example above, when $T_1<T_0$, L1 and L2 are respectively used as a first instruction and a second instruction of the scheduled instruction list, and $T_1$ is updated as the initial execution time in the meantime.

It should be understood that when the longest execution time corresponding to the currently accessed selection node is shorter than the initial execution time. By determining corresponding sorted instructions of the currently accessed selection node as instructions of a corresponding order in the scheduled instruction list, it may be guaranteed that the execution time of the instruction sequence in the obtained scheduled instruction list is shorter. A purpose of the above-mentioned scheme of updating the initial execution time is further improving instruction sorting and increasing processing efficiency of the system.

As an alternative example, the accessing the selection nodes, by the evaluation unit, and obtaining the corresponding longest execution time of the currently accessed selection node may include:

accessing the selection nodes in a preset accessing time period and obtaining the corresponding longest execution time of each selection node in the preset accessing time period. In the present example, instructions of each order of the scheduled instruction list may need to be decided by combining the method of the above-mentioned example.

Normally, an instruction list may include a plurality of instructions to be scheduled. A count of selection nodes obtained according to the instructions to be scheduled is huge. Therefore, in practice, there may not be enough time to traverse all selection nodes. The instruction list scheduling method of the present disclosure aims to further shorten the execution time of an instruction list by rearranging instructions in the instruction list. Based on this, as long as a new instruction list obtained by using the instruction list scheduling method of the disclosure shortens the execution time, the purpose of the disclosure may be realized. Thus, when using the instruction list scheduling method of the disclosure to rearrange instructions in practice, normally, the accessing time period may be set and scheduling time of instructions may be controlled according to actual needs.

As an alternative example, if longest execution time corresponding to a currently accessed selection node is not shorter than initial execution time, an instruction sequence of an instruction list to be scheduled may be determined as an instruction sequence of the scheduled instruction list.

In the present example, when the longest execution time corresponding to the currently accessed selection node is not shorter than the initial execution time, determining the instruction sequence of the instruction list to be scheduled as the instruction sequence of the scheduled instruction list is to optimize the instruction list scheduling method of the disclosure. It may be guaranteed that the instruction sequence in the obtained scheduled instruction list is an optimal result obtained in a preset time period.

As an alternative example, the accessing the selection nodes and obtaining the corresponding longest execution time of the currently accessed selection node may include:

step c: obtaining, by the evaluation unit, corresponding shortest execution time of the currently accessed selection node.

step d: if the corresponding shortest execution time of the currently accessed selection node is longer than the initial execution time $T_0$, terminating the accessing to selection nodes that are correlated with the currently accessed selection node. For instance, shortest execution time of a second selection node corresponding to the instruction L2 is $T_2$. $T_2$ corresponds to a situation where unsorted instructions C1, C2, S1, S2 corresponding to the selection node are perfectly parallel and are sorted in a most reasonable manner. If $T_2>T_0$, accessing to a third selection node correlated to the second selection node may be terminated, accessing to a fourth selection node correlated to the third selection node may be terminated . . . , and accessing to a sixth selection node correlated to a fifth selection node may be terminated.

Since the evaluation unit consumes time to visit a selection node, the technical scheme of the example may improve the efficiency of instruction list scheduling by excluding invalid selection node accessing.

As an alternative example, the accessing the selection nodes, by the evaluation unit, and obtaining the corresponding longest execution time of the currently accessed selection node may include: following a random first rule (e.g., Monte Carlo Tree Search) to search the selection nodes for accessing, and obtaining the corresponding longest execution time of the currently accessed selection node.

As an alternative example, the accessing the selection nodes, by the evaluation unit, and obtaining the corresponding longest execution time of the currently accessed selection node may include: following a rule of BFS (Breadth First Search) to search the selection nodes for accessing, and obtaining the corresponding longest execution time of the currently accessed selection node. Specifically, the BFS in the example refers to: a selection node that is in the same order as the currently accessed selection node may be selected for accessing first. For instance, the currently accessed selection node is a second selection node, then another second selection node may be selected as a next selection node for accessing first.

As an alternative example, the accessing the selection nodes, by the evaluation unit, and obtaining the corresponding longest execution time of the currently accessed selection node may include: following a rule of DFS (Depth First Search) to search the selection nodes for accessing, and obtaining the corresponding longest execution time of the currently accessed selection node. Specifically, the DFS in the example refers to: a selection node that is in a next order correlated with the currently accessed selection node may be selected for accessing first. For instance, the currently accessed selection node is a second selection node, then a third selection node correlated with the second selection node may be selected as a next selection node for accessing first.

Alternatively, the evaluation unit may also adopt a rule that combines the random first rule and the DFS rule to search the selection nodes for accessing, or adopt a rule that combines the BFS rule and the DFS rule to search the selection nodes for accessing. Specifically, the evaluation unit may follow the BFS rule or the random first rule to search the selection nodes that are shorter than a preset order for accessing, and obtain the corresponding longest execution time of the currently accessed selection node; the evaluation unit may follow the DFS rule to search the selection nodes that are not shorter than a preset order for accessing, and obtain the corresponding longest execution time of the currently accessed selection node. Alternatively, a preset value corresponding to the order may be determined according to an empirical value or a result of a pre-experiment.

When scheduling an instruction list during an accessing time period, the evaluation unit of the instruction list scheduling device may not have enough time to traverse all selection nodes. At this point, merely adopting the DFS rule or the BFS rule to search selection nodes for accessing may lead to a situation that only limited selection nodes are accessed (e.g., only selection nodes that are correlated with a certain selection node are accessed, or only selection nodes of first several orders are accessed), whereas merely adopting the random first rule to search selection nodes for accessing may lead to a situation that selection nodes that are accessed have strong randomness. Thus, a scheme that combines the random first rule and the DFS rule to search the selection nodes for accessing, or a scheme that combines the BFS first rule and the DFS rule to search the selection nodes for accessing, may be adopted.

It should be understood that although each step of the flowchart is shown according to the direction of arrows, yet these steps may not necessarily be performed by following the order indicated by the arrows. Unless clearly stated herein, the order for performing these steps is not strictly prescribed, and these steps may be performed in a different order. Additionally, at least part of the steps of the flowchart may include a plurality of sub-steps or a plurality of phases. These sub-steps or phases may not necessarily be performed and completed at the same time, instead, these sub-steps or phases may be performed at a different time. These sub-steps or phases may not necessarily be performed in a sequence either, instead, these sub-steps or phases may be performed in turn or alternately with at least part of other steps, or sub-steps of other steps, or phases.

Figure 18:
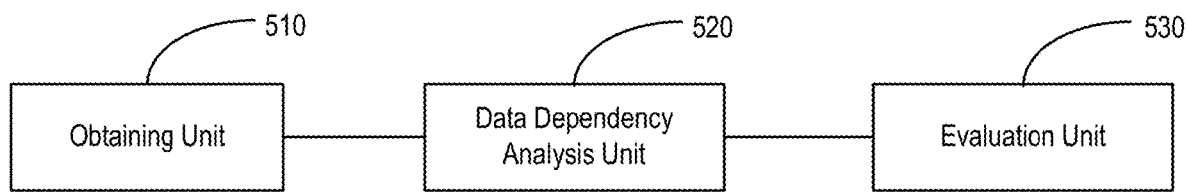
FIG. 18 is a structural diagram of an instruction list scheduling device according to an example of the present disclosure.

FIG. 18 is a structural diagram of the instruction list scheduling device according to an example of the present disclosure. The device may include an obtaining unit 510, a data dependency analysis unit 520, and an evaluation unit 530. The obtaining unit 510 may be configured to obtain an instruction set to be scheduled in an instruction list to be scheduled, and obtain all selection nodes of each instruction selection performed during an instruction scheduling process according to data dependencies among the instructions. The data dependency analysis unit 520 may be configured to perform a data dependency analysis on the instruction set to be scheduled to obtain the data dependencies among the instructions in the instruction set to be scheduled. The evaluation unit 530 may be configured to follow a preset rule to determine instructions of each order in the scheduled instruction list according to the selection nodes of corresponding orders.

In an example of the present disclosure, the evaluation unit 530 may access the selection nodes and obtain longest execution time corresponding to a currently accessed selection node; if the corresponding longest execution time of the currently accessed selection node is shorter than initial execution time, sorted instructions of the currently accessed selection node may be determined as instructions of a corresponding order in the scheduled instruction list; and the initial execution time is the execution time for an instruction sequence of the instruction list to be scheduled.

In an example of the present disclosure, the instruction scheduling device may further include an updating unit. The updating unit may be configured to update the initial execution time as the longest execution time of the currently accessed selection node if the corresponding longest execution time of the currently accessed selection node is shorter than the initial execution time.

In an example of the present disclosure, the evaluation unit 530 may be configured to access the selection nodes in a preset accessing time period, and obtain the longest execution time corresponding to the currently accessed selection node; if the longest execution time corresponding to the currently accessed selection node is shorter than the initial execution time, the evaluation unit 530 may determine corresponding sorted instructions of the currently accessed selection node as instructions of a corresponding order in the scheduled instruction list; and the initial execution time is the execution time for the instruction sequence of the instruction list to be scheduled.

In an example of the present disclosure, the evaluation unit 530 may be configured to determine the instruction sequence of the instruction list to be scheduled as an instruction sequence of the scheduled instruction list if the longest execution time corresponding to the currently accessed selection node is not shorter than the initial execution time.

In an example of the present disclosure, the evaluation unit 530 may follow the random first rule to search the selection nodes for accessing, and obtain the longest execution time corresponding to the currently accessed selection node.

In an example of the present disclosure, the evaluation unit 530 may follow the BFS rule to search the selection nodes for accessing, and obtain the longest execution time corresponding to the currently accessed selection node.

In an example of the present disclosure, the evaluation unit 530 may follow the DFS rule to search the selection nodes for accessing, and obtain the longest execution time corresponding to the currently accessed selection node.

In an example of the present disclosure, the evaluation unit 530 may follow the BFS rule or the random first rule to search the selection nodes that are shorter than a preset order for accessing, and obtain the corresponding longest execution time of the currently accessed selection node; and the evaluation unit 530 may follow the DFS rule to search the selection nodes that are not shorter than a preset order for accessing, and obtain the corresponding longest execution time of the currently accessed selection node.

In an example of the present disclosure, the evaluation unit 530 may be configured to obtain shortest execution time corresponding to the currently accessed selection node; if the corresponding shortest execution time of the currently accessed selection node is longer than the initial execution time, the evaluation unit 530 may terminate the accessing to selection nodes that are correlated with the currently accessed selection node; the initial execution time is the execution time for the instruction sequence of the instruction list to be scheduled.

In an example of the present disclosure, the evaluation unit 530 may be configured to evaluate all corresponding selection nodes of a current order according to preset priority of instructions, obtain an evaluation result of the selection nodes of the current order, and determine corresponding instructions of the current order according to the evaluation result.

In an example of the present disclosure, the evaluation unit 530 may be configured to set priority of instructions according to the specific content and/or type of the current selection node.

In an example of the present disclosure, the evaluation unit 530 may be configured to determine corresponding instructions of a current order according to corresponding shortest execution time of all selection nodes of the current order.

A detailed description of the instruction list scheduling device can be found in the description of the instruction list scheduling method mentioned above, and will not be repeated herein. Each of the units in the instruction list scheduling device above may be wholly or partially implemented through software, hardware, and a combination of software and hardware. Each of the units may be embedded or independently arranged in a processor of a computer equipment in a form hardware, and may also be stored on a memory of the computer equipment in a form of software, so that the processor may call and perform corresponding operation of the respective units.

Figure 19:
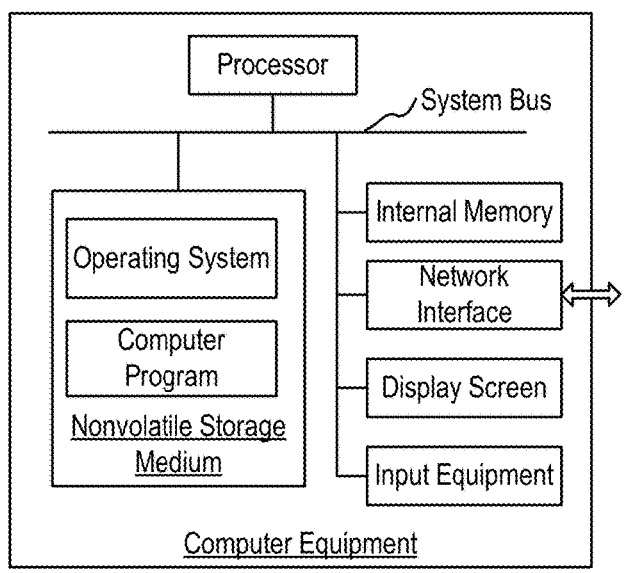
FIG. 19 is an internal structural diagram of a computer equipment according to an example of the present disclosure.

An example provides a computer equipment which may be a terminal whose internal structure may be a structure as shown in FIG. 19. The computer equipment may include a processor, a memory, a network interface, a display screen, and an input equipment which may be connected by a system bus. The processor of the computer equipment may be configured to provide computing and controlling capabilities. The memory of the computer equipment may include a nonvolatile storage medium and an internal memory. The nonvolatile storage medium may have an operating system and a computer program. The internal memory may provide an environment for the running of the operating system and the computer program in the nonvolatile storage medium. The network interface of the computer equipment may be configured to communicate with an external terminal via a network. When the computer program is executed by the processor, the computer program may realize the generation method of validation excitation and/or the method of chip verification mentioned in the example above. The display screen of the computer equipment may be a liquid crystal display screen or an electronic ink display screen. The input equipment of the computer equipment may be a touch surface layered on the display screen, and may be a button, a trackball, or a touch pad arranged on a case of the computer equipment, and may further be a keyboard, a touch pad, and a mouse externally connected to the computer equipment.

Those skilled in the art can understand that the structure shown in FIG. 19 is merely a block diagram of part of the structure related to the present disclosure, and is not considered to be a limit on the scope of the computer equipment with a scheme of the present disclosure applied in. The computer equipment may specifically include more or fewer components than the components shown in the figure, or may combine some components, or may have a different layout of components.

An example provides a computer equipment including a memory, a processor, and a computer program that are stored in the memory and can run on the processor. When the processor executes the computer program, the processor may realize the following steps: obtaining an instruction set to be scheduled in an instruction list to be scheduled, performing data dependency analysis on the instruction set to be scheduled to obtain data dependencies among the instructions; obtaining all selection nodes of each instruction selection performed during an instruction scheduling process according to the data dependencies among the instructions; and following a preset rule, determining instructions of each order in the scheduled instruction list according to selection nodes of a corresponding order.

In an example, when the processor executes the computer program, the processor may further realize the following steps: accessing the selection nodes and obtaining longest execution time corresponding to a currently accessed selection node; if the corresponding longest execution time of the currently accessed selection node is shorter than initial execution time, determining sorted instructions of the currently accessed selection node as instructions of a corresponding order in the scheduled instruction list; and the initial execution time is the execution time of an instruction sequence of the instruction list to be scheduled.

In an example, when the processor executes the computer program, the processor may further realize the following steps: if the corresponding longest execution time of the currently accessed selection node is shorter than the initial execution time, updating the initial execution time as the longest execution time of the currently accessed selection node.

In an example of the present disclosure, when the processor executes the computer program, the processor may further realize the following steps: if the longest execution time corresponding to the currently accessed selection node is shorter than the initial execution time, randomly generating an instruction sequence according to the sorted instructions of the currently accessed selection node, and using the randomly generated instruction sequence to update the instruction sequence of the instruction list to be scheduled.

In an example, when the processor executes the computer program, the processor may further realize the following steps: accessing the selection nodes in a preset accessing time period and obtaining the longest execution time corresponding to the currently accessed selection node; if the corresponding longest execution time of the currently accessed selection node is shorter than the initial execution time, determining the sorted instructions corresponding to the currently accessed selection node as instructions of a corresponding order in the scheduled instruction list; and the initial execution time is the execution time for the instruction sequence of the instruction list to be scheduled.

In an example, when the processor executes the computer program, the processor may further realize the following steps: following the BFS rule to search the selection nodes for accessing, and obtaining the longest execution time corresponding to the currently accessed selection node.

In an example, when the processor executes the computer program, the processor may further realize the following steps: following the random first rule to search the selection nodes for accessing, and obtaining the longest execution time corresponding to the currently accessed selection node.

In an example, when the processor executes the computer program, the processor may further realize the following steps: following the BFS rule to search the selection nodes for accessing, and obtaining the longest execution time corresponding to the currently accessed selection node.

In an example, when the processor executes the computer program, the processor may further realize the following steps: following the BFS rule or the random first rule to search the selection nodes that are shorter than a preset order for accessing, and obtaining the corresponding longest execution time of the currently accessed selection node; following the DFS rule to search the selection nodes that are not shorter than the preset order for accessing, and obtaining the corresponding longest execution time of the currently accessed selection node.

In an example, when the processor executes the computer program, the processor may further realize the following steps: obtaining shortest execution time corresponding to the currently accessed selection node; if the corresponding shortest execution time of the currently accessed selection node is longer than the initial execution time, terminating the accessing to selection nodes that are correlated with the currently accessed selection node; and the initial execution time is the execution time for the instruction sequence of the instruction list to be scheduled.

In an example, when the processor executes the computer program, the processor may further realize the following steps: evaluating all the corresponding selection nodes of a current order according to preset priority of instructions, obtaining an evaluation result of the selection nodes of the current order, and determining corresponding instructions of the current order according to the evaluation result.

In an example, when the processor executes the computer program, the processor may further realize the following steps: setting priority of instructions according to the specific content and/or type of the current selection node.

In an example, when the processor executes the computer program, the processor may further realize the following steps: determine corresponding instructions of the current order according to the corresponding shortest execution time of all selection nodes of the current order.

An example provides a computer readable storage medium. A computer program may be stored in the medium. When a processor executes the computer program, the following steps may be realized: obtaining an instruction set to be scheduled in an instruction list to be scheduled, performing data dependency analysis on the instruction set to be scheduled to obtain data dependencies among the instructions; obtaining all selection nodes of each instruction selection performed during an instruction scheduling process according to the data dependencies among the instructions; and following a preset rule, determining instructions of each order in the scheduled instruction list according to selection nodes of a corresponding order.

In an example, when the processor executes the computer program, the following steps may be realized: accessing the selection nodes and obtaining longest execution time corresponding to a currently accessed selection node; if the corresponding longest execution time of the currently accessed selection node is shorter than initial execution time, determining sorted instructions of the currently accessed selection node as instructions of a corresponding order in the scheduled instruction list; and the initial execution time is the execution time for an instruction sequence of the instruction list to be scheduled.

In an example, when the processor executes the computer program, the following steps may be realized: when the corresponding longest execution time of the currently accessed selection node is shorter than the initial execution time, updating the initial execution time as the longest execution time of the currently accessed selection node.

In an example, when the processor executes the computer program, the following steps may be realized: accessing the selection nodes in a preset accessing time period, and obtaining longest execution time corresponding to the currently accessed selection node; if the longest execution time corresponding to the currently accessed selection node is shorter than the initial execution time, determining corresponding sorted instructions of the currently accessed selection node as instructions of a corresponding order in the scheduled instruction list; and the initial execution time is the execution time for an instruction sequence of the instruction list to be scheduled.

In an example of the present disclosure, when the processor executes the computer program, the following steps may be realized: if longest execution time corresponding to the currently accessed selection node is not shorter than the initial execution time, determining the instruction sequence of the instruction list to be scheduled as an instruction sequence of the scheduled instruction list.

In an example of the present disclosure, when the processor executes the computer program, the following steps may be realized: following the random first rule to search the selection nodes for accessing, and obtaining the longest execution time corresponding to the currently accessed selection node.

In an example of the present disclosure, when the processor executes the computer program, the following steps may be realized: following the DFS rule to search the selection nodes for accessing, and obtaining the longest execution time corresponding to the currently accessed selection node.

In an example of the present disclosure, when the processor executes the computer program, the following steps may be realized: following the BFS rule to search the selection nodes for accessing, and obtaining the longest execution time corresponding to the currently accessed selection node.

In an example of the present disclosure, when the processor executes the computer program, the following steps may be realized: following the BFS rule or the random first rule to search the selection nodes that are shorter than a preset order for accessing, and obtaining the corresponding longest execution time of the currently accessed selection node; following the DFS rule to search the selection nodes that are not shorter than the preset order for accessing, and obtaining the corresponding longest execution time of the currently accessed selection node.

In an example of the present disclosure, when the processor executes the computer program, the following steps may be realized: obtaining shortest execution time corresponding to the currently accessed selection node; if the corresponding shortest execution time of the currently accessed selection node is longer than the initial execution time, terminating the accessing to selection nodes that are correlated with the currently accessed selection node; and the initial execution time is the execution time for the instruction sequence of the instruction list to be scheduled.

In one example, when the processor executes the computer program, the following steps may be realized: evaluating all the corresponding selection nodes of a current order according to preset priority of instructions, obtaining an evaluation result of the selection nodes of the current order, and determining the corresponding instructions of the current order according to the evaluation result.

In an example of the present disclosure, when the processor executes the computer program, the following steps may be realized: setting priority of instructions according to the specific content and/or type of the current selection node.

In an example of the present disclosure, when the processor executes the computer program, the following steps may be realized: determining corresponding instructions of the current order according to corresponding shortest execution time of all selection nodes of the current order.

Normally, when running a neural network model, e.g., Caffe network model, the processor may often need to compile and parse each compute node of the neural network model at each time, then follow a certain manner to execute each compute node according to a structure of the neural network model. The neural network model and the structure of the network may be trained or untrained artificial neural network model data. The above-mentioned processing method for neural network may affect the processing speed of a processor, and may have low processing efficiency.

Figure 28:
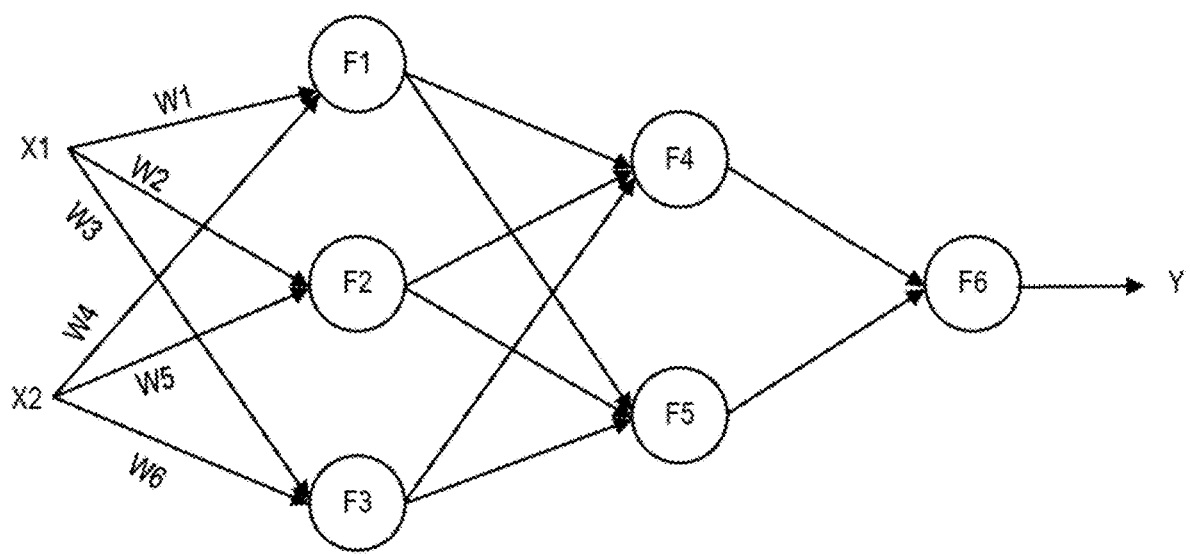
FIG. 28 is a network structural diagram of a neural network of an example.

The example of the disclosure further provides an offline model generation method. The offline model generation method can run on a cloud server or a dedicated neural network processor, and store an obtained offline model of an original network on a memory 130. The cloud server or the dedicated neural network processor may be a processor that can process heavyweight data such as a neural network. The cloud server or the dedicated neural network processor may not be included in the above-mentioned computer equipment. Specifically, as shown in FIG. 26, the method above may further include:

S010, obtaining a model dataset and model structure parameters of an original network, specifically, the model dataset and the model structure parameters of the original network may be obtained by an obtaining unit of the cloud server or the dedicated neural network processor, and a network structure graph of the original network may be obtained through the model dataset and the model structure parameters of the original network. The model dataset may include data such as corresponding model parameters of each compute node of the original network. W1 to W6 in a neural network shown in FIG. 28 are used to represent model parameters of compute nodes. The model structure parameters may include connections among a plurality of compute nodes of the original network, and computation attributes of the respective compute nodes, where the connections among the compute nodes may be used to indicate whether data is transferred among the compute nodes. For instance, when there is a transfer of data stream among a plurality of compute nodes, connections exists among the plurality of compute nodes. Further, the connections of compute nodes may include an input relation and an output relation. As shown in FIG. 28, if output of compute node F1 is used as input of compute node F4 and compute node F5, then compute node F1 may have a connection relation with compute node F4, and compute node F1 may have a connection relation with compute node F5. For another instance, there is no transfer of data between compute node F1 and compute node F2, which may indicate that F1 has no connection with compute node F2.

The attributes of the respective compute nodes may include an computation type and computation parameters of corresponding compute nodes, where the computation type of a compute node may refer to a type of computation that the compute node completes, e.g., the computation type of the compute node may include addition, subtraction, convolution operations, etc., correspondingly, the compute node may be a compute node for realizing addition, a compute node for realizing subtraction, or a compute node for realizing convolution operations, etc. Computation parameters of a compute node may be necessary parameters for completing a type of computation corresponding to the compute node. For instance, the type of computation corresponding to the compute node may be a compute node for realizing addition, correspondingly, the computation parameters of the compute node may be addends for addition, and augends for the addition may be used as input data and be obtained through the obtaining unit, or the augends for the addition may be output data of a previous compute node of the compute node, etc.

Alternatively, the original network may be an artificial neural network that is based on a deep learning system such as TensorFlow, MXNet, Caffe, and PyTorch, and is built for a generic processor such as CPU, GPU, or DSP. The original network may further be an artificial neural network that is built for an intelligent processor such as IPU. For instance, when the original network is a neural network based on Caffe, a model dataset (caffemodel) and model structure parameters (prototxt) of the Caffe network may be obtained. The model dataset (caffemodel) may include data such as model parameters of the Caffe network, and the model structure parameters (prototxt) may include a computation attribute of each compute node of the Caffe network, connections among a plurality of compute nodes, etc.

S101, running the original network according to the model dataset and the model structure parameters of the original network, and obtaining corresponding instructions of each compute node in the original network. Specifically, a computation unit of the cloud server or the dedicated neural network processor may run the original network according to the model dataset and the model structure parameters of the original network, and obtain corresponding instructions of each compute node in the original network. Further, the obtaining unit of the cloud server or the dedicated neural network processor may obtain input data of the original network. The computation unit of the cloud server or the dedicated neural network processor may run the original network according to the input data, the network model dataset and the model structure parameter of the original network, and obtain corresponding instructions of each compute node in the original network. Still further, the above-mentioned process of running the original network to obtain instructions of each computation is in fact a process of compiling. The process of compiling may be realized by the cloud server or the dedicated neural network processor or a virtual device. In other words, the cloud server or the dedicated neural network processor or the virtual device may run the original network according to the model dataset and the model structure parameters of the original network. The virtual device refers to processor running space virtualized in memory space of a memory.

It should be understood that the running the original network of the present example refers to that the cloud server or the dedicated neural network processor may use artificial neural network model data to run a machine learning algorithm and realize a target application (e.g., artificial intelligence applications such as speech recognition) by performing a forward computation.

S102, according to model parameters and instructions corresponding to each compute node of the original network, generating an offline model corresponding to the original network, and storing the offline model corresponding to the original network in a nonvolatile memory. Specifically, a controlling unit of the cloud server or the dedicated neural network processor can generate the offline model corresponding to the original network according to the model parameters and instructions corresponding to the respective compute nodes of the original network, for instance, the controlling unit of the cloud server or the dedicated neural network processor can store the model parameters and instructions corresponding to the respective compute node of the original network on a nonvolatile second memory for generating and storing the offline model. For the respective compute nodes of the original network, the model parameters and instructions of the compute nodes may be stored in a manner of one-to-one correspondence. By doing so, when running the original network again, the offline model corresponding to the original network can be obtained from the nonvolatile memory directly, and the original network can run according to the corresponding offline model. Since there is no need to perform online compiling for each compute node of the original network to obtain instructions, the running speed and efficiency of a system may be improved.

It should be understood that in the present example, directly running the corresponding offline model of the current original network refers to using the offline model to run a corresponding machine learning algorithm (e.g., neural network algorithm) of the original network, and realize a target application (e.g., artificial intelligence applications such as speech recognition) by performing forward operation.

Specifically, as shown in FIG. 27, the above-mentioned S102 may further include:

S104, obtaining an order of execution of each compute node in the original network according to the model structure parameters of the original network, Specifically, the computation unit of the cloud server or the dedicated neural network processor may obtain the order of execution of each compute node in the original network according to the model structure parameters of the original network, and further, the computation unit of the cloud server or the dedicated neural network processor may obtain the order of execution of each compute node in the original network according to the connections among the respective compute nodes in the original network. For instance, as shown in FIG. 28. Input data of compute node F4 is input data of compute node F1 and output data of compute node F2, and input data of compute node F6 is input data of compute node F4 and output data of compute node F5. Then, the order of execution of the respective compute nodes in the neural network as shown in FIG. 28 may be F1-F2-F3-F4-F5-F6, or F1-F3-F2-F5-F4-F6, etc. Of course, compute nodes F1, F2, and F3 may be executed in parallel, and compute nodes F4 and F5 may also be executed in parallel. Instances are given here merely for the purpose of explanation, and are not considered to be the limit of the order of execution.

S105, running the original network according to the order of execution of the respective compute nodes in the original network, and respectively obtaining corresponding instructions of the respective compute node in the original network. Specifically, the computation unit of the cloud server or the dedicated neural network processor may run the original network according to the order of execution of the respective compute nodes in the original network, so as to obtain the corresponding instructions of the respective compute nodes in the original network. In other words, the cloud server or the dedicated neural network processor may compile data such as the module dataset of the original network to obtain the corresponding instructions of the respective compute nodes. According to the corresponding instructions of the respective compute nodes, the computation function realized by a compute node may be known. In other words, computation attributes such as the type of computation and computation parameters of the compute node may be known.

Further, as shown in FIG. 27, the above-mentioned S103 may further include:

S106, obtaining a manner of memory allocation of the original network according to the model data set and the model structure parameters of the original network. Specifically, the computation unit of the cloud server or the dedicated neural network processor may obtain the manner of memory allocation of the original network according to the model dataset and the model structure parameters of the original network. Further, the cloud server or the dedicated neural network processor may obtain the order of execution of the respective compute nodes in the original network according to the model structure parameters of the original network, and determine the manner of memory allocation of the original network according to the order of execution of the respective compute nodes in the original network. For instance, related data during running process of the respective compute nodes may be stored in a stack according to the order of execution of the respective compute nodes. The manner of memory allocation refers to determining a storage location of the related data (including input data, output data, model parameters, and intermediate results) of the respective compute nodes in the original network in memory space (e.g., the first memory). For instance, a data table may be used to store mappings of related data of the respective compute nodes (input data, output data, model parameters and intermediate results and etc.) and memory space.

S107, according to the manner of memory allocation of the original network, storing the related data during the running process of the original network to the first memory, where the related data during the running process of the original network may include corresponding model parameters, instructions, input data, intermediate computation results, and output data etc., of the respective compute nodes of the original network. For instance, as shown in FIG. 28, X1 and X2 represent input data of the neural network, Y represent output data of the neural network. The cloud server or the dedicated neural network processor may convert the output data of the neural network to controlling commands for robots or different digital interfaces. W1 to W6 are used to represent corresponding model parameters of compute nodes F1, F2, and F3, and output data of compute nodes F1 to F5 may be used as intermediate computation results. According the confirmed manner of memory allocation, the cloud server or the dedicated neural network processor may store the related data during the running process of the original network to the first memory, such as a nonvolatile storage medium including an internal memory or a cache, for the specific manner of storage, see the storage memory in the left half of FIG. 29.

Figure 29:
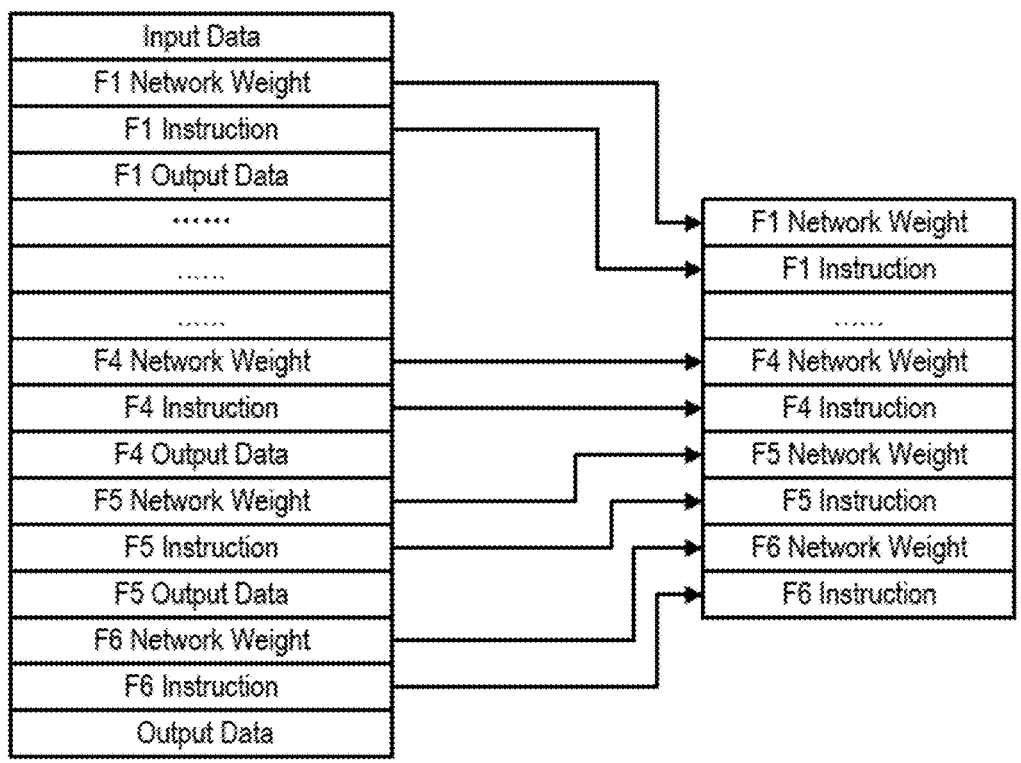
FIG. 29 is a diagram showing a generation process of an offline model of the neural network in FIG. 28.

S108, obtaining the corresponding model parameters and instructions of the respective compute nodes of the original network from the first memory, and storing the corresponding model parameters and instructions of the respective compute nodes of the original network in the second memory and generating an offline model. The second memory may be a nonvolatile memory such as an external memory. FIG. 29 shows a generating process of the offline model, memory space in the right half of FIG. 29 stores the corresponding offline model of the original network.

The above-mentioned generating process of the offline model will be described below with reference to the accompanied drawings FIG. 28 and FIG. 29.

First, the cloud server or the dedicated neural network processor may obtain the model dataset, the model structure parameters, and input data of the original network, so as to obtain a network structure graph of the original network according to the model dataset and model structure parameters of the original network, which is as shown in FIG. 29.

Then, the cloud server or the dedicated neural network processor may obtain the connections of the respective compute nodes in the original network according to the model structure parameters of the original network, and according to the connections the respective compute nodes, obtain the order of execution of the respective compute nodes in the original network and the manner of memory allocation during the running process of original network, so as to obtain a storage location of the related data during the running process of the original network. As shown in the left half of FIG. 29, the related data during the running process of the original network may be stored in a stack according to the order of execution of the respective compute nodes.

Finally, the cloud server or the dedicated neural network processor may store the corresponding model parameters and instructions of the respective compute nodes of the original network in the nonvolatile second memory and generate an offline model. The storage manner of the offline model can be seen in the storage memory shown in the right half of FIG. 29. Besides, the offline model may only include data such as required model parameters and instructions for running the original network. Input data, output data, or intermediate results during the running process of the original network may not be stored, so that consumption of memory space of the second memory may be reduced.

In the traditional technology, an artificial neural network, which is a type of heavyweight data, is formed by a large number of nodes (or may be referred to as neurons) connecting to each other. A traditional computer equipment may read a neural network directly, and execute the respective compute nodes of the neural network in sequence according to the structure of the neural network by following a certain manner, and obtain a computation result of the neural network. In other words, the traditional computer equipment may process the data of the heavyweight neural network directly, which may affect data processing speed and efficiency of the computer equipment. Besides, based on the feature of the artificial neural network, the artificial neural network may not be able to run in some operating systems that can only process lightweight data, which may limit the application scope of the neural network.

Figure 20:
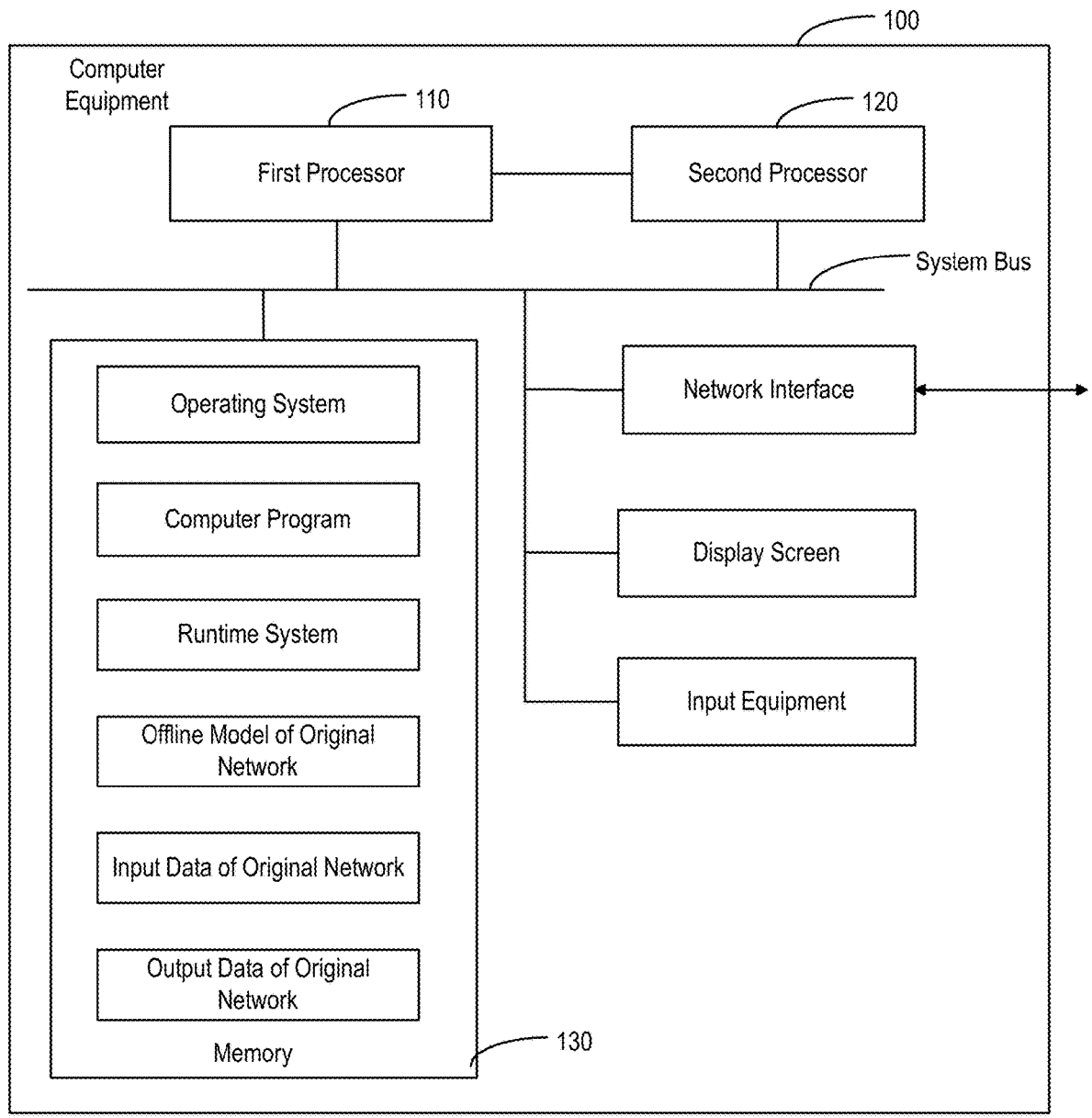
FIG. 20 is a block diagram of a computer equipment in an example of the present disclosure.
Figure 21:
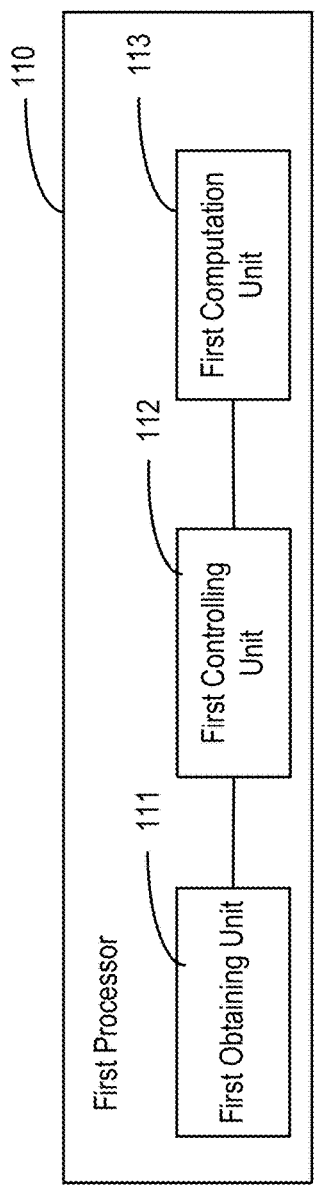
FIG. 21 is a block diagram of an example of the first processor in FIG. 20.

As shown in FIG. 20, an example of the present disclosure provides a computer equipment. The computer equipment 100 may include a hardware system and a software system, where the hardware system may include a first processor 110, a second processor 120, and a memory 130. As shown in FIG. 21, the first processor 110 may be configured to provide computation and controlling capabilities, the first processor 110 may include a first obtaining unit 111, a first computation unit 113, a first controlling unit 112, etc. The first obtaining unit 111 may be a hardware unit such as an IO (input/output) interface. The first computation unit 113 and the first controlling unit 112 may both be hardware units. For instance, the first computation unit 113 and the first controlling unit 112 may be digital circuits, analog circuits, or the like. Physical implementation of the hardware circuits may include, but is not limited to, a physical device, and the physical device may include, but is not limited to, a transistor, a memristor, and the like. The second processor 120 may also be configured to provide computation and controlling capabilities. The second processor 120 may include a second obtaining unit, a second computation unit, a second controlling unit, and the like. The second obtaining unit may be a hardware unit such as an IO interface. The second computation unit and the second controlling unit may both be hardware units. The connections and formation of each structure of the second processor 120 may be the same as the connections and formation of each structure of the first processor. For the specific detail, see the description in the preceding part. Alternatively, the first processor or the second processor may be a general processor such as CPU (Central Processing Unit), GPU (Graphics Processing Unit), and DSP (Digital Signal Processing), or a dedicated neural network processor such as IPU (Intelligence Processing Unit).

As shown in FIG. 20, the memory 130 may be configured to store corresponding offline models and input data of a plurality of original networks and a software system of the computer equipment. The software system of the computer equipment may include software that can run on the first processor 110 or the second processor 120. The software may include an operating system, a computer program, an application software, a runtime system 131, and the like. Further, the memory 130 may be configured to store output data of each original network (in other words, computation results of each original network). Yet further, the memory 130 may include a first storing unit configured to store offline models, a second storing unit configured to store input data, a third storing unit configured to store output data, and a fourth storing unit configured to store a runtime system. Alternatively, a count of the memory 130 may be two or greater than two. For instance, the count of the memory 130 may be two, the two memories are marked as a first memory and a second memory, where the first memory may be configured to store corresponding offline model and input data of an original network, and the second memory may be configured to store a runtime system. Alternatively, the memory 130 may be a nonvolatile memory such as ROM (Read Only Memory), PROM (Programmable ROM), EPROM (Electrically PROM), EEPROM (Electrically Erasable PROM), or flash memory.

It should be understood that, the runtime refers to a condition that a program is running (or being executed), and the runtime indicates which program is running during a certain period. The runtime system refers to a virtual machine of process level, which is used to represent an operating system of application. Specifically, the runtime system may be a software system built through computer software, the software system may run on a processor such as CPU (Central Processing Unit), GPU (Graphics Processing Unit), DSP (Digital Signal Processing), or IPU (Intelligence Processing Unit), so that a data processing function may be realized. The runtime system of the present example of the disclosure is different from an operating system of a computer equipment. The software system of a computer equipment may include the above-mentioned runtime system and operating system at the same time.

Figure 22:
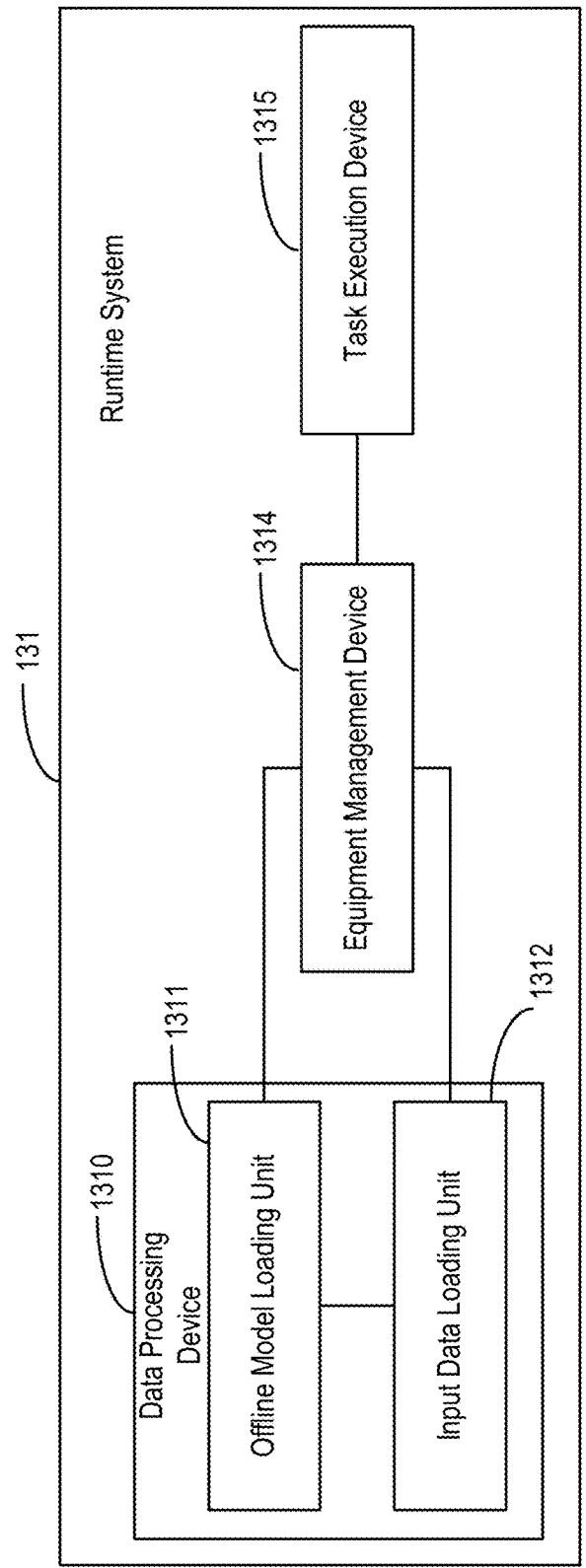
FIG. 22 is a block diagram of an example of the runtime system in FIG. 20.

As shown in FIG. 22, the runtime system 131 in the example of the present disclosure may be capable of running on the first processor 110, the runtime system 131 may include a data processing device 1310, an equipment management device 1314, and a task execution device 1315. The data processing device 1310 and the equipment management device 1314 may both be connected to the task execution device 1315. Specifically, when the first processor 110 run the runtime system 131, the runtime system 131 may be capable of controlling the second processor 120 to run heavyweight data such as a neural network, in other words, the runtime system 131 may be capable of controlling the second processor 120 to perform computation according to offline model and input data of the neural network, so as to obtain output data of the neural network. The data processing device 1310 may be configured to obtain the corresponding offline model and input data of the original network from the memory 130. The offline model of the current original network and the input data of the current network may be configured correspondingly. Alternatively, the corresponding offline model of the current original network may include necessary network structure information such as the corresponding model parameter and instruction of each compute node of the original network as well as interface data of each compute node of the original network. The offline model of the current original network does not include relevant data such as intermediate computation results, input data, and output data of each compute node in the current original network, thus, when data of the offline model of the current original network is far lighter than data of the current original network, the offline model of the current original network can be considered as lightweight data.

Specifically, the corresponding instructions of the respective compute nodes may indicate computation functions realized by the compute nodes, where the instructions may specifically include computation attributes of the respective compute nodes of the original network. The node interface data of the current original network may be configured to indicate connections among compute nodes of the current original network. Specifically, the node interface data of the current original network may include a source of input data and a source of output data of the respective compute nodes. For instance, as shown in FIG. 28, X1 and X2 are corresponding input data of a current original network, Y is corresponding output data of the current original network, and W1 to W6 are corresponding model parameters of compute nodes F1 to F3 in the current original network. The node interface data of the current original network may include compute nodes F1, F2, and F3, which are initial compute nodes, inputs of those compute nodes are preset input data. Input data of compute node F1 is used as input data of compute nodes F4 and F5, and the like. By doing so, when running the original network again, merely by obtaining the offline model and input data of the current original network, the running process of the current original network may be realized by running the corresponding offline model of the current original network.

The equipment management device 1314 may be configured to be a driving device of the second processor 120, and may be configured to control the second processor 120 to turn on or turn off. When the second processor 120 turns off, the second processor 120 does not execute any task; when the second processor 120 turns up, the second processor 120 may execute tasks such as computation or controlling. In the example of the present disclosure, the second processor 120 may be a neural network accelerator which may be configured to execute the offline model of the current original network. The task execution device 1315 may be configured to control the second processor 120 to run the offline model and input data obtained by the data processing device 1310, so as to obtain output data of the current original network (in other words, a computation result of the neural network). It should be understood that running the corresponding offline model of the current original network refers to using the offline model to run a corresponding machine learning algorithm (e.g., neural network algorithm) of the original network, and realizing a target application (e.g., artificial intelligence applications such as speech recognition) by performing forward operation.

Specifically, when the computer equipment 100 is required to run heavyweight data such as a neural network, the first processor 110 may run the runtime system 131, so that through the runtime system 131, the second processor 120 may be controlled to run data including the neural network. In other words, when the computer equipment 100 is required to run heavyweight data such as a neural network, first, the data processing device 1310 may obtain the corresponding offline model and input data of the current original network from the memory 130. After loading the corresponding offline model and input data of the current original network, the equipment management device 1314 may control the second processor 120 to turn on. Then, the task execution device 1315 may control the second processor 120 to run the offline model and input data of the current original network, so as to realize the running process of the current original network and obtain a computation result of the current original network.

In the example of the present disclosure, the offline model of the current original network may merely store necessary network structure information such as corresponding model parameters and instructions of the respective compute nodes of the original network, as well as interface data of the respective compute nodes of the original network. Thus, data of the offline model of the original network may be far lighter than data of the current original network, so that by running the offline model of the current original network, a computer equipment may be able to realize the processing of heavyweight data such as a neural network, and the application scope of a neural network can be expanded. Meanwhile, by directly running the corresponding offline model of the current original network on the computer equipment, there is no need to perform processing operation such as compiling on each compute node of the current original network, so that the processing speed and efficiency of the computer equipment can be increased.

Alternatively, as shown in FIG. 22, the data processing device 1310 may include an offline model loading unit 1311 and an input data loading unit 1312. The offline model loading unit 1311 may be configured to obtain the offline model of a current original network from the memory 130, and parse the obtained offline model of the current original network, so as to obtain corresponding model parameters and instructions of respective compute nodes of the original network as well as interface data of the respective compute nodes of the original network. Further, the process of parsing the offline model of the current original network by the offline model loading unit 1311 may further include a process of performing data preprocessing (e.g., data format conversion and normalization) on the offline model of the current original network, so that the second processor 120 may be able to run the offline model of the current original network.

The input data loading unit 1312 may be configured to obtain input data from the memory 130. The input data may be corresponding input data of initial compute nodes of the original network. As shown in FIG. 28, X1 and X2 are input data of initial compute nodes of an original network. Further, the input data may be obtained through an application software and be stored in the memory 130. The application software may run on the first processor or the second processor. For instance, users may set input data of the current original network through an interactive interface of the application software, and the runtime system may store the obtained input data of the current original network in the memory 130.

In the example of the present disclosure, the offline model loading unit 1311 may further be configured to obtain a loading progress of offline model in real time, and the input data loading unit 1312 may further be configured to obtain loading progress of input data in real time. For instance, when the offline model loading unit 1311 finishes loading the offline model of the current original network (e.g., a data loading percentage of the offline model is 100%), and after the input data loading unit 1312 finishes loading the input data of the current original network (e.g., a loading percentage of input data is 100%), the offline model loading unit 1311 and the input data loading unit 1312 may send a signal indicating the completion of data loading to the equipment management device 1314, so that the equipment management device 1314 may control the second processor 120 to turn on according to the signal indicating the completion of data loading. After the second processor 120 turns on, the equipment management device 1314 may send a signal indicating the completion of turning up to the task execution device 1315, then the task execution device 1315 may control the second processor 120 to run the offline model of the current original network according to the received signal indicating the completion of starting up.

In other examples, the second processor may be controlled to turn on in advance, so that the data processing speed and efficiency of the computer equipment may be further increased. Besides, data of the offline model is greater than data of the input data, and the time needed for loading the offline model may be longer than the time needed for loading the input data. Thus, if the data loading percentage of the offline model loading unit 1311 is greater than or equal to a first preset percentage (e.g., 80%), a signal indicating the completion of loading may be sent to the equipment management device 1314 to turn on the second processor 120 in advance. Further, if the data loading percentage of the offline model loading unit 1311 is greater than or equal to the first preset percentage (e.g., 80%), and the data loading percentage of the input data loading unit 1312 is greater than or equal to a second preset percentage (e.g., 80%), then the offline model loading unit 1311 and the input data loading unit 1312 may send a signal indicating the completion of data loading to the equipment management device 1314, so that the equipment management device 1314 may control the second processor 120 to turn on according to the received signal indicating the completion of data loading.

Figure 23:
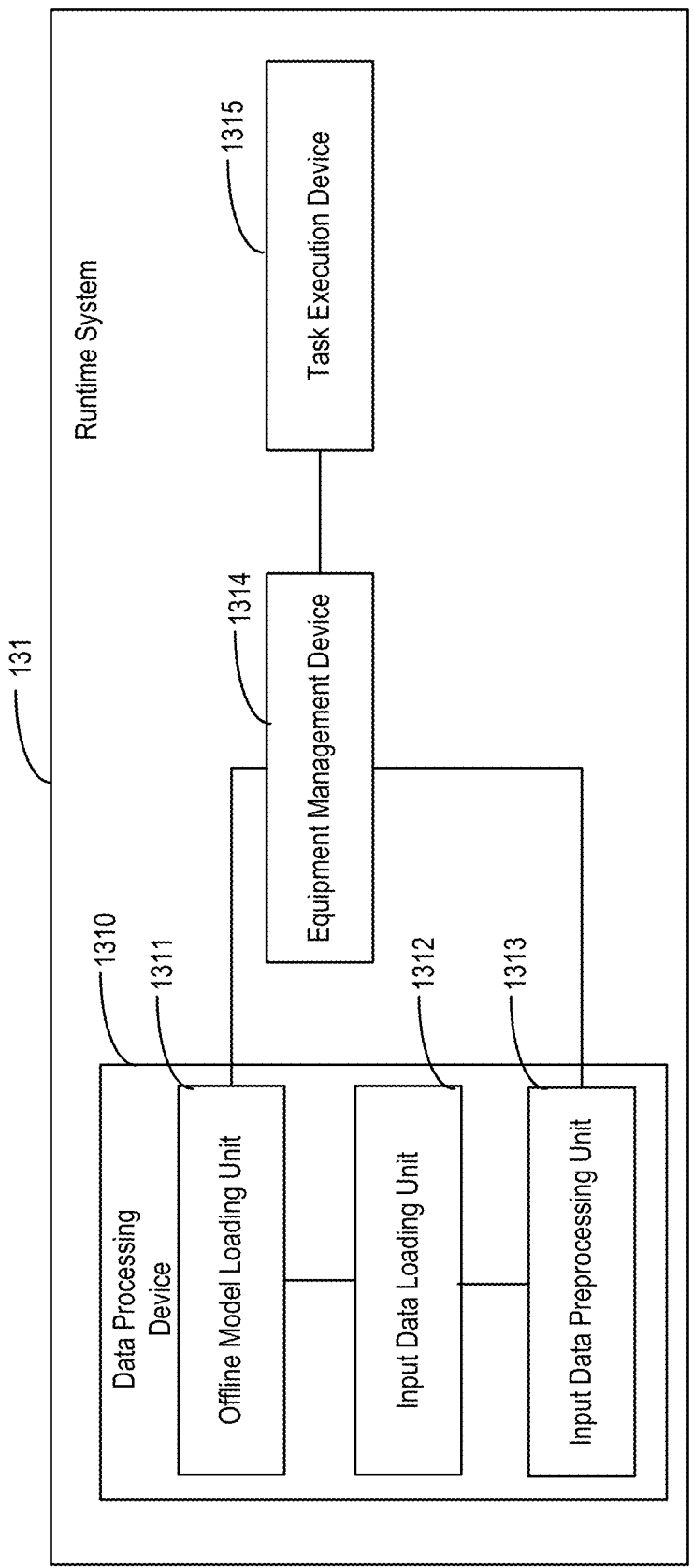
FIG. 23 is a block diagram of another example of the runtime system in FIG. 20.

Alternatively, as shown in FIG. 23, the data processing device 1310 may further include an input data preprocessing unit 1313. The input data preprocessing unit 1313 may be configured to preprocess (e.g., data format conversion and normalization) input data, so that the second processor 120 may be able to run input data. At this point, after the input data loading unit 1312 finishes loading input data, the input data loading unit 1312 may send a signal indicating the completion of input data loading to the input data preprocessing unit 1313, and the input data preprocessing unit 1313 may preprocess the corresponding input data of the current original network according to the received signal indicating the completion of input data loading, where the preprocessing may include normalization and format conversion. The equipment management device 1314 may control the second processor 120 to turn on according to the signal indicating the completion of offline model loading sent by the offline model loading unit 1311, as well as the signal indicating the completion of preprocessing sent by the input data preprocessing unit 1313.

At the same time, the input data preprocessing unit 1313 may be further configured to store output data obtained by the second processor 120 to the memory 130, specifically, after the second processor 120 finishes the execution of the offline model and input data of the current original network, the second processor 120 may transfer output data (in other words, a computation result) of the current original network to the input data preprocessing unit 1313, the input data preprocessing unit 1313 may preprocess the output data of the current original network, and then store the output data of the current original network in the memory 130, where the preprocessing may include normalization and format conversion.

In one example, the software system of the computer equipment 100 may further include application software and operating system (e.g., the Android operating system, the Microsoft operating system, and the Linux operating system). The application software can run on the operating system or the above-mentioned runtime system, and the operating system and the above-mentioned runtime system may provide an executable environment for various application software. Specifically, the operating system and application software may further be stored in the memory 130, and the operating system can run on the first processor 110 or the second processor 120.

Each device of the runtime system 131 may provide a secure API (Application Programming Interface) that can be called by the application software, so that the application software can obtain the offline model and input data of the current original network through the runtime system 131, and control the second processor 120 to run the offline model of the current original network, obtain the output data of the current original network. Specifically, the data processing device 1310 can provide an offline model API and an input data API, and further, the offline model loading unit 1311 can provide the offline model API, and the input data loading unit 1312 can provide the input data API. When heavyweight data such as a neural network is to be run, the application software may call the offline model API of the data processing device 1310, so that the offline model loading unit 1311 can obtain the corresponding offline model of the current original network from the memory 130. After loading the corresponding offline model of the current original network, the application software may call the input data API of the data processing device 1310, so that the input data loading unit 1312 can obtain the corresponding input data of the current original network from the memory 130. Further, the input data of the current original network may be obtained through the application software. For instance, users may manually set corresponding input data of the current original network through the interactive display interface of the application software. Of course, in other examples, the application software may call the above-mentioned offline model API and input data API simultaneously, so that the offline model and input data of the current original network may be loaded at the same time. The instance is given here merely for the purpose of explanation, and are not to be considered as limitation of the order of execution.

Further, the input data preprocessing unit 1313 of the data processing device 1310 may provide a data preprocessing API. After finishing loading the input data of the current original network, the application software may call the data preprocessing API, so that the input data preprocessing unit 1313 can preprocess the input data of the current original network, and the second processor can run the input data of the current original network.

The equipment management device 1314 can provide a second processor driving API.

The task execution device 1315 can provide a second processor operation API. After loading the offline model and input data of the current original network, the application software can turn on the second processor 120 by calling the second processor driving API provided by the task execution device 1315. After the second processor 120 turns on, the application software can call the second processor operation API provided by the task execution device 1315, and control the second processor 120 to execute the corresponding offline model and input data of the current original network, and obtain the output data of the current original network. After finishing executing the offline model of the current original network, the application software can turn off the second processor 120 by calling the second processor driving API.

Still further, after finishing executing the offline model of the current original network, the application software may further call the data preprocessing API, so that input data preprocessing unit 1313 can preprocess the output data of the current original network, and store the output data of the current original network in the memory 130.

Furthermore, a count of the second processor 120 may be plural, the task execution device 1315 may further provide a task distribution API, and the task execution device 1315 may be configured to control the plurality of second processors 120 to realize task distribution and scheduling between the plurality of second processors 120. Specifically, the application software may select a target second processor to execute a current task from the plurality of second processors 120 by calling the task distribution API provided by the task execution device 1315. After loading the offline model and input data of the current original network, the application software can turn on the target second processor by calling the corresponding second processor driving API of the target second processor. After the target second processor turns on, the application software can call the corresponding second processor operation API of the target second processor provided by the task execution device 1315, and control the target second processor to execute the corresponding offline model and input data of the current original network. After the execution of the offline model of the current original network finishes, by calling the corresponding second processor driving API of the target second processor, the target second processor may be turned off.

Alternatively, in other examples, the second processor 120 may be a multi-core processor. In other words, the second processor 120 may include a plurality of processing units. The task execution device 1315 may be configured to control the plurality of processing units of the plurality of second processor 120, so as to realize task distribution and scheduling between the plurality of processing units of the plurality of second processors 120. Specifically, the application software may select a target processing unit to execute a current task from the plurality of processing units of the second processor 120 by calling the task distribution API provided by the task execution device 1315. After loading the offline model and input data of the current original network, the application software can turn on the target processing unit by calling the corresponding second processor driving API of the target processing unit. After the target processing unit turns on, the application software can call the corresponding second processor operation API of the target processing unit, and control the target processing unit to run the corresponding offline model and input data of the current original network. After finishing executing the offline model of the current original network, by calling the corresponding second processor driving API of the target processing unit, the target processing unit may be turned off.

As a further improvement, the runtime system 131 may be a secure runtime system built on a trusted operating environment. For instance, the runtime system 131 may be a runtime system built on TEE (Trusted Execution Environment). Specifically, TEE can build a runtime system that is separated from an insecure software system such as an operating system, so as to realize software isolation and ensure the security of offline model, input data, and output data of an original network. The application software above may be a secure application including TA. The secure application software including TA can run on a runtime system built on TEE.

The memory space of the memory 130 can be divided into secure memory space and insecure memory space. Specifically, the memory space for storing the offline model and input data of the current original network may be secure memory space, the memory space for storing the operating system, the application software, and other software systems may be insecure memory space, and the runtime system may be stored in the secure memory space or insecure memory space of the memory. Of course, the memory 130 may also be a secure memory. In this case, the runtime system, TA, and the secure memory space form a complete TEE operating environment.

In other examples, a count of the memory 130 may be more than 2, where one memory 130 may be configured to be secure memory space for storing the offline model and input data of the current original network, and one memory 130 may be configured to be insecure memory space for storing the operating system, the application software, and other software systems. Still further, the operating system, the application software, and the like may be stored in the secure memory space.

It should be understood that, the secure memory space in the example of the present disclosure refers to trusted memory space, the secure memory space may be encrypted memory space which can be encrypted by using a symmetric encryption algorithm, an asymmetric encryption algorithm, or a random encryption algorithm (e.g., using a random password generator to obtain a password). Of course, the secure memory space may also be memory space encrypted with fingerprint and the like. The above-mentioned secure runtime system 131 and the application software may also be obtained by using an encryption algorithm. Or, the secure memory space mentioned above may also be secure memory space obtained by using a credibility measurement method, and the secure runtime system 131 above and the application software may also be obtained by using a credibility measurement method.

Of course, the first processor 110 may be a secure chip, such as TPM (Trusted Platform Module), TCM (Trusted Cryptography Module), or TPCM (Trusted Platform Control Module). Further, the second processor 120 may also be a secure chip such as TPM, TCM, or TPCM.

Alternatively, the computer equipment in the example of the present disclosure may only include a processor and a memory, where the processor may be a multi-core processor. Specifically, the processor may include a plurality of processing units. For instance, the processor may include a first processing unit and a second processing unit, where the runtime system may run on the first processing unit. Further, the runtime system may include a data processing device, an equipment management device, a task execution device, and the like, where the data processing device may be configured to obtain the corresponding offline model and input data of the current original network from the memory, the corresponding offline model of the current original network may include the corresponding model parameters and instructions of respective compute nodes of the original network as well as interface data of the respective compute nodes of the original network. The equipment management device may be configured to control the second processing unit to turn on or turn off, and the task execution device may be configured to control the second processing unit to run the offline model and input data of the current original network. Furthermore, other structures of the runtime system may be similar to the structure of the runtime system mentioned in the example above, specific details can be seen in the description in the preceding part.

As shown in FIG. 24, an example of the present disclosure further provides a data processing method to be used in the computer equipment shown in FIG. 20, the data processing speed and efficiency of the computer equipment may be further increased by processing heavyweight data such as a neural network through an offline model. Specifically, the method above may include:

S110, controlling the data processing device to obtain a corresponding offline model and input data of a current original network from the memory, where the corresponding offline model of the current original network may include corresponding model parameters and instructions of respective compute nodes of the original network. Specifically, when the first processor 110 runs the runtime system 131, the first processor 110 may obtain the corresponding offline model and input data of the current original network from the memory through the data processing device 1310 of the runtime system 131. Further, the corresponding offline model of the current original network can obtained from the memory 130 through the offline model loading unit 1311 of the data processing device 1310. The input data may be obtained from the memory 130 through the input data loading unit 1312, where the input data may be corresponding input data of initial compute nodes of the original network.

S120, controlling the second processor of the computer equipment to turn on through the equipment management device. Specifically, the second processor may be controlled to turn on or turn off through the equipment management device 1314 of the runtime system 131. In other words, when the offline model loading unit 1311 finishes loading the offline model of the current original network, and after the input data loading unit 1312 finishes loading the input data of the current original network, the offline model loading unit 1311 and the input data loading unit 1312 may send a signal indicating the completion of data loading to the equipment management device 1314, so that the equipment management device 1314 may control the second processor 120 to turn on according to the received signal indicating the completion of data loading.

S130, controlling the second processor of the computer equipment to run the current original network through the task execution device according to the corresponding offline model and input data of the current original network, and obtaining output data of the current original network. Specifically, the second processor 120 may be controlled to run the offline model of the current original network through the task execution device 1315 of the runtime system 131. It should be understood that running the corresponding offline model of the current original network refers to using the offline model to run a corresponding machine learning algorithm (e.g., neural network algorithm) of the original network, and realize a target application (e.g., artificial intelligence applications such as speech recognition) by performing forward operation.

S140, storing the output data of the current original network in the memory through the data processing device. Specifically, the output data of the current original network may be stored in the memory 130 through the data processing device 1310. Further, the data processing device 1310 can preprocess the output data of the original network, where the preprocessing may include data format conversion. Then, the data processing device 1310 may store the output data in the memory 130. Alternatively, the input data preprocessing unit 1313 of the data processing device 1310 can preprocess the output data of the original network, where the preprocessing may include data format conversion. Then, the data processing device 1310 may store the output data in the memory 130.

Alternatively, after finishing loading the corresponding offline model and input data of the current original network, the obtained offline model and input data may be preprocessed so that the second processor may be able to execute the obtained offline model and input data. Specifically, S110 may further include:

S111, parsing the obtained offline model of the current original network to obtain the corresponding model parameters and instructions of the respective compute nodes of the original network as well as interface data of the respective compute nodes of the original network. Further, in specific, the obtained offline model of the current original network may be parsed through the offline model loading unit 1311, so as to obtain corresponding model parameters and instructions of the respective compute nodes of the original network as well as interface data of the respective compute nodes of the original network. Even further, the parsed data may be preprocessed through the offline model loading unit 1311, where the preprocessing may include data format conversion, normalization, and the like.

S112, preprocessing the obtained input data of the current original network, for instance, performing a preprocessing operation including data format conversion and normalization on the input data. Specifically, the input data may be preprocessed (e.g., data format conversion and normalization) through the input data preprocessing unit 1313, so that the second processor 120 may be able to run input data.

Further, the method above may also include:
obtaining a loading progress of the corresponding offline model of the current original network in real time; specifically, the offline model loading unit 1311 may obtain the loading progress of the offline model of the current original network in real time, and the loading progress of the offline model may be indicated by using a data rate, remaining time, or the like.

If the loading progress of the offline model of the current original network is greater than or equal to a first preset percentage, the step of controlling the second processor of the computer equipment to turn on may be performed. Specifically, the first preset percentage may be 80% to 100%. For instance, when the offline model loading unit 1311 finishes loading the offline model of the current original network (e.g., the data loading percentage of the offline model is 100%), then the offline model loading unit 1311 may send a signal indicating the completion of data loading to the equipment management device 1314, so that the equipment management device 1314 may control the second processor 120 to turn on according to the signal indicating the completion of data loading. Or, if the data loading percentage of the offline model loading unit 1311 is greater than or equal to the first preset percentage (e.g., 80%), a signal indicating the completion of loading may be sent to the equipment management device 1314 to turn on the second processor 120 in advance.

Data of the offline model is greater than data of the input data, and the time needed for loading the offline model may be longer than the time needed for loading the input data, thus, a determination of whether to turn on the second processor 120 in advance may be made merely according to the loading progress of the offline model. Further, the input data loading unit 1312 may also be able to obtain the loading progress of input data in real time. If the data loading percentage of the offline model loading unit 1311 is greater than or equal to the first preset percentage (e.g., 80%), and the data loading percentage of the input data loading unit 1312 is greater than or equal to a second preset percentage (e.g., 80%), then the offline model loading unit 1311 and the input data loading unit 1312 may send a signal indicating the completion of data loading to the equipment management device 1314, so that the equipment management device 1314 may control the second processor 120 to turn on according to the received signal indicating the completion of data loading.

In addition, as shown in FIG. 25, an example of the present disclosure further provides a data processing method to be used in the computer equipment shown in FIG. 20, the data processing efficiency and speed of the computer equipment may be further increased by processing heavyweight data such as a neural network through an offline model. Specifically, the method above may include:

S210, calling the offline model API to obtain the corresponding offline model of the current original network, specifically, the application software may call the offline model API provided by the offline model loading unit 1311, so that the offline model loading unit 1311 may be able to read the offline model of the current original network from the memory 130. The corresponding offline model of the current original network may include corresponding model parameters and instructions of the respective compute nodes of the original network as well as interface data of the respective compute nodes of the original network. The generating process of the offline model can be seen in the description in the preceding part.

S220, calling the input data API, and obtaining the input data of the current original network. Specifically, the application software may call the input data API provided by the input data loading unit 1312, so as to obtain input data of the current original network from the memory 130 through the input data loading unit 1312. Further, the application software may call the data preprocessing API provided by the input data preprocessing unit 1313, and preprocess input data obtained by the input data loading unit 1312 through the input data preprocessing unit 1313 so that the second processor 120 may be able to run the input data of the current original network, where the preprocessing including data format conversion, normalization, and the like.

S230, calling the second processor driving API, and controlling the second processor of the computer equipment to turn on. Specifically, the application software may call the second processor driving API provided by the equipment management device 1314, and control the second processor 120 to turn on through the equipment management device 1314.

S240, calling the second processor operation API, and controlling the second processor to obtain output data of the current original network according to the corresponding offline model and input data of the current original network. Specifically, the application software can call the second processor operation API provided by the task execution device 1315, and control the second processor 120 through the task execution device 1315 to obtain the output data of the current original network according to the corresponding offline model and input data of the current original network.

S250, calling the second processor driving API, and controlling the second processor to turn off. Specifically, the application software may call the second processor driving API provided by the equipment management device 1314, and control the second processor 120 to turn off through the equipment management device 1314.

Those of ordinary skill in the art can understand that, all or part of the process of the above-mentioned example method may be realized by a computer program instructing related hardware. The computer program may be stored in a nonvolatile computer readable storage medium. When the computer program is executed, the process of the above-mentioned example method may be included.

Moreover, the example of the present disclosure further provides a computer readable storage medium with a computer program stored in. When the computer program is executed by one or more processors, the computer program may realize the steps mentioned in the method above. The computer storage medium may include a nonvolatile memory and/or a volatile memory. The nonvolatile memory may include ROM (Read Only Memory), PROM (Programmable ROM), EPROM (Electrically PROM), EEPROM (Electrically Erasable PROM), or flash memory. The volatile memory may include RAM (Random Access Memory) or external cache memory. By way of illustration, and rather than limitation, RAM may be obtained in various forms, such as SRAM (Static RAM), DRAM (Dynamic RAM), SDRAM (Synchronous DRAM), DDRSDRAM (Double Data Rate SDRAM), ESDRAM (Enhanced SDRAM), SLDRAM (Synchlink DRAM), RDRAM (Rambus Direct RAM), DRDRAM (Direct Rambus Dynamic RAM), and RDRAM (Rambus Dynamic RAM).

The computer equipment, data processing method and storage medium are capable of directly obtaining the corresponding offline model and input data of a current original network from the memory through the data processing device, so that the second processor of the computer equipment is capable of running the current original network according to the obtained offline model and input data of the current original network, and obtaining output data of the current original network. Since the corresponding offline model of each original network merely includes the corresponding model parameters and instructions of respective compute nodes of the original network as well as the interface data of the respective compute nodes, data of the offline model of the original network is far lighter than data of the original network, so that by running the corresponding offline model of the current original network on a computer equipment, the processing of heavyweight neural network data by the computer equipment may be realized. Meanwhile, by directly running the corresponding offline model of the current original network on the computer equipment, there may be no need to perform processing operations such as compiling on each compute node of the current original network, so that the processing speed and efficiency of the computer equipment may be increased.

Figure 30:
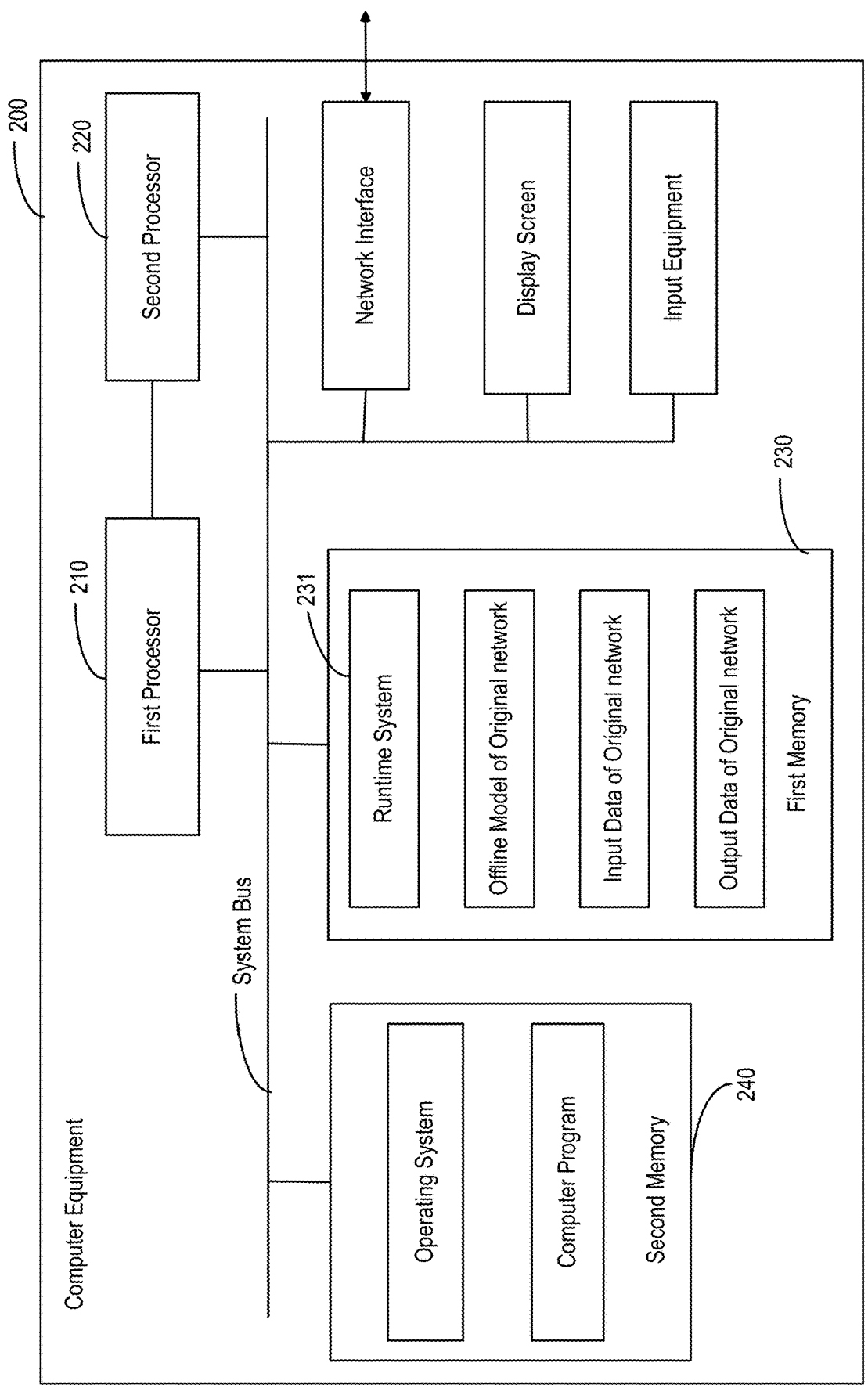
FIG. 30 is a block diagram of computer equipment in another example of the present disclosure.

In other examples of the present disclosure, as shown in FIG. 30, a computer equipment 200 may include a first processor 210, a second processor 220, a first memory 230, and a second memory 240, where the first memory 230 may store corresponding offline models and input data of a plurality of original networks and a runtime system that can run on the first processor 230, and the second memory 240 may store an operating system that can run on the first processor or the second processor. Specifically, the first memory 230 and the second memory 240 may be two memories that are physically independent of each other. Or, the first memory 230 and the second memory 240 may be integrated as one, and the first memory 230 and the second memory 240 may be logically independent of each other.

Further, a count of the first processor 210 may be more than two. For instance, the count of the first processor 210 is two, where one of the first processors 210 may be configured to run the secure runtime system 231, and the other first processor 210 may be configured to run the operating system. Or, the first processor 210 may be a multi-core processor including two or more processing units, where one processing unit may be configured to run the runtime system 231, and another processing unit may be configured to run the operating system. By doing so, the computer equipment may be divided into a secure operating environment and an insecure operating environment through the separation in hardware. Further, the first processor 210 may also be realized by using a secure chip such as TCM, TPM, or TPCM.

The runtime system is a secure runtime system built based on a trusted operating environment, for instance, the runtime system 231 may be a runtime system built on TEE (Trusted Execution Environment). Specifically, TEE can build a runtime system that is separated from insecure software systems such as an operating system, so as to realize software isolation and ensure the security of offline model, input data, and output data of an original network. Further, the secure runtime system 231 may be obtained by using an encryption algorithm, and may also be obtained by using a credibility measurement method. The first memory 230 may be a secure storage medium. When the runtime system 231 is running on the first processor 210, the runtime system 231 may be capable of obtaining the corresponding offline model and input data of the current original network from the first memory 230, and controlling the second processor 220 to run the offline model of the current original network.

It should be understood that, the "secure" mentioned in the example of the present disclosure refers to "trusted", the "secure" may be realized by using a preset encryption algorithm, for instance, a symmetric encryption algorithm, an asymmetric encryption algorithm, or a random encryption algorithm (e.g., using a random password generator to obtain a password). Of course, the "secure" may also be realized by using fingerprint and the like for encryption. Or, the "secure" may also be realized by a credibility measurement method.

Alternatively, the runtime system 231 may be able to provide a secure API (Application Programming Interface) that can be called by the application software, where the API may mainly include key management, cryptographic algorithms, secure memory, and the like. The runtime system 231 may include a data processing device, an equipment management device, and a task execution device, and the structure of the runtime system 231 may be similar to the structure of the above-mentioned runtime system 131 as shown in FIG. 22 and FIG. 23. The data processing device may be able to provide an offline model API and input data API, and may be configured to obtain the corresponding offline model and input data of the current original network from the first memory 230, where the corresponding offline model of the current original network may include the corresponding model parameters and instructions of the respective compute nodes of the original network as well as interface data of respective compute nodes of the original network. The equipment management device may provide a second processor driving API configured to control the second processor 220 to turn on or turn off. The task execution device may provide a second processor operation API configured to control the second processor 220 to run the offline model and input data of the current original network.

Further, the data processing device may include an offline model loading unit and an input data loading unit. The offline model loading unit may provide an offline API configured to obtain the corresponding offline model of each of the current original networks from the first memory 230, and analyze the offline models of the current original networks. The input data loading unit may provide an input data API configured to obtain the corresponding input data of the current original network from the first memory 230.

Further, the data processing device may include an input data preprocessing unit, the input data preprocessing unit may provide a data preprocessing API configured to preprocess input data obtained by input data loading unit, cause the second processor 220 to be capable of running the input data of the current original network, and store output data obtained by the second processor 220 in the first memory 230.

Alternatively, a count of the second processor 220 may be plural, or the second processor 220 may include a plurality of processing units; the task execution device may further be capable of providing a task distribution API configured to control the plurality of the second processors 220, or control the plurality of processing units of the second processor 220.

Further, the computer equipment may also include a TA (Trusted Application) software that can run on the runtime system 231, and the application software may be capable of calling the offline model API, the input data API, the second processor driving API, and the second processor operation API. The TA software may be realized by using an encryption algorithm, and may also be realized by using a credibility measurement method.

It should be understood that, working principles of the data processing device, the equipment management device, and the task execution device of the example of the present disclosure may be basically similar to the working principles of each of the devices mentioned in the examples above, and the details can be seen in the description in the preceding part.

Figures 31, 32:
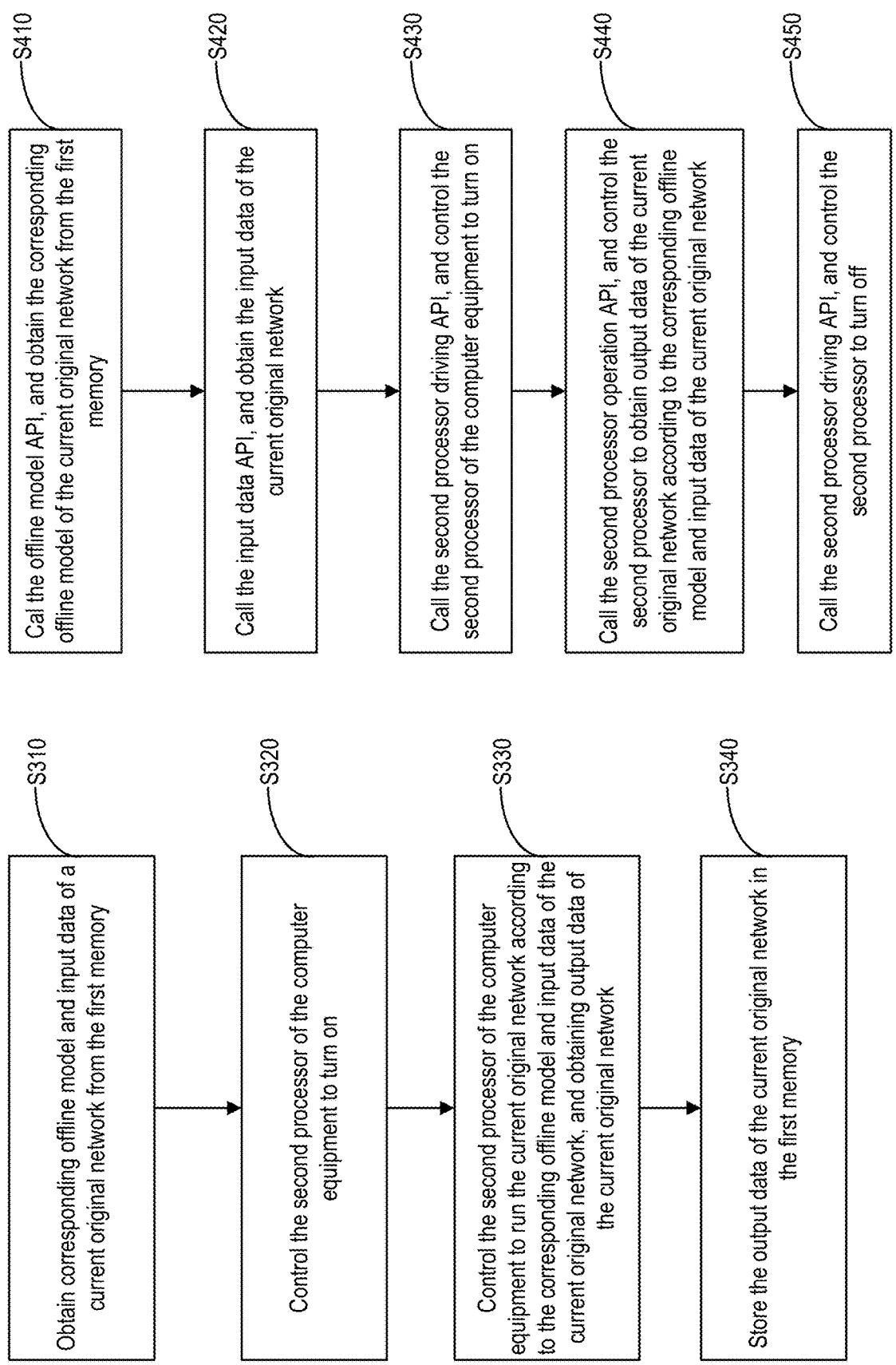
FIG. 31 is a flowchart showing a data processing method of an example of the computer equipment in FIG. 30.
FIG. 32 is a flowchart showing a data processing method of another example of the computer equipment in FIG. 30.

Referring to FIG. 31, the present disclosure further provides a data processing method to be used in the computer equipment shown in FIG. 30. The method may include:

S310, obtaining corresponding offline model and input data of a current original network from the first memory, where the corresponding offline model of the current original network may include corresponding model parameters and instructions of respective compute nodes of the original network as well as interface data of the respective compute nodes of the original network. Specifically, when the first processor runs the secure runtime system 231, the secure runtime system 231 may obtain the corresponding offline model and input data of the current original network from the secure first memory 230. Alternatively, when the first processor 210 runs the runtime system 231, the first processor 210 may read the corresponding offline model and input data of the current original network from the first memory 230 through the data processing device of the runtime system 231. Further, the corresponding offline model of the current original network may be obtained from the first memory 230 through the offline model loading unit of the data processing device. The input data may be obtained from the first memory 230 through the input data loading unit, where the input data may be corresponding input data of initial compute nodes of the original network.

S320, controlling the second processor of the computer equipment to turn on. Specifically, the secure runtime system 231 may control the second processor 220 of the computer equipment to turn on. Alternatively, the equipment management device of the runtime system 231 may control the second processor to turn on or turn off. When the offline model loading unit finishes loading the offline model of the current original network, then the offline model loading unit may send a signal indicating the completion of data loading to the equipment management device, so that the equipment management device may control the second processor 220 to turn on according to the received signal indicating the completion of data loading.

S330, controlling the second processor of the computer equipment to run the current original network according to the corresponding offline model and input data of the current original network, and obtaining output data of the current original network. Specifically, the runtime system 231 may control the second processor 220 of the computer equipment to run the offline model and the corresponding input data to obtain the output data of the current original network. Alternatively, the second processor 220 may be controlled to run the offline model of the current original network through the task execution device of the runtime system 231.

It should be understood that running the corresponding offline model of the current original network refers to using the offline model to run a corresponding machine learning algorithm (e.g., neural network algorithm) of the original network, and realize a target application (e.g., artificial intelligence applications such as speech recognition) by performing a forward operation.

S340, storing the output data of the current original network in the first memory. In other words, the runtime system 231 may store the output data of the current original network in the secure first memory 230. Alternatively, the output data of the current original network may be stored in the first memory 230 through the data processing device of the runtime system 231. Further, the data processing device can preprocess the output data of the original network, where the preprocessing may include data format conversion. Then, the data processing device may store the output data in the first memory 230. Still further, the input data preprocessing unit of the data processing device can preprocess the output data of the original network, where the preprocessing may include data format conversion. Then, the data processing device may store the output data in the first memory 230.

Referring to FIG. 32, the present disclosure further provides a data processing method to be used in the computer equipment shown in FIG. 30. The method may include:

S410, calling the offline model API, and obtaining the corresponding offline model of the current original network from the first memory. Specifically, the TA software may call the offline model API to cause the offline model loading unit to read the corresponding offline model of the current original network from the first memory 230. The corresponding offline model of the current original network may include corresponding model parameters and instructions of the respective compute nodes of the original network as well as interface data of the respective compute nodes of the original network.

S420, calling the input data API, and obtaining the input data of the current original network; specifically, the TA software may call the input data API to obtain the input data of the current original network from the first memory 230 through the input data loading unit.

S430, calling the second processor driving API, and controlling the second processor of the computer equipment to turn on; specifically, the TA software may call the second processor driving API and control the second processor to turn on through the equipment management device.

S440, calling the second processor operation API, and controlling the second processor to obtain output data of the current original network according to the corresponding offline model and input data of the current original network. Specifically, the TA software can call the second processor operation API, so as to control the second processor 220 through the task execution device to obtain the output data of the current original network according to the corresponding offline model and input data of the current original network.

S450, calling the second processor driving API, and controlling the second processor to turn off. Specifically, the TA software may call the second processor driving API, so as to control the second processor 220 to turn off through the equipment management device.

Further, the method above may also include:

calling the data preprocessing API, and storing the output data of the current original network in the first memory. Specifically, the TA software may call the data preprocessing API provided by the runtime system 231, so as to preprocess (e.g., data format conversion and normalization) the output data through the input data preprocessing unit of the data processing device, and store the output data of the current original network in the first memory 230.

Further, after the calling the input data API, and obtaining the input data of the current original network, the method may further include:

calling the data preprocessing API, and preprocessing the obtained input data of the current original network so that the second processor can run the input data. Specifically, the TA software may call the data preprocessing API provided by the input data preprocessing unit, and preprocess (e.g., data format conversion and normalization) the input data through the input data preprocessing unit to cause the second processor 220 to be able to run the input data of the current original network.

Alternatively, the example of the present disclosure may further include an offline model generating process. The offline model generating process can run on a cloud server or a dedicated neural network processor, and store an obtained offline model of an original network in the first memory 230. The cloud server or the dedicated neural network processor may be a processor that can process heavyweight data such as a neural network. The cloud server or the dedicated neural network processor may not be included in the above-mentioned computer equipment. The detailed generating process of the offline model can be seen the description in the preceding part.

Those of ordinary skill in the art can understand that, all or part of the process of the above-mentioned example method may be realized by a computer program instructing related hardware. The computer program may be stored in a nonvolatile computer readable storage medium. When the computer program is executed, the process of the above-mentioned example method may be included.

Moreover, the example of the present disclosure further provides a computer readable storage medium with a computer program stored in. When the computer program is executed by one or more processors, the computer program may realize the steps mentioned in the method above. The computer storage medium may include a nonvolatile memory and/or a volatile memory. The nonvolatile memory may include ROM (Read Only Memory), PROM (Programmable ROM), EPROM (Electrically PROM), EEPROM (Electrically Erasable PROM), or flash memory. The volatile memory may include RAM (Random Access Memory) or external cache memory. By way of illustration, and rather than limitation, RAM may be obtained in various forms, such as SRAM (Static RAM), DRAM (Dynamic RAM), SDRAM (Synchronous DRAM), DDRSDRAM (Double Data Rate SDRAM), ESDRAM (Enhanced SDRAM), SLDRAM (Synchlink DRAM), RDRAM (Rambus Direct RAM), DRDRAM (Direct Rambus Dynamic RAM), and RDRAM (Rambus Dynamic RAM).

In the example of the present disclosure, the offline model of the current original network may merely store necessary network structure information such as corresponding model parameters and instructions of the respective compute node of the original network, as well as interface data of the respective compute nodes of the original network. Thus, data of the offline model of the original network may be far lighter than data of the current original network, so that by running the offline model of the current original network, the processing of heavyweight data such as a neural network based on a secure runtime system built in a trusted execution environment such as TEE can be realized, and the application scope of a neural network can be expanded. Meanwhile, by directly running the corresponding offline model of the current original network on the computer equipment, there is no need to perform processing operation such as compiling on each compute node of the current original network, so that the processing speed and efficiency of the computer equipment may be increased.

Although the examples above only show several implementation modes of the disclosure, and the description of the examples is relatively specific and detailed, they are not to be considered as limitation of the scope of the present disclosure. It should be noted that, those of ordinary skill in the art can make various changes and improvements which shall fall within the protection scope of the present disclosure. Therefore, the protection scope of the present disclosure is subject to the protection scope in the claims.

The invention claimed is:

1. A method, implemented by at least one processor, for processing a plurality of tasks in parallel, the method comprising:
generating a directed acyclic graph based on dependencies among the plurality of tasks that are to be executed by the at least one processor;
distributing the plurality of tasks to a plurality of work queues of the at least one processor based on the directed acyclic graph; and
regulating, in respective work queues, one or more distributed tasks to be executed in parallel based on the dependencies among the one or more distributed tasks indicated by the directed acyclic graph;
wherein distributing the plurality of tasks to the plurality of work queues of the at least one processor comprises:
topologically sorting the directed acyclic graph to obtain topologically sorted sequences of the plurality of tasks;
sorting the topologically sorted sequences based on preset amounts of execution time of the respective tasks;
obtaining a longest sequence from the topologically sorted sequences; and
distributing the plurality of tasks to the respective work queues based on the longest sequence and the dependencies among the plurality of tasks.

2. The method of claim 1, further comprising:
prior to generating the directed acyclic graph, partitioning a program based on at least one of operation nodes or data nodes of the program; and
obtaining the plurality of tasks based on the partition.

3. The method of claim 2, wherein:
partitioning the program comprises partitioning the program based on the operation nodes;
the program comprises an operation request, the operation request comprising a model; and
partitioning the program based on the operation nodes comprises:
partitioning at least one of the model or input data of the model.

4. The method of claim 3, wherein:
partitioning the program comprises partitioning the model; and
partitioning the model comprises:
setting weights corresponding to the obtained plurality of tasks, respectively; and
setting correspondences between input data and output data of the obtained plurality of tasks based on the weights.

5. The method of claim 3, wherein:
partitioning the program comprises partitioning the model; and
partitioning the model comprises:
partitioning, based on a preset rule, the model in at least one of a height-width direction or a channel direction of the model.

6. The method of claim 3, wherein:
partitioning the program comprises partitioning the input data of the model; and
partitioning the input data of the model comprises:
partitioning, based on a preset rule, the input data of the model in a height-width direction of the input data.

7. The method of claim 2, wherein:
partitioning the program comprises partitioning the program based on the operation nodes;
the program comprises an operation request, wherein the operation request does not comprise a model; and
partitioning the program based on the operation nodes comprises:
partitioning at least one of input data or output data of the operation request.

8. The method of claim 7, wherein partitioning at least one of the input data or output data of the operation request comprises:
partitioning, based on a preset rule, at least one of the input data or output data in a height-width direction of the corresponding input data or output data.

9. The method of claim 1, wherein generating the directed acyclic graph comprises:
determining parallel nodes and sequential nodes of the directed acyclic graph based on the dependencies among the plurality of tasks; and
generating the directed acyclic graph based on the parallel nodes and the sequential nodes.

10. The method of claim 1, wherein regulating, in the respective work queues, the one or more distributed tasks to be executed in parallel comprises:
setting reference counts for the one or more distributed tasks to be executed in parallel based on the directed acyclic graph;

when a first task to be executed is already executed, modifying the reference count of a second task to be executed, wherein the second task depends on the first task; and when the reference count of a task to be executed reaches a preset value, controlling, in the respective work queues, tasks to be executed whose reference counts reach the preset value to start operating.

11. A non-transitory computer readable storage medium storing instructions that, when executed by at least one processor, cause the at least one processor to perform operations for processing a plurality of tasks in parallel, the operations comprising:

generating a directed acyclic graph based on dependencies among the plurality of tasks that are to be executed by the at least one processor;

distributing the plurality of tasks to a plurality of work queues of the at least one processor based on the directed acyclic graph; and regulating, in respective work queues, one or more distributed tasks to be executed in parallel based on the dependencies among the one or more distributed tasks indicated by the directed acyclic graph;

wherein distributing the plurality of tasks to the plurality of work queues of the at least one processor comprises:
topologically sorting the directed acyclic graph to obtain topologically sorted sequences of the plurality of tasks;
sorting the topologically sorted sequences based on preset amounts of execution time of the respective tasks;
obtaining a longest sequence from the topologically sorted sequences; and
distributing the plurality of tasks to the respective work queues based on the longest sequence and the dependencies among the plurality of tasks.

12. A system for processing a plurality of tasks in parallel, comprising:

a memory storing computer-readable instructions; and at least one processor coupled to the memory, wherein the computer-readable instructions, when executed by the at least one processor, cause the at least one processor to perform operations comprising:

generating a directed acyclic graph based on dependencies among the plurality of tasks that are to be executed by the at least one processor;

distributing the plurality of tasks to a plurality of work queues of the at least one processor based on the directed acyclic graph; and regulating, in respective work queues, one or more distributed tasks to be executed in parallel based on the dependencies among the one or more distributed tasks indicated by the directed acyclic graph;

wherein distributing the plurality of tasks to the plurality of work queues of the at least one processor comprises:
topologically sorting the directed acyclic graph to obtain topologically sorted sequences of the plurality of tasks;
sorting the topologically sorted sequences based on preset amounts of execution time of the respective tasks;
obtaining a longest sequence from the topologically sorted sequences; and
distributing the plurality of tasks to the respective work queues based on the longest sequence and the dependencies among the plurality of tasks.

13. The system of claim 12, wherein the operations comprise:

prior to generating the directed acyclic graph, partitioning a program based on at least one of operation nodes or data nodes of the program; and obtaining the plurality of tasks based on the partition.

14. The system of claim 13, wherein the at least one processor includes a multiple-core processor configured to execute the operations for partitioning the program.

15. The system of claim 13, wherein:
the at least one processor includes first and second processors;
the first processor is configured to execute the operations for partitioning the program; and
the second processor is a multi-core processor.

16. The system of claim 13, wherein:
partitioning the program comprises partitioning the program based on the operation nodes; and
partitioning the program based on the operation nodes comprises:
when the program comprises an operation request and the operation request comprises a model, partitioning at least one of the model or input data of the model; and
when the program comprises an operation request and the operation request does not comprise a model, partitioning at least one of input data or output data of the operation request.

17. The system of claim 12, wherein generating the directed acyclic graph comprises:
determining parallel nodes and sequential nodes of the directed acyclic graph based on the dependencies among the plurality of tasks; and
generating the directed acyclic graph based on the parallel nodes and the sequential nodes.

18. The system of claim 12, wherein regulating, in the respective work queues, the one or more distributed tasks to be executed in parallel comprises:
setting reference counts for the one or more distributed tasks to be executed in parallel based on the directed acyclic graph;
when a first task to be executed is already executed, modifying the reference count of a second task to be executed, wherein the second task depends on the first task; and
when the reference count of a task to be executed reaches a preset value, controlling, in the respective work queues, tasks to be executed whose reference counts reach the preset value to start operating.

* * * * *